(12) United States Patent
Momose et al.

(10) Patent No.: US 10,754,204 B2
(45) Date of Patent: Aug. 25, 2020

(54) DISPLAY DEVICE HAVING A SEAL MEMBER UNINTERRUPTEDLY EXTENDING AROUND A PIXEL REGION

(71) Applicant: 138 East LCD Advancements Limited, Sandyford (IE)

(72) Inventors: Yoichi Momose, Matsumoto (JP); Satoshi Hasegawa, Matsumoto (JP)

(73) Assignee: 138 East LCD Advancements Limited, Sandyford (IE)

( * ) Notice: Subject to any disclaimer, the term of this patent is extended or adjusted under 35 U.S.C. 154(b) by 0 days.

(21) Appl. No.: 15/690,848

(22) Filed: Aug. 30, 2017

(65) Prior Publication Data

US 2017/0363892 A1    Dec. 21, 2017

Related U.S. Application Data

(60) Continuation of application No. 15/254,479, filed on Sep. 1, 2016, now Pat. No. 9,952,469, which is a (Continued)

(30) Foreign Application Priority Data

Dec. 27, 2004    (JP) ................. 2004-375697

(51) Int. Cl.
*G02F 1/1339* (2006.01)
*G02F 1/1341* (2006.01)

(52) U.S. Cl.
CPC .......... *G02F 1/1339* (2013.01); *G02F 1/1341* (2013.01); *G02F 1/13394* (2013.01);
(Continued)

(58) Field of Classification Search
CPC combination set(s) only.
See application file for complete search history.

(56) References Cited

U.S. PATENT DOCUMENTS 5,684,555 A * 11/1997 Shiba ............... G02F 1/1345
349/149
5,936,695 A    8/1999 Hida et al.
(Continued)

FOREIGN PATENT DOCUMENTS

| JP | 62-164020 | 7/1987 |
| JP | 08-190099 | 7/1996 |

(Continued)

OTHER PUBLICATIONS

Extended European Search Report for Application No. 05 257 233.6 dated Mar. 31, 2006 (8 pages).

*Primary Examiner* — Lauren Nguyen
(74) *Attorney, Agent, or Firm* — Kunzler Bean & Adamson

(57) ABSTRACT

A method of manufacturing a liquid crystal device having a first substrate and a second substrate facing each other with a liquid crystal layer interposed therebetween, and a sealing member formed in a peripheral portion of at least one of the substrates. The method includes forming the sealing member, disposing the liquid crystal layer inside the sealing member, and bonding the first substrate to the second substrate. In forming the sealing member, a ring-shaped portion that seals the liquid crystal layer inside the sealing member, a first sealing layer and a second sealing layer that face each other to be separated from each other are formed. In the bonding of the first substrate to the second substrate, a junction portion is formed in which the first and second sealing layers are pressed and joined outside the sealing member so as to form the ring-shaped portion.

20 Claims, 39 Drawing Sheets

Related U.S. Application Data continuation of application No. 14/571,729, filed on Dec. 16, 2014, now Pat. No. 9,459,498, which is a division of application No. 11/301,086, filed on Dec. 12, 2005, now Pat. No. 9,599,861.

(52) U.S. Cl.
CPC .............. *G02F 2001/13415* (2013.01); *G02F 2202/023* (2013.01)

(56) References Cited

U.S. PATENT DOCUMENTS

| | | | |
|---|---|---|---|
| 6,099,672 | A | 8/2000 | Yamazaki et al. |
| 6,388,729 | B2 | 5/2002 | Ahn et al. |
| 6,525,799 | B1 | 2/2003 | Fukuda |
| 6,531,329 | B2 | 3/2003 | Asakura et al. |
| 6,567,147 | B1 | 5/2003 | Hirakata |
| 6,930,745 | B1 | 8/2005 | Miyazaki et al. |
| 7,133,107 | B2 | 11/2006 | Park |
| 7,190,430 | B2 | 3/2007 | Miyazaki et al. |
| 7,280,179 | B2 | 10/2007 | Hsu et al. |
| 2002/0030783 | A1 | 3/2002 | Taniguchi |
| 2002/0063839 | A1 | 5/2002 | Matsumoto |
| 2002/0080461 | A1 | 6/2002 | Karasawa et al. |
| 2003/0025867 | A1 | 2/2003 | Yoshizoe |
| 2003/0112404 | A1* | 6/2003 | Kim ................ G02F 1/1339 349/153 |
| 2003/0164907 | A1* | 9/2003 | Date ................ G02F 1/1341 349/113 |
| 2004/0070722 | A1 | 4/2004 | Park |
| 2004/0070723 | A1 | 4/2004 | Imayama et al. |
| 2004/0125317 | A1 | 7/2004 | Suzuki |
| 2004/0183986 | A1* | 9/2004 | Onda ................ G02F 1/1339 349/153 |
| 2004/0239864 | A1 | 12/2004 | Asakawa |
| 2004/0252270 | A1 | 12/2004 | Lee |
| 2005/0094084 | A1 | 5/2005 | Hsu et al. |
| 2005/0099574 | A1 | 5/2005 | Ueyama |
| 2005/0117106 | A1 | 6/2005 | Tatemura et al. |
| 2005/0122466 | A1 | 6/2005 | Tanaka |
| 2005/0219456 | A1 | 10/2005 | Tadaki et al. |
| 2011/0096269 | A1 | 4/2011 | Mukai |

FOREIGN PATENT DOCUMENTS

| | | |
|---|---|---|
| JP | 2002-098979 A | 4/2002 |
| JP | 2002-122870 A | 4/2002 |
| JP | 2002333639 A | 11/2002 |
| JP | 2003-043499 A | 2/2003 |
| JP | 2003-222883 A | 8/2003 |
| JP | 2003-241204 A | 8/2003 |
| JP | 2003-295201 A | 10/2003 |
| JP | 2004226654 A | 8/2004 |
| KR | 2001-0072397 | 7/2001 |
| KR | 2004-0003548 A | 1/2004 |
| TW | 594303 B | 6/2004 |
| WO | WO-00-77567 A1 | 12/2000 |

\* cited by examiner

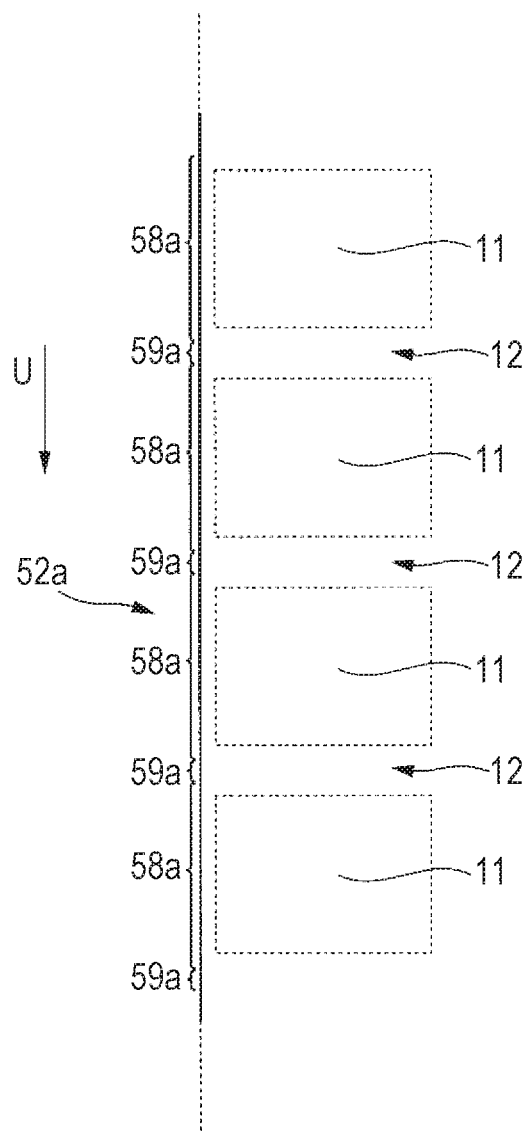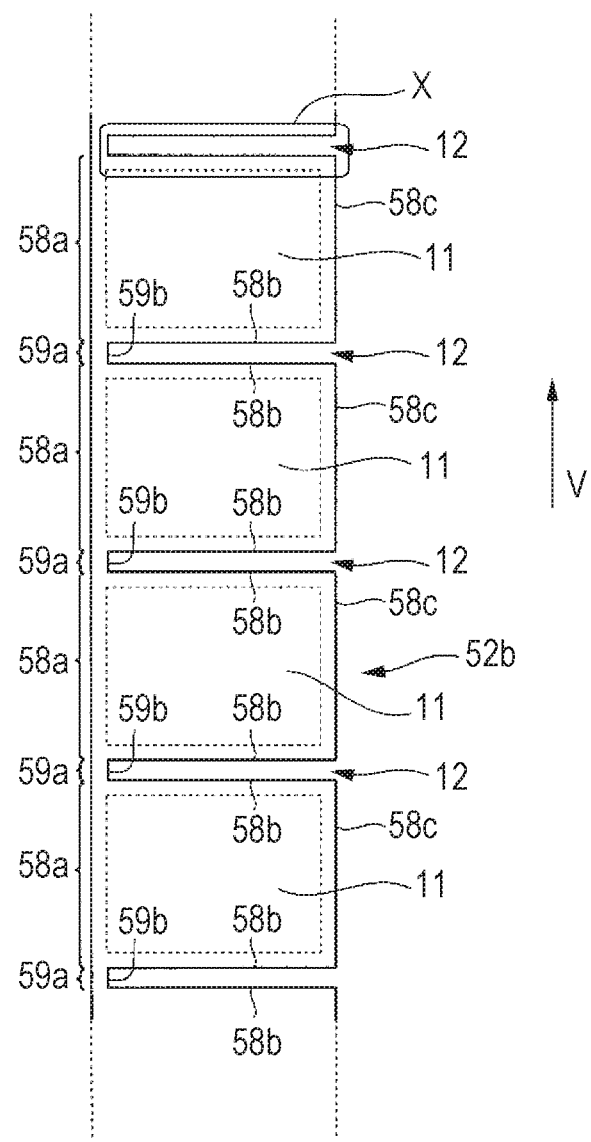

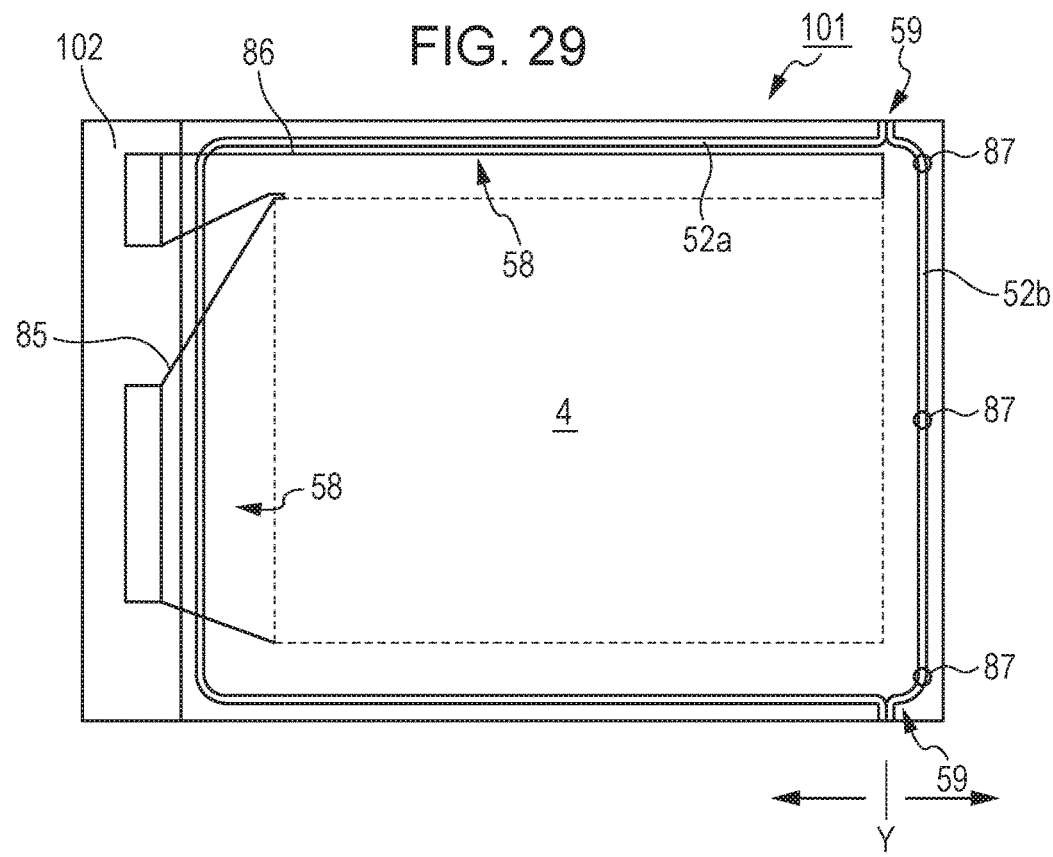
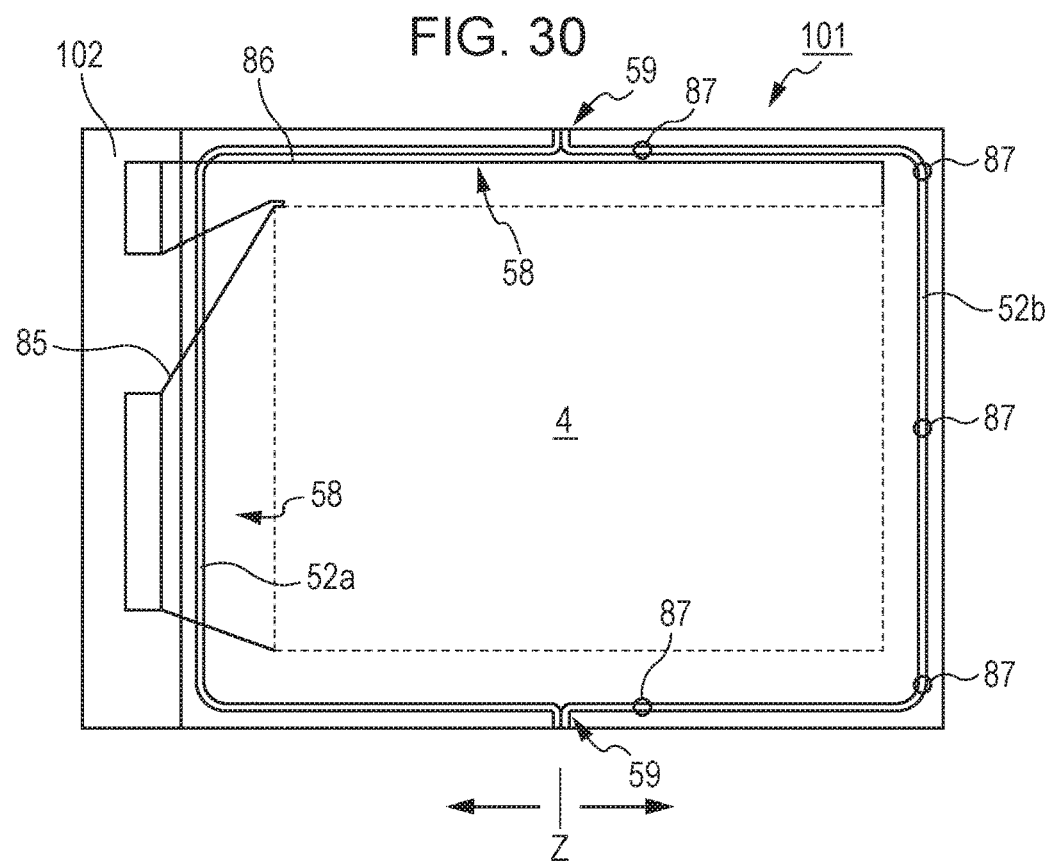

Table 3

| R2 (R2/w2) \ d2 (d2/w2) | 0 mm<br>0 | 0.10mm<br>0.2 | 0.20mm<br>0.4 | 0.25mm<br>0.5 | 0.30mm<br>0.6 | 0.40mm<br>0.8 | 0.45mm<br>0.9 | 0.50mm<br>1 |
|---|---|---|---|---|---|---|---|---|
| 0.00mm (0.0) | 0.00 | 0.01 | 0.04 | 0.07 | 0.10 | 0.20 | 0.28 | 0.50 |
| 0.05mm (0.1) | 0.01 | 0.03 | 0.08 | 0.11 | 0.15 | 0.27 | 0.36 | 0.60 |
| 0.10mm (0.2) | 0.03 | 0.07 | 0.13 | 0.16 | 0.21 | 0.34 | 0.44 | 0.70 |
| 0.20mm (0.4) | 0.09 | 0.15 | 0.23 | 0.28 | 0.33 | 0.49 | 0.60 | 0.90 |
| 0.25mm (0.5) | 0.13 | 0.20 | 0.29 | 0.34 | 0.40 | 0.56 | 0.69 | |
| 0.30mm (0.6) | 0.18 | 0.25 | 0.35 | 0.40 | 0.47 | 0.64 | 0.77 | |
| 0.40mm (0.8) | 0.28 | 0.36 | 0.47 | 0.53 | 0.61 | 0.80 | 0.94 | |
| 0.50mm (1.0) | 0.38 | 0.48 | 0.60 | 0.67 | 0.75 | 0.96 | 1.12 | |
| 0.60mm (1.2) | 0.50 | 0.60 | 0.74 | 0.81 | 0.90 | 1.13 | 1.29 | |
| 0.70mm (1.4) | 0.62 | 0.73 | 0.88 | 0.96 | 1.05 | | | |
| 0.75mm (1.5) | 0.68 | 0.80 | 0.95 | 1.03 | 1.13 | | | |
| 0.80mm (1.6) | 0.74 | 0.87 | 1.02 | 1.11 | | | | |
| 0.90mm (1.8) | 0.87 | 1.00 | 1.16 | | | | | |
| 1.00mm (2.0) | 1.00 | 1.14 | | | | | | |
| 1.10mm (2.2) | 1.13 | | | | | | | |

Key:
- first portion
- third portion
- second portion

FIG. 51

Table 4

| R2 (R2/w2) \ d2 (d2/w2) | 0 mm / 0 | 0.10mm / 0.14286 | 0.20mm / 0.28571 | 0.30mm / 0.42857 | 0.40mm / 0.57143 | 0.50mm / 0.71429 | 0.60mm / 0.85714 | 0.70mm / 1 |
|---|---|---|---|---|---|---|---|---|
| 0.00mm ( 0.00 ) | 0.00 | 0.01 | 0.02 | 0.05 | 0.09 | 0.15 | 0.24 | 0.50 |
| 0.15mm ( 0.21 ) | 0.03 | 0.06 | 0.10 | 0.14 | 0.20 | 0.29 | 0.40 | 0.71 |
| 0.30mm ( 0.43 ) | 0.10 | 0.15 | 0.20 | 0.26 | 0.34 | 0.43 | 0.57 | 0.93 |
| 0.45mm ( 0.64 ) | 0.20 | 0.25 | 0.31 | 0.39 | 0.48 | 0.59 | 0.75 | |
| 0.60mm ( 0.86 ) | 0.30 | 0.37 | 0.44 | 0.52 | 0.63 | 0.75 | 0.92 | |
| 0.75mm ( 1.07 ) | 0.42 | 0.49 | 0.57 | 0.67 | 0.78 | 0.92 | 1.10 | |
| 0.90mm ( 1.29 ) | 0.55 | 0.63 | 0.71 | 0.82 | 0.94 | 1.09 | 1.29 | |
| 1.05mm ( 1.50 ) | 0.68 | 0.76 | 0.86 | 0.97 | 1.10 | Key | | |
| 1.20mm ( 1.71 ) | 0.81 | 0.90 | 1.01 | 1.13 | | first portion | | |
| 1.35mm ( 1.93 ) | 0.95 | 1.05 | 1.16 | | | third portion | | |
| 1.50mm ( 2.14 ) | 1.10 | 1.20 | | | | second portion | | |

FIG. 52

Table 5

| c2 (c2/w2) \ d2 (d2/w2) | 0 mm / 0 | 0.10mm / 0.2 | 0.20mm / 0.4 | 0.30mm / 0.6 | 0.40mm / 0.8 | 0.45mm / 0.9 | 0.50mm / 1 |
|---|---|---|---|---|---|---|---|
| 0.00mm ( 0.00 ) | 0.00 | 0.01 | 0.04 | 0.10 | 0.20 | 0.38 | 0.50 |
| 0.10mm ( 0.20 ) | 0.04 | 0.10 | 0.19 | 0.29 | 0.40 | 0.48 | 0.70 |
| 0.20mm ( 0.40 ) | 0.19 | 0.29 | 0.39 | 0.49 | 0.60 | 0.68 | 0.90 |
| 0.30mm ( 0.60 ) | 0.39 | 0.49 | 0.59 | 0.69 | 0.80 | 0.88 | |
| 0.40mm ( 0.80 ) | 0.59 | 0.69 | 0.79 | 0.89 | 1.00 | 1.08 | |
| 0.50mm ( 1.00 ) | 0.79 | 0.89 | 0.99 | 1.09 | 1.20 | 1.28 | |
| 0.60mm ( 1.20 ) | 0.99 | 1.09 | 1.19 | | | | |
| 0.70mm ( 1.40 ) | 1.19 | | | | | | |

Key:
first portion
third portion
second portion

FIG. 53

Table 6

| c2 (c2/w2) \ d2 (d2/w2) | 0 mm  0 | 0.10mm 0.14286 | 0.20mm 0.28571 | 0.30mm 0.42857 | 0.40mm 0.57143 | 0.50mm 0.71429 | 0.60mm 0.85714 | 0.70mm 1 |
|---|---|---|---|---|---|---|---|---|
| 0.00mm (0.00) | 0.00 | 0.01 | 0.02 | 0.05 | 0.09 | 0.15 | 0.24 | 0.50 |
| 0.10mm (0.14) | 0.02 | 0.05 | 0.09 | 0.15 | 0.22 | 0.29 | 0.39 | 0.64 |
| 0.20mm (0.29) | 0.09 | 0.15 | 0.22 | 0.29 | 0.36 | 0.44 | 0.53 | 0.79 |
| 0.30mm (0.43) | 0.22 | 0.29 | 0.36 | 0.44 | 0.51 | 0.58 | 0.67 | |
| 0.40mm (0.57) | 0.36 | 0.44 | 0.51 | 0.58 | 0.65 | 0.72 | 0.81 | |
| 0.50mm (0.71) | 0.51 | 0.58 | 0.65 | 0.72 | 0.79 | 0.86 | 0.96 | |
| 0.60mm (0.86) | 0.65 | 0.72 | 0.79 | 0.86 | 0.94 | 1.01 | 1.10 | |
| 0.70mm (1.00) | 0.79 | 0.86 | 0.94 | 1.01 | 1.08 | 1.15 | | |
| 0.80mm (1.14) | 0.94 | 1.01 | 1.08 | 1.15 | | | | |
| 0.90mm (1.29) | 1.08 | 1.15 | | | | | | |
| 1.00mm (1.43) | 1.22 | | | | | | | |

Key:
- first portion
- third portion
- second portion

FIG. 54

Table 7

| R1 (R1/w1) \ d1 (d1/w1) | 0 mm<br>0 | 0.05mm<br>0.1 | 0.10mm<br>0.2 | 0.20mm<br>0.4 | 0.30mm<br>0.6 | 0.40mm<br>0.8 | 0.50mm<br>1 |
|---|---|---|---|---|---|---|---|
| 0.00mm (0.0) | 0.00 | 0.00 | 0.00 | 0.00 | 0.01 | 0.10 | 0.50 |
| 0.20mm (0.4) | 0.00 | 0.00 | 0.01 | 0.05 | 0.15 | 0.33 | 0.90 |
| 0.40mm (0.8) | 0.04 | 0.06 | 0.10 | 0.20 | 0.36 | 0.61 | 1.30 |
| 0.60mm (1.2) | 0.15 | 0.20 | 0.26 | 0.40 | 0.60 | 0.90 | |
| 0.80mm (1.6) | 0.31 | 0.38 | 0.45 | 0.63 | 0.87 | 1.21 | |
| 1.00mm (2.0) | 0.50 | 0.58 | 0.67 | 0.88 | 1.14 | | |
| 1.20mm (2.4) | 0.71 | 0.80 | 0.90 | 1.13 | | | |
| 1.40mm (2.8) | 0.93 | 1.04 | 1.15 | | | | |

Key:
- first portion
- third portion
- second portion

FIG. 55

Table 8

| R1 (R1/w1) \ d1 (d1/w1) | 0 mm<br>0 | 0.20mm<br>0.28571 | 0.40mm<br>0.57143 | 0.50mm<br>0.71429 | 0.60mm<br>0.85714 | 0.70mm<br>1 |
|---|---|---|---|---|---|---|
| 0.00mm ( 0.00 ) | 0.00 | 0.00 | 0.01 | 0.05 | 0.15 | 0.50 |
| 0.20mm ( 0.29 ) | 0.00 | 0.00 | 0.09 | 0.18 | 0.33 | 0.79 |
| 0.40mm ( 0.57 ) | 0.00 | 0.06 | 0.21 | 0.34 | 0.54 | 1.07 |
| 0.60mm ( 0.86 ) | 0.05 | 0.16 | 0.37 | 0.52 | 0.75 | |
| 0.80mm ( 1.14 ) | 0.13 | 0.29 | 0.54 | 0.72 | 0.97 | |
| 1.00mm ( 1.43 ) | 0.24 | 0.43 | 0.72 | 0.92 | 1.20 | |
| 1.20mm ( 1.71 ) | 0.36 | 0.59 | 0.90 | 1.13 | | |
| 1.40mm ( 2.00 ) | 0.50 | 0.75 | 1.10 | | | |

Key:
- first portion
- third portion
- second portion

FIG. 56

Table 9

| c1 (c1/w1) \ d1 (d1/w1) | 0 mm / 0 | 0.10mm / 0.2 | 0.20mm / 0.4 | 0.30mm / 0.6 | 0.40mm / 0.8 | 0.50mm / 1 | | |
|---|---|---|---|---|---|---|---|---|
| 0.00mm (0.0) | 0.00 | 0.00 | 0.00 | 0.01 | 0.10 | 0.50 | | |
| 0.15mm (0.3) | 0.00 | 0.00 | 0.04 | 0.19 | 0.39 | 0.80 | | |
| 0.30mm (0.6) | 0.01 | 0.10 | 0.29 | 0.49 | 0.69 | 1.10 | | |
| 0.45mm (0.9) | 0.19 | 0.39 | 0.59 | 0.79 | 0.99 | 1.40 | | |
| 0.60mm (1.2) | 0.49 | 0.69 | 0.89 | 1.09 | 1.29 | 1.70 | | |
| 0.75mm (1.5) | 0.79 | 0.99 | 1.19 | 1.39 | 1.59 | 2.00 | | |
| 0.90mm (1.8) | 1.09 | 1.29 | 1.49 | 1.69 | 1.89 | 2.30 | | |
| | | | | | | Key | | |
| | | | | | | first portion | | |
| | | | | | | third portion | | |
| | | | | | | second portion | | |

FIG. 57

Table 10

| c1 (c1/w1) \ d1 (d1/w1) | 0 mm  0 | 0.10mm  0.14286 | 0.20mm  0.28571 | 0.30mm  0.42857 | 0.40mm  0.57143 | 0.50mm  0.71429 | 0.60mm  0.85714 | 0.70mm  1 |
|---|---|---|---|---|---|---|---|---|
| 0.00mm (0.00) | 0.00 | 0.00 | 0.00 | 0.00 | 0.01 | 0.05 | 0.15 | 0.50 |
| 0.15mm (0.21) | 0.00 | 0.00 | 0.00 | 0.02 | 0.09 | 0.22 | 0.36 | 0.71 |
| 0.30mm (0.43) | 0.00 | 0.01 | 0.05 | 0.15 | 0.29 | 0.44 | 0.58 | 0.93 |
| 0.45mm (0.64) | 0.02 | 0.09 | 0.22 | 0.36 | 0.51 | 0.65 | 0.79 | |
| 0.60mm (0.86) | 0.15 | 0.29 | 0.44 | 0.58 | 0.72 | 0.86 | 1.01 | |
| 0.75mm (1.07) | 0.36 | 0.51 | 0.65 | 0.79 | 0.94 | 1.08 | 0.12 | |
| 0.90mm (1.29) | 0.58 | 0.72 | 0.86 | 1.01 | 1.15 | Key | | |
| 1.05mm (1.50) | 0.79 | 0.94 | 1.08 | | | first portion | | |
| 1.20mm (1.71) | 1.01 | 1.15 | | | | third portion | | |
| | | | | | | second portion | | |

FIG. 58

DISPLAY DEVICE HAVING A SEAL MEMBER UNINTERRUPTEDLY EXTENDING AROUND A PIXEL REGION

CROSS-REFERENCE TO RELATED APPLICATIONS

This is a continuation patent application of U.S. application Ser. No. 15/254,479 filed Sep. 1, 2016, which is a continuation patent application of U.S. application Ser. No. 14/571,729 filed Dec. 16, 2014, now U.S. Pat. No. 9,459,498, issued Oct. 4, 2016, which is a divisional patent application of U.S. application Ser. No. 11/301,086 filed Dec. 12, 2005, now U.S. Pat. No. 9,599,861, issued Mar. 21, 2017, which claims priority to Japanese Patent Application No. 2004-375697 filed Dec. 27, 2004. All the above applications are hereby expressly incorporated by reference in their entireties.

BACKGROUND

1. Technical Field

The present invention relates to a method of manufacturing a liquid crystal device, to a liquid crystal device, and an electronic apparatus.

2. Related Art

In an electronic apparatus, such as a cellular phone or the like, an electro-optical device, such as a liquid crystal device or the like, is used as a color image display unit. The liquid crystal device has a pair of substrates with a liquid crystal layer interposed therebetween. In order to form the liquid crystal device, first, a sealant (sealing material) is coated in a peripheral portion of a surface of one substrate. At that time, a liquid crystal injection hole is formed at a part of the sealant. Next, spacers are sprayed inside the sealant, and then the other substrate is bonded to the one substrate via the sealant. Accordingly, a liquid crystal cell is formed in a region defined by the pair of substrates and the sealant. Next, the liquid crystal cell is subjected to a vacuum for de-aerating and is then brought back to an atmospheric pressure while the liquid crystal injection hole is dipped into a liquid crystal vessel. In doing so, the liquid crystal cell is filled with liquid crystal by means of a pressure difference between the inside and outside of the liquid crystal cell and surface tension. When liquid crystal is filled in such a manner, however, the liquid crystal injection process takes an extremely long time. In particular, when a large substrate whose diagonal is more than one meter is used, it takes more than one day to entirely fill the substrate with liquid crystal.

Therefore, a dropping assembly method has been suggested in which liquid crystal is dropped onto one substrate in which a frame-shaped sealant is provided with no liquid crystal injection hole, and the other substrate is then bonded to the one substrate. According to this method, first, a sealant formed of thermosetting resin or the like is coated in a peripheral portion of a surface of one substrate. Next, a predetermined amount of liquid crystal is dropped onto the one substrate by a liquid droplet ejection device. Finally, the other substrate is bonded to the sealant under a vacuum atmosphere, the vacuum atmosphere is released to an air pressure atmosphere, and then the sealant is subjected to ultraviolet irradiation or heat treatment, thereby forming the liquid crystal device. For this reason, unlike the related art liquid crystal injection method, the sealant is formed in a ring shape with no injection hole.

According to this method, after both substrates have been bonded, the vacuum atmosphere is released to atmospheric pressure. Accordingly, a predetermined cell gap to which a uniform pressure is applied from both substrates can be obtained. Further, the cell gap can be determined according to the amount of liquid crystal dropped. For example, if the dropping amount is excessively small, the cell gap is thin, and thus air bubbles tend to occur. Further, if the dropping amount is excessively large, the cell gap is thick, and unevenness of the cell gap tends to occur. Therefore, by setting the desired optimum dropping amount of liquid crystal, a uniform cell gap can be obtained. Further, according to this method, unlike the related art liquid crystal injection method, the amount of liquid crystal used can be reduced, and the injection/sealing process can be omitted, such that tact time can be reduced.

In addition, as a method of forming the sealant, a method has been suggested in which a dispenser is used. See, for example, JP-A-2002-98979, JP-A-2003-222883, and JP-A-2003-241204, which are referred to as Patent Documents 1, 2, and 3, respectively. This method is a method in which, while relatively moving the dispenser and the substrate, the sealant is ejected onto the substrate in a predetermined pattern. Here, at a part of a peripheral portion of the sealant, the previously ejected sealant and the subsequently ejected sealant overlap each other, such that the sealant ejected on the substrate is formed in a ring shape. Accordingly, when the substrates are bonded after liquid crystal is dropped, the liquid crystal can be suppressed from leaking outside the ring-shaped pattern of the sealant.

The inventors have founded that, in the liquid crystal devices described in the above-described Patent Documents, it is difficult to stably form the sealant, a dummy space needs to be provided with respect to an adjacent panel, and the dispenser needs to be controlled at the beginning and end of drawing in order to form one pattern by one drawing operation. In addition, the inventors have founded that, in the method of forming the sealant by use of the dispenser, in general, a defective cell gap tends to occur.

As for an ejection method of a sealant by use of a dispenser, the inventors have found the following.

In such an ejection method, as shown in FIGS. 48A and 48B, the size of a drawing start portion 500 or a drawing end portion 510 needs to be formed to have the same size as those of other parts. This is because, when the size is excessively large, the cell gap is thickened, such that display unevenness occurs, and, when the cell gap is minute, liquid crystal may leak from that portion, such that reliability is degraded. When the sealant is drawn by a dispenser, in general, as shown in FIGS. 48A and 48B, at the drawing start portion 500 and the drawing end portion 510, the seal tends to be thickened or minuteness tends to occur. In addition, there are many cases in which, in order to make the size of a junction portion 520 uniform, the drawing start portion 500 and the drawing end portion 510 overlap each other, as shown in FIG. 48C. In this case, it has been confirmed that the length of the overlap portion is about 4 mm, and the width W2 of that portion is made larger than a predetermined target width W1 by about 0.1 to 0.2 mm ($\Delta W = W2 - W1 = 0.1$ to 0.2 mm) due to the variation in viscosity of the sealant or the like.

Further, in a TFD (Thin Film Diode) driving-type liquid crystal device or a liquid crystal device in which STN (Super Twisted Nematic) liquid crystal operates in a passive driving method, as shown in FIGS. 49 and 50, relay wiring lines 601 formed on a surface of a circuit board having driver ICs 600 and 610 and a common electrode (hereinafter, referred to as COM electrode) 602 formed on a counter substrate need to be electrically connected to each other via a conductive pad 603. In this case, conductive particles, in which the surface of a spacer is subjected to a plating treatment, are dispersed in the sealant, and the sealant is disposed on the conductive pad 603. As a result, the relay wiring lines 601 and the COM electrode 602 are electrically connected to each other via the conductive particles, and then an output potential of the driver IC 600 is applied to a wiring line of the counter substrate.

On the other hand, segment electrodes (hereinafter, referred to as SEG electrode) 604 relayed from the driver IC 610 up to a display area 620 or the relay wiring lines 601 relayed from the driver IC 600 up to the conductive pad 603 need to cross the sealant. In this case, as for the relay wiring lines 601 and the SEG electrodes 604, in order to prevent the individual electrodes from being electrically shorted, a sealant, which does not contain the conductive particles, is configured to cross the relay wiring lines 601 and the SEG electrodes 604.

By the way, as described above, when the sealant containing the conductive particles and the non-conductive sealant are used, from one end (A of FIG. 50) of the conductive pad 603 up to an end portion (B of FIG. 50) of the relay wiring line 601 crossing the sealant, both sealants need to be connected to each other. In the TFD liquid crystal device or the STN liquid crystal device, there are many cases in which the distance L between the end A of the conductive pad 603 and the end portion of the relay wiring line 601 crossing the sealant is set to be equal to or less than 2 mm. For this reason, if the distance L is simply made shorter than the length of the overlap portion shown in FIG. 48C, that is, 4 mm, it has been confirmed that, as shown in FIG. 48D, the length of the overlap portion of the junction portion 520 becomes 1 mm, the width W3 is made thicker than the predetermined target width W1 by about 0.5 to 0.6 mm ($\Delta W=W3-W1=0.5$ to 0.6 mm), and thus a defective cell gap easily occurs.

Further, in Patent Document 1, the width of the overlap portion of beginning and termination for forming a seal line is set to be 0.4 to 0.6 times as small as the seal line width. In this method, however, the control of the dispenser is very complex, it takes a long time for drawing, the seal shape tends to be varied due to a variation in the amount of a residual sealant in the dispenser or a variation in viscosity between different lots of the sealant, and management is very difficult.

Further, in Patent Document 2, drawing starts from any portion outside the closed loop-shaped sealing member, and ends at a place outside the closed loop-shaped sealing member which is different from the portion where drawing starts. In this method, however, there is a problem in that a dummy space needs to be provided with respect to an adjacent panel. In addition, in any of the methods of Patent Documents 1 to 3, one member is formed by one drawing operation. Accordingly, there is a problem in that it takes time for the control of the dispenser at the beginning and end of drawing, and the tact extends.

Therefore, the inventors have accomplished the aspects of the invention on the basis of the above description.

An advantage of some aspects of the invention is that it provides a method of manufacturing a liquid crystal device which can realize a uniform cell gap, a liquid crystal device, and an electronic apparatus.

SUMMARY

According to a first aspect of the invention, there is provided a method of manufacturing a liquid crystal device having a first substrate and a second substrate facing each other with a liquid crystal layer interposed therebetween, and a sealing member formed in a peripheral portion of at least one of the substrates. The method of manufacturing a liquid crystal device includes forming the sealing member, forming the liquid crystal layer inside the sealing member, and bonding the first substrate to the second substrate. In the forming of the sealing member, a ring-shaped portion that seals the liquid crystal layer inside the sealing member, and a first sealing layer and a second sealing layer that face each other to be separated from each other are formed. In the bonding of the first substrate to the second substrate, a junction portion in which the first and second sealing layers are pressed and are joined outside the sealing member so as to form the ring-shaped portion is formed.

Here, the first sealing layer and the second sealing layer are parts which are formed by forming the sealing member and become the junction portion by bonding the first substrate to the second substrate. That is, the first sealing layer and the second sealing layer constitute a previous shape of the junction portion.

The junction portion joins sealing materials formed on the substrates to each other and blocks the ring-shaped portion in order to prevent the liquid crystal layer inside the ring-shaped portion from leaking to the outside. Further, the junction portion includes a state in which the sealing materials are joined while overlapping in a vertical direction of the substrates or a state in which the sealing materials are joined while being close to each other in a horizontal direction of the substrates. Further, since a part of the junction portion is formed outside of the ring-shaped portion, the junction portion is formed toward the outside of the ring-shaped from a portion joining the ring-shaped portion. Therefore, the entire junction portion is not formed to overlap the ring-shaped portion. That is, only part of the junction portion is joined to the ring-shaped portion and other parts are formed toward the outside of the ring-shaped portion.

Further, in the forming of the sealing member, an ejection method is used in which the sealing material is ejected from nozzles of a dispenser while the dispenser filled with the sealing material and the first substrate or the second substrate are relatively moved.

If doing so, since the ring-shaped portion is blocked by the part of the junction portion, leakage of the liquid crystal layer from the junction portion can be suppressed, and reliability of the liquid crystal device can be enhanced. Further, since the junction portion is formed toward the outside of the ring-shaped portion, when the bonding of the first substrate to the second substrate is performed, the width of the junction portion is increased only outside the ring-shaped portion, and thus the sealing member can be suppressed from protruding inside the ring-shaped portion. Further, there is no case in which a cell gap inside the ring-shaped portion is influenced, and thus the cell gap can be uniformly maintained. Specifically, when a seal protrudes inside the ring-shaped portion, for example, the seal may run onto color filters in a display region of the liquid crystal device, and thus the cell gap is easily influenced. In contrast, in the invention, the sealing member is formed outside the ring-shaped portion, that is, in a region where the color filters are not formed, and thus there is no case in which the seal runs onto the color filters. Therefore, the cell gap can be uniformly maintained.

Further, as compared with the related art, the width of each member of the ring-shaped portion and the junction portion does not need to be adjusted, and the ring-shaped portion and the junction portion can be formed with a member having the same width, such that the sealing member can be easily formed. Therefore, the dispenser can be easily controlled, and drawing of the sealing member can end in short time. Further, a variation of the amount of the sealing material remaining in the dispenser or a variation in viscosity between lots of the sealing material does not need to be regarded as questionable, and the shape of the sealing member can be easily managed.

Further, according to a second aspect of the invention, in the method of manufacturing a liquid crystal device according to the first aspect of the invention, it is preferable that, in the forming of the sealing member, a first side of the ring-shaped portion be formed on a straight line along which the sealing member extends, the first sealing layer be formed so as to be continuous with respect to the first side on a central line different from an axis along which the first side extends, and the second sealing layer be formed to face the first sealing layer.

Here, 'the first sealing layer is formed so as to be continuous with respect to the first side on the central line different from the axis along which the first side extends' means that the first sealing layer and the first side are not formed on the same straight line, but are continuously formed. That is, since the first sealing layer and the first side are not formed on the same straight line, the first sealing layer and the first side are formed via a curve or curved portion. Further, since 'the first sealing layer is formed on the central line different from the axis along which the first side extends', the first sealing layer may be formed on a curved central line or the first sealing layer may be formed on an inclined central line to be inclined with respect to the axis along which the first side extends. As long as the first sealing layer is formed on the corresponding central line, various modes can be adopted.

If doing so, the same effects as those in the above-described manufacturing method can be obtained. In addition, the first side of the ring-shaped portion can be formed on the straight line along which the sealing member extends, and the first sealing layer can be formed so as to be continuous with respect to the first side. Further, the first side can be formed on the central line different from the axis along which the first side extends. Further, the second sealing layer can be formed to face the first sealing layer.

Further, in the method of manufacturing a liquid crystal device according to the second aspect of the invention, it is preferable that, when a line width of the sealing member in the ring-shaped portion after the bonding of the first substrate to the second substrate is performed is w2, and a distance between the central line of the first sealing layer and the central line of the second sealing layer is d2, the following relationship be established. Equation 1

$$0 \leq d2 \leq 0.8 \times w2$$

If doing so, the same effects as those in the above-described manufacturing method can be obtained. In addition, even when a variation of the size of the sealing member occurs, the first sealing layer and the second sealing layer can be reliably joined to form the junction portion.

Further, in the method of manufacturing a liquid crystal device according to the second aspect of the invention, it is preferable that, in the forming of the sealing member, in an axis direction perpendicular to an axis direction of the first side of the ring-shaped portion, a second side be formed, and the second sealing layer be formed so as to be continuous with respect to the second side via a curved portion.

If doing so, the same effects as those in the above-described manufacturing method can be obtained. In addition, the second sealing layer, which is connected to the second side via the curved portion, and the first sealing layer can be joined, thereby reliably forming the junction portion.

Further, in the method of manufacturing a liquid crystal device according to the second aspect of the invention, it is preferable that, when the radius of the curved portion is R2, the following relationship be established.

$$(R2/w2) \leq -1.2 \times (d2/w2) + 2.0 \qquad \text{Equation 2}$$

In addition, in the method of manufacturing a liquid crystal device according to the second aspect of the invention, it is preferable that the following relationship be established.

$$(R2/w2) \leq -(d2/w2) + 1.2 \qquad \text{Equation 3}$$

$$(R2/w2) \geq -0.6 \times (d2/w2) + 0.4 \qquad \text{Equation 4}$$

If doing so, the same effects as those in the above-described manufacturing method can be obtained, and leakage of the liquid crystal layer from the ring-shaped portion can be prevented, regardless of the size of the sealing member.

Further, in the method according to the related art, the sealing member in the junction portion may be thickened, and the distance of the overlap portion needs to be increased in order to control thickening to the minimum. Further, the control of the device may be complicated, and then it will take a long time for drawing the sealing member. In contrast, in the method of manufacturing a liquid crystal device according to the first aspect of the invention, the sealing member can be drawn at the same speed all over. Further, since a writing start portion or a writing end portion is sufficiently separated from the liquid crystal device, a complex control can be eliminated. Accordingly, drawing time can be markedly reduced to half to one-third of drawing time in the related art. In addition, thickening of the sealing member toward the inside of the liquid crystal device in the junction portion of the sealing member can be solved.

Further, in the method of manufacturing a liquid crystal device according to the second aspect of the invention, it is preferable that, in the forming of the sealing member, in an axis direction perpendicular to an axis direction of the first side of the ring-shaped portion, a second side be formed, and the second sealing layer be formed so as to be continuous with respect to the second side via an inclined portion.

If doing so, the same effects as those in the above-described manufacturing method can be obtained. In addition, the second sealing layer, which is connected to the second side via the inclined portion, and the first sealing layer are joined, thereby reliably forming the junction portion.

Further, in the method of manufacturing a liquid crystal device according to the second aspect of the invention, it is preferable that, when a chamfered amount of the inclined portion is c2, the following relationship be established.

$$(c2/w2) \leq -0.5 \times (d2/w2) + 1.2 \qquad \text{Equation 5}$$

In addition, in the method of manufacturing a liquid crystal device according to the second aspect of the invention, it is preferable that the following relationship be established.

$$(c2/w2) \leq -0.5 \times (d2/w2) + 0.7 \qquad \text{Equation 6}$$

$$(c2/w2) \geq -0.5 \times (d2/w2) + 0.3 \qquad \text{Equation 7}$$

If doing so, the same effects as those in the above-described manufacturing method can be obtained. In addition, leakage of the liquid crystal layer from the ring-shaped portion can be prevented, regardless of the size of the sealing member.

Further, the sealing member can be drawn at the same speed all over. Further, since a writing start portion or a writing end portion is sufficiently separated from the liquid crystal device, a complex control can be eliminated. Accordingly, drawing time can be markedly reduced to half to one-third of drawing time in the related art. In addition, thickening of the sealing member toward the inside of the liquid crystal device in the junction portion of the sealing member can be solved.

Further, according to a third aspect of the invention, in the method of manufacturing a liquid crystal device according to the first aspect of the invention, it is preferable that, in the forming of the sealing member, the first sealing layer and a first side of the ring-shaped portion be formed on a coaxial straight line along which the sealing member extends, and the second sealing layer be formed to face the first sealing layer.

If doing so, the same effects as those in the above-described manufacturing method can be obtained. In addition, the first sealing layer and the first side can be formed on the coaxial straight line along which the sealing member extends, that is, the first sealing layer can be formed so as to be continuous with respect to the first side. Further, the second sealing layer can be formed to face the first sealing layer.

Further, since the first sealing layer and the first side are formed on the coaxial straight line, drawing time can be reduced, as compared with the case in which the first sealing layer is formed while drawing the curve or inclined line.

Further, in the method of manufacturing a liquid crystal device according to the third aspect of the invention, it is preferable that, when a line width of the sealing member in the ring-shaped portion after the bonding of the first substrate to the second substrate is performed is w1, and a distance between the central line of the first sealing layer and the central line of the second sealing layer is d1, the following relationship be established.

$$0 \leq d1 \leq 0.8 \times w1 \qquad \text{Equation 8}$$

If doing so, the same effects as those in the above-described manufacturing method can be obtained. In addition, even when the variation of the size of the sealing member occurs, the first sealing layer and the second sealing layer are reliably joined, thereby forming the junction portion.

Further, in the method of manufacturing a liquid crystal device according to the third aspect of the invention, it is preferable that, in the forming of the sealing member, in an axis direction perpendicular to an axis direction of the first side of the ring-shaped portion, a second side be formed, and the second sealing layer be formed so as to be continuous with respect to the second side via a curved portion.

If doing so, the same effects as those in the above-described manufacturing method can be obtained. In addition, the second sealing layer, which is connected to the second side via the curved portion, and the first sealing layer are joined, thereby reliably forming the junction portion.

Further, in the method of manufacturing a liquid crystal device according to the third aspect of the invention, it is preferable that, when the radius of the curved is R1, the following relationship be established.

$$(R1/w1) \leq -2.0 \times (d1/w1) + 3.0 \qquad \text{Equation 9}$$

In addition, in the method of manufacturing a liquid crystal device according to the third aspect of the invention, it is preferable that the following equation be established.

$$(R1/w1) \leq -1.7 \times (d1/w1) + 2.0 \qquad \text{Equation 10}$$

$$(R1/w1) \geq -1.2 \times (d1/w1) + 1.0 \qquad \text{Equation 11}$$

If doing so, the same effects as those in the above-described manufacturing method can be obtained. In addition, leakage of the liquid crystal layer from the ring-shaped portion can be prevented, regardless of the size of the sealing member.

Further, the sealing member can be drawn at the same speed all over. Further, since a writing start portion or a writing end portion is sufficiently separated from the liquid crystal device, a complex control can be eliminated. Accordingly, drawing time can be markedly reduced to half to one-third of drawing time in the related art. In addition, thickening of the sealing member toward the inside of the liquid crystal device in the junction portion of the sealing member can be solved.

Further, in the method of manufacturing a liquid crystal device according to the third aspect of the invention, it is preferable that, in the forming of the sealing member, in an axis direction perpendicular to an axis direction of the first side of the ring-shaped portion, a second side be formed, and the second sealing layer be formed so as to be continuous with respect to the second side via an inclined portion.

If doing so, the same effects as those in the above-described manufacturing method can be obtained. In addition, the second sealing layer, which is connected to the second side via the inclined portion, and the first sealing layer are joined, thereby reliably forming the junction portion.

Further, in the method of manufacturing a liquid crystal device according to the third aspect of the invention, it is preferable that, when a chamfered amount of the inclined portion is c1, the following relationship be established.

$$(c1/w1) \leq -0.5 \times (d1/w1) + 1.2 \qquad \text{Equation 12}$$

In addition, in the method of manufacturing a liquid crystal device according to the third aspect of the invention, it is preferable that the following relationship be established.

$$(c1/w1) \leq -0.5 \times (d1/w1) + 0.7 \qquad \text{Equation 13}$$

$$(c1/w1) \geq -0.5 \times (d1/w1) + 0.3 \qquad \text{Equation 14}$$

If doing so, the same effects as those in the above-described manufacturing method can be obtained. In addition, leakage of the liquid crystal layer from the ring-shaped portion can be prevented, regardless of the size of the sealing member.

Further, the sealing member can be drawn at the same speed all over. Further, since a writing start portion or a writing end portion is sufficiently separated from the liquid crystal device, a complex control can be eliminated. Accordingly, drawing time can be markedly reduced to half to one-third of drawing time in the related art. In addition, thickening of the sealing member toward the inside of the liquid crystal device in the junction portion of the sealing member can be solved.

Further, according to a fourth aspect of the invention, in the method of manufacturing a liquid crystal device according to the first aspect, it is preferable that a first base substrate having a plurality of first element regions be divided at mutual boundary portions of the plurality of first element regions, such that the first substrate is obtained for each first element region, and a second base substrate having a plurality of second element regions be divided at mutual boundary portions of the plurality of second element regions, such that the second substrate is obtained for each second element region.

If doing so, the same effects as those in the above-described manufacturing method can be obtained. In addition, since the plurality of first element regions and the plurality of second element regions are divided and taken out from the first base substrate and the second base substrate, respectively. Therefore, the plurality of the liquid crystal devices each having the first substrate and the second substrate can be taken out. As a result, a manufacturing method having excellent productivity can be implemented.

Further, according to a fifth aspect of the invention, in the method of manufacturing a liquid crystal device according to the fourth aspect of the invention, it is preferable that the forming of the sealing member has forming a first sealing member which serves as one of the first sealing layer and the second sealing layer, and a part of the ring-shaped portion, and after forming the first sealing member, forming a second sealing member which serves as the other of the first sealing layer and the second sealing layer, and a remaining part of the ring-shaped portion.

If doing so, the same effects as those in the above-described manufacturing method can be obtained. In addition, a liquid crystal device having the sealing member, which has the first sealing member and the second sealing member, can be manufactured. When the sealing member has one sealing member, it is difficult to form the ring-shaped portion, the first sealing layer, the second sealing layer, and the junction portion with different sealing materials. In contrast, according to the aspect of the invention, the sealing materials can be individually selected for the first sealing member and the second sealing member. Therefore, for a specified part from the parts at which the sealing member is formed, one of the first sealing member and the second sealing member can be selectively formed.

Further, in the method of manufacturing a liquid crystal device according to the fifth aspect of the invention, it is preferable that, in the forming of the first sealing member, in an arrangement direction of the first element regions for the plurality of first element regions and the mutual boundary portions in the first base substrate, or in an arrangement direction of the second element regions for the plurality of second element regions and the mutual boundary portions in the second base substrate, the first sealing member be continuously and collectively formed.

Further, it is preferable that, after the forming of the first sealing member is performed, in the forming of the second sealing member, in an arrangement direction of the first element regions for the plurality of first element regions and the mutual boundary portions in the first base substrate, or in an arrangement direction of the second element regions for the plurality of second element regions and the mutual boundary portions in the second base substrate, the second sealing member be continuously and collectively formed.

If doing so, through a single process from the start of drawing of the first sealing member to the end of drawing and a single process from the start of drawing of the second sealing member to the end of drawing, the sealing member can be collectively formed with respect to the arrangement direction of the plurality of first element regions or the plurality of second element regions. Therefore, the sealing member can be easily and rapidly formed, and thus a manufacturing method having excellent productivity can be implemented.

On the other hand, when the sealing member is separately formed for each of the plurality of first element regions or the plurality of second element regions, the start of drawing and the end of drawing should be performed for each region, and then the start of drawing and the end of drawing should be repeatedly performed for the plurality of first element regions or the plurality of second element regions. Therefore, since the ejection and the non-ejection of the sealing material are continuously performed, it is difficult to cause the sealing material in the dispenser to stably flow, and the variation in the amount of the sealing material to be ejected tends to occur. Further, since the dispenser should scan the first base substrate or the second base substrate, the operation of the dispenser is complicated.

In contrast, in the invention, the first sealing member and the second sealing member are continuously and collectively formed in the arrangement direction of the first element regions or the second element regions, and thus the start of drawing and the end of drawing can be performed for each column or each row of the first element regions or the second element regions, such that the number of starts of drawing and the number of ends of drawing can be reduced. Therefore, the first sealing member and the second sealing member can be continuously and collectively formed, while causing the sealing material in the dispenser to stably flow. Further, the sealing member can be formed in short time. Further, since the dispenser does not scan the first element regions or the second element regions in a non-ejection state, the sealing material filled in the dispenser can be prevented from being inadvertently dropped. As a result, the operation of the dispenser can be simplified, and the variation in viscosity of the sealing material or the variation in the ejection amount can be suppressed.

Further, the sealing members of the first element regions and the second element regions formed in such a manner are joined via the junction portion, and thus leakage of a liquid crystal material between adjacent regions can be prevented.

Further, in the method of manufacturing a liquid crystal device according to the fifth aspect of the invention, it is preferable that the forming of the first sealing member and the forming of the second sealing member be performed on the first base substrate or the second base substrate. Further, it is preferable that the forming of the first sealing member and the forming of the second sealing member be performed on only one of the first base substrate and the second base substrate.

If doing so, the same effects as those in the above-described manufacturing method can be obtained.

Further, according to a sixth aspect of the invention, a liquid crystal device includes a first substrate and a second substrate that face each other with a liquid crystal layer interposed therebetween, and a sealing member that are formed in peripheral portions of both substrates. The liquid crystal device is manufactured by the method of manufacturing a liquid crystal device described above.

If doing so, since the ring-shaped portion is blocked by the part of the junction portion, leakage of the liquid crystal material from the junction portion can be suppressed, and reliability of the liquid crystal device can be enhanced. Further, since the junction portion is formed outside the ring-shaped portion, excluding the part for blocking the ring-shaped portion, even when the width of the junction portion is thickened by bonding the first substrate to the second substrate, the width of the junction portion is increased only outside the ring-shaped portion, and thus the sealing member can be suppressed from protruding inside the ring-shaped portion. Further, there is no case in which the cell gap inside the ring-shaped portion is influenced, and thus the cell gap can be uniformly maintained. Further, as compared with the related art, the width of each member of the ring-shaped portion and the junction portion does not need to be adjusted, and the ring-shaped portion and the junction portion can be formed with a member having the same width.

Further, in the liquid crystal device according to the sixth aspect of the invention, it is preferable that the sealing member have a single member, the liquid crystal layer be held in a portion surrounded by the single member in a ring shape, and the junction portion join one end and the other end of the single member at a single place.

Here, 'the sealing member is formed of the single member' means one which is formed by continuously ejecting the sealing material from the beginning to the termination, that is, one which is formed by ejecting the sealing material with so-called one stroke of a brush, unlike the sealing member having the first sealing member and the second sealing member to be described below.

If doing so, the same effects as those in the above-described liquid crystal device can be obtained. In addition, a liquid crystal device having the sealing member, which has the single member, can be implemented. Further, since the ring-shaped portion is blocked by the junction portion, which joins the beginning and the termination of the sealing member at one place, the junction portion can be formed to the minimum. Therefore, as compared with the case in which the plurality of junction portions are provided, the liquid crystal device in which the defective cell gap is more reliably suppressed can be implemented.

Further, in the liquid crystal device according to the sixth aspect of the invention, it is preferable that the sealing member have a first sealing member and a second sealing member, the ring-shaped portion hold the liquid crystal layer in a portion surrounded by the first sealing member and the second sealing member in a ring shape, and the junction portion join one ends of the first sealing member and the second sealing member and also join the other ends of the first sealing member and the second sealing member.

If doing so, the same effect as those in the above-described liquid crystal device can be obtained. In addition, a liquid crystal device having the sealing member, which has the first sealing member and the second sealing member, can be implemented. When the sealing member has a single member, it is difficult to form the ring-shaped portion or the junction portion with different sealing materials. In contrast, according to the aspect of the invention, the sealing material can be selected for each of the first sealing member and the second sealing member. Therefore, for a specified part from the parts at which the sealing member is formed, one of the first sealing member and the second sealing member can be selectively formed.

Further, according to a seventh aspect of the invention, an electronic apparatus includes the liquid crystal device described above.

According to this configuration, an electronic apparatus having a display unit, which has excellent reliability and performs high-quality display, is provided.

BRIEF DESCRIPTION OF THE DRAWINGS

The invention will be described with reference to the accompanying drawings, wherein like numbers reference like elements.

FIG. 23A is a diagram showing a method of forming a sealing member of the liquid crystal device according to the third embodiment of the invention.

FIG. 23B is a diagram showing a method of forming a sealing member of the liquid crystal device according to the third embodiment of the invention.

FIG. 29 is a plan view of a liquid crystal device according to a modification of the seventh embodiment of the invention.

FIG. 30 is a plan view of a liquid crystal device according to an eighth embodiment of the invention.

FIG. 51 is a diagram illustrating Table 3.

FIG. 52 is a diagram illustrating Table 4.

FIG. 53 is a diagram illustrating Table 5.

FIG. 54 is a diagram illustrating Table 6.

FIG. 55 is a diagram illustrating Table 7.

FIG. 56 is a diagram illustrating Table 8.

FIG. 57 is a diagram illustrating Table 9.

FIG. 58 is a diagram illustrating Table 10.

DESCRIPTION OF EXEMPLARY EMBODIMENTS

Hereinafter, embodiments of a liquid crystal device, a method of manufacturing a liquid crystal device, and an electronic apparatus according to an embodiment of the invention will be described with reference to the drawings. Moreover, in the respective drawings used for the following description, the scale of each layer or member has been adjusted in order to have a recognizable size.

First Embodiment

First, a liquid crystal device according to a first embodiment of the invention will be described.

The liquid crystal device of the present embodiment described below is an example of an active matrix type liquid crystal device which uses a thin film diode (hereinafter, referred to as TFD) as a switching element. The liquid crystal device of the present invention is also a transmissive liquid crystal device in which transmissive display can be performed.

Figure 1:
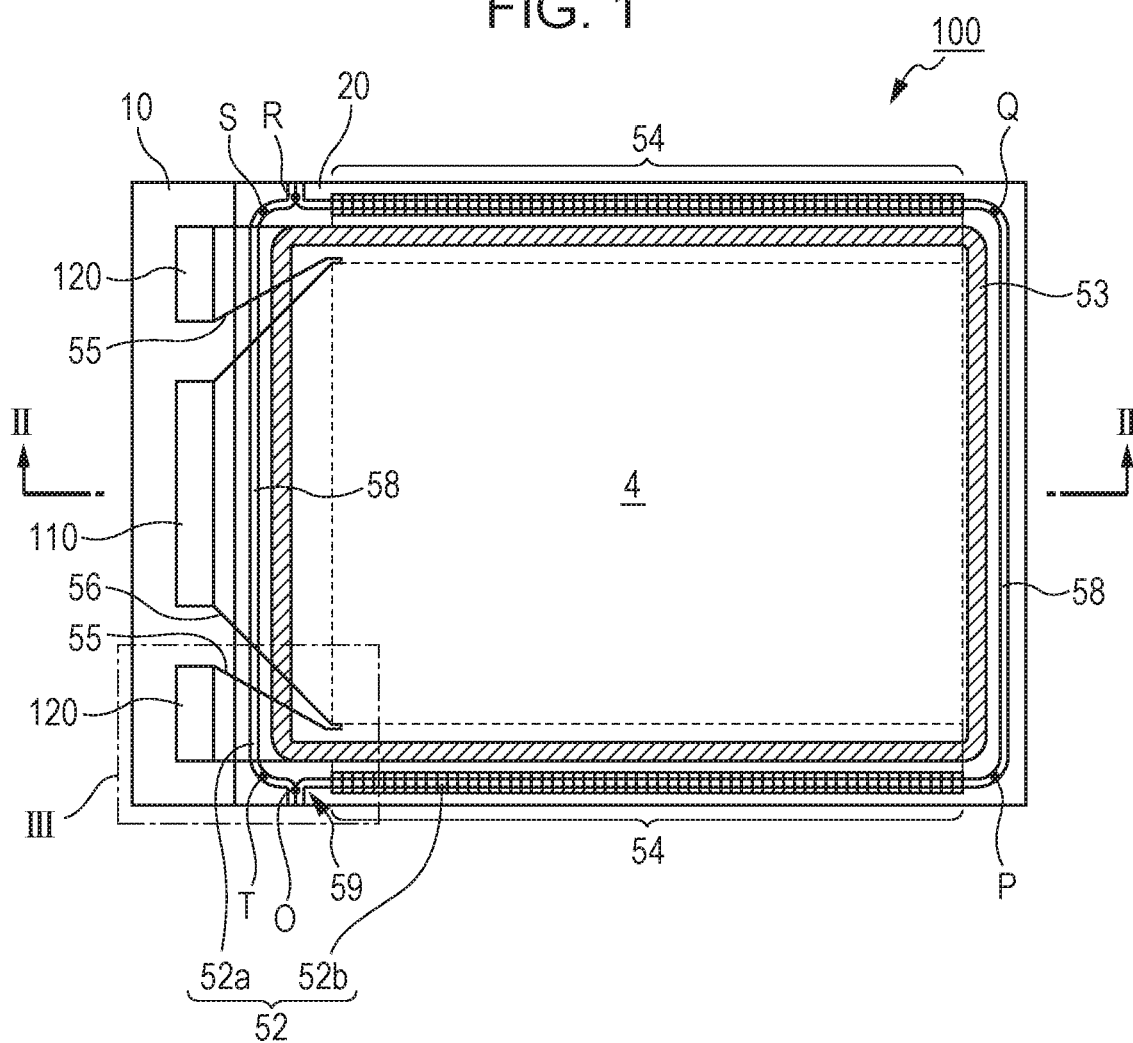
FIG. 1 is a plan view of a liquid crystal device according to a first embodiment of the invention.
Figure 2:
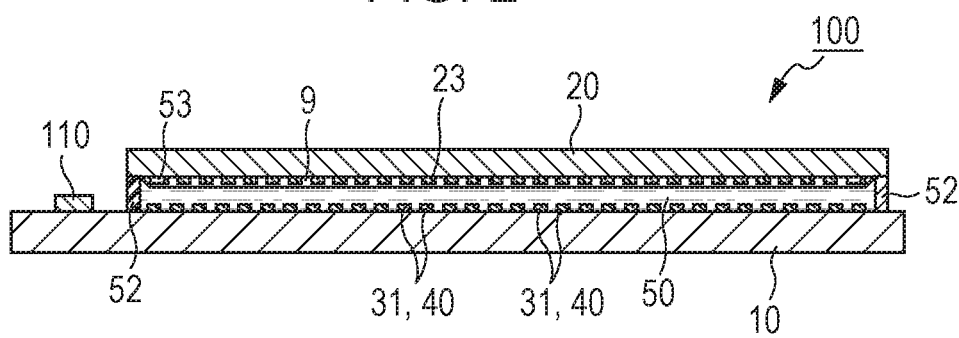
FIG. 2 is a cross-sectional view of the liquid crystal device according to the first embodiment of the invention taken along the line II-II of FIG. 1.
Figure 3:
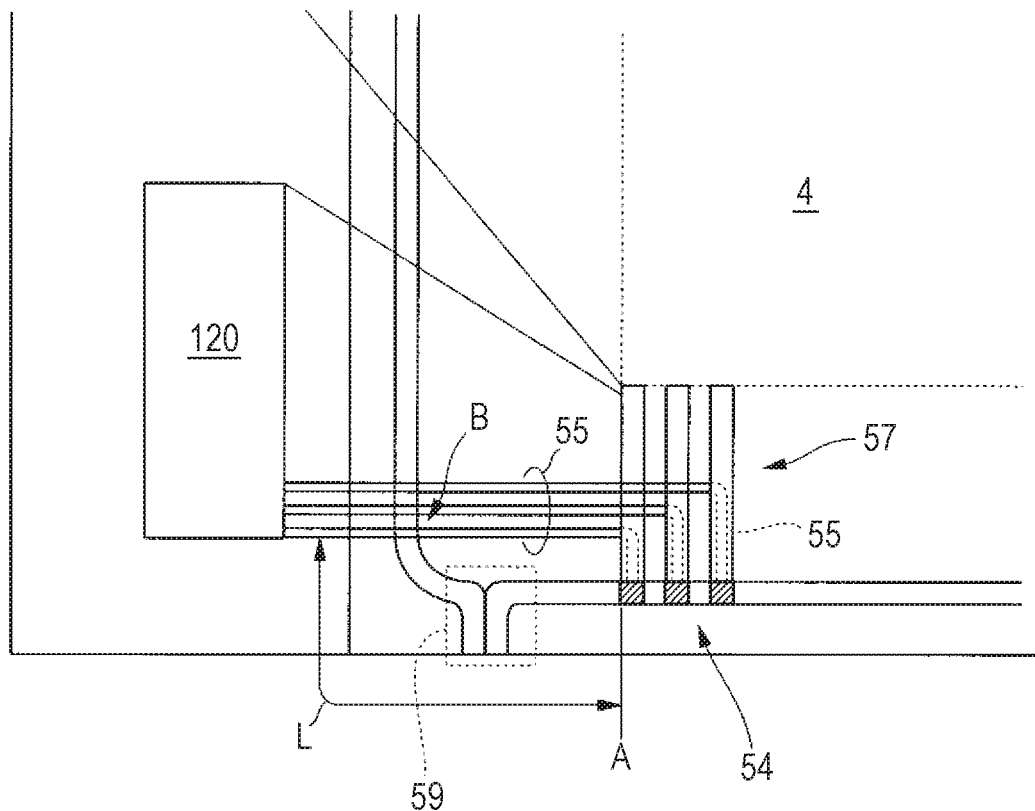
FIG. 3 is a plan view of parts of the liquid crystal device according to the first embodiment of the invention.
Figure 4:
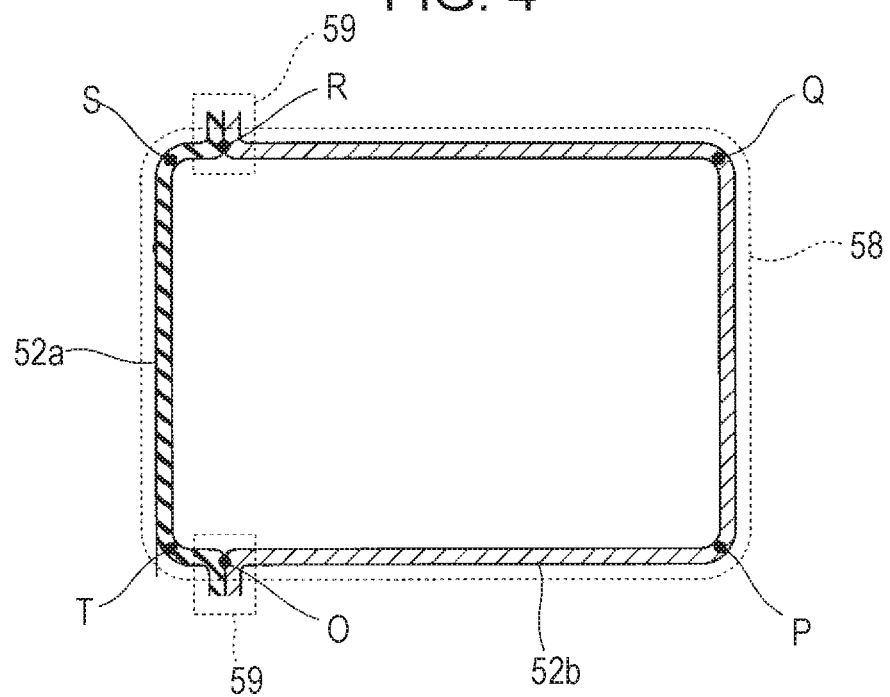
FIG. 4 is a plan view of parts of the liquid crystal device according to the first embodiment of the invention.
Figure 5:
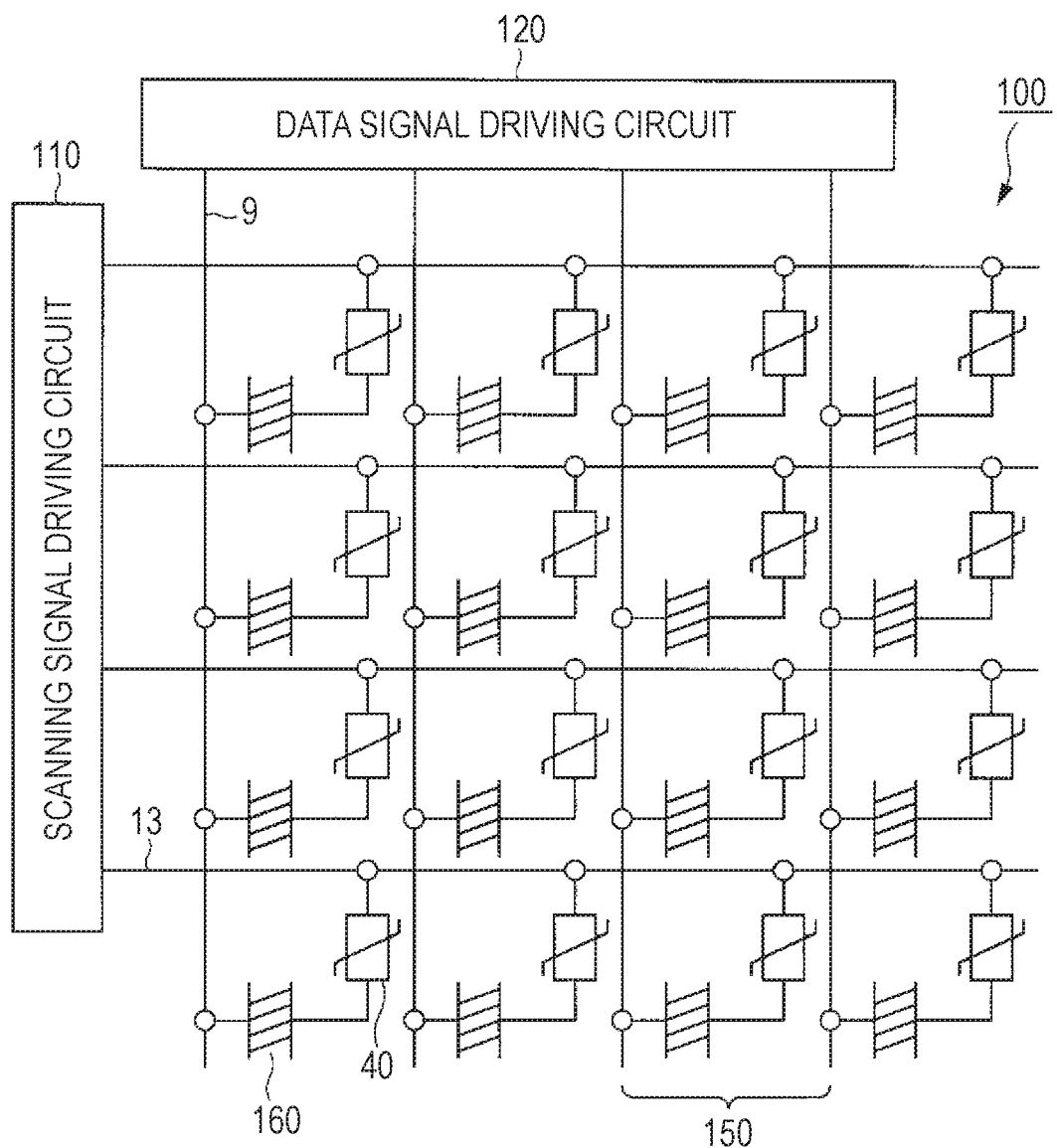
FIG. 5 is an equivalent circuit diagram of the liquid crystal device according to the first embodiment of the invention.
Figure 6:
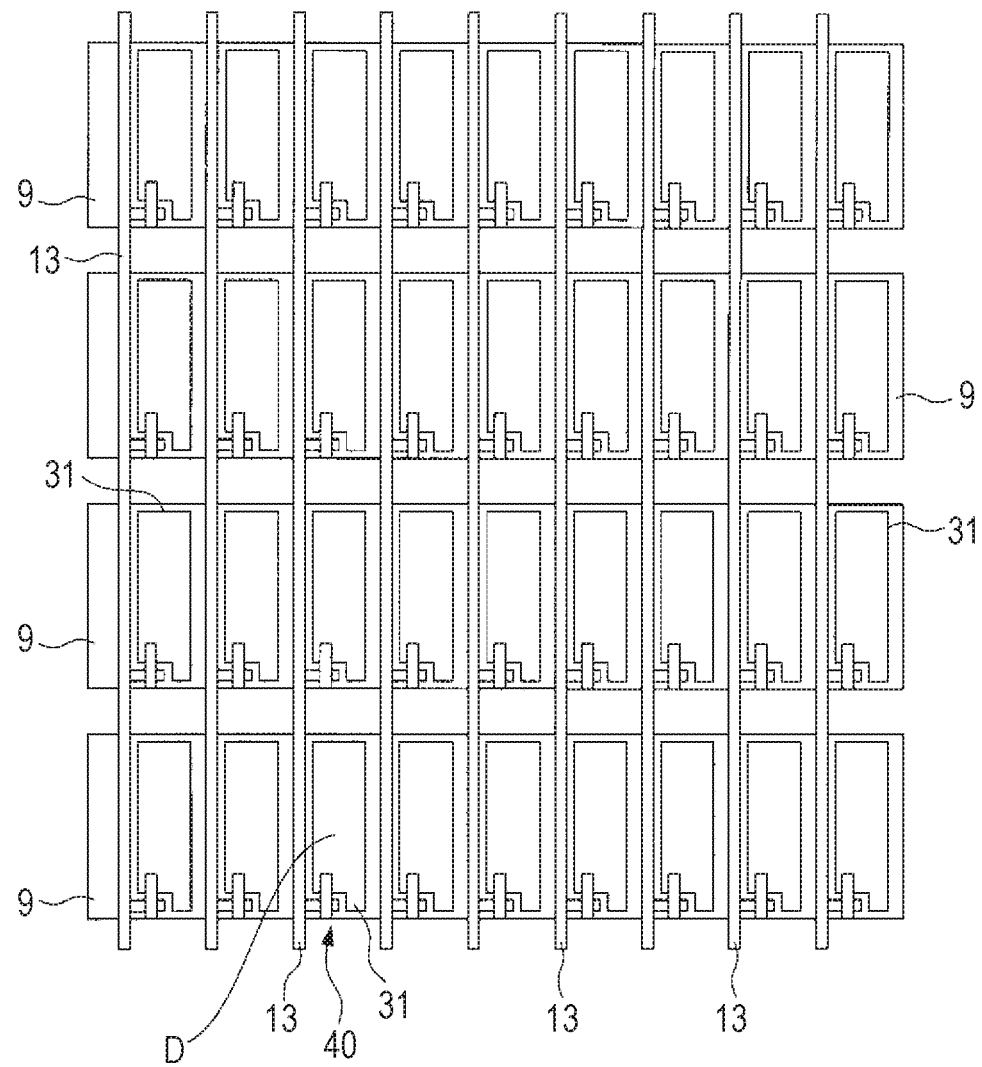
FIG. 6 is a plan view of various elements of the liquid crystal device according to the first embodiment of the invention.

FIG. 1 is a plan view of individual constituent parts of the liquid crystal device according to the present embodiment as viewed from a counter substrate. FIG. 2 is a cross-sectional view taken along the line II-II of FIG. 1. Further, FIG. 3 is a plan view showing a region denoted by a symbol C in FIG. 1 on a magnified scale. FIG. 4 is a plan view illustrating the configuration of a sealing member in detail. FIG. 5 is an equivalent circuit diagram of various elements, wiring lines, and the like in a plurality of pixels formed in an image display region 4 of the liquid crystal device in a matrix shape. FIG. 6 is a diagram illustrating planar electrode structures (pixel structures) of various elements.

As shown in FIGS. 1 to 3, the liquid crystal device 100 of the present embodiment primarily has a TFD substrate (first substrate) 10, a counter substrate (second substrate) 20, a sealing member 52, and a liquid crystal layer 50. Further, the sealing member 52 is formed in peripheral portions of the TFD substrate 10 and the counter substrate 20 to be interposed between both substrates. In addition, the liquid crystal layer 50 is filled and held between the TFD substrate 10 and the counter substrate 20 and inside the sealing member 52.

Next, the individual constituent parts will be described in detail.

The TFD substrate 10 is formed of a transparent member, such as a glass substrate or the like. On a surface of the TFD substrate 10, the image display region 4, the sealing member 52, a periphery sacrificial member 53, a conductive pad (first conductive portion or conductive region) 54, a scanning signal driving circuit 110, and a data signal driving circuit 120 are provided.

In the image display region 4, a plurality of dots are formed in a matrix shape, and, for each dot, a pixel electrode 31 and a TFD element 40 are formed. The pixel electrode 31 is a transparent electrode primarily formed of ITO (Indium Tin Oxide). The TFD element 40 is connected to the scanning signal driving circuit 110 via an SEG electrode 56, such that a driving signal of the scanning signal driving circuit 110 is applied to the pixel electrode 31 as a potential. On a surface of the pixel electrode 31, an alignment film, which is primarily formed of polyimide to be subjected to a rubbing treatment, is formed, such that the alignment of liquid crystal molecules of the liquid crystal layer 50 with no voltage applied thereto is parallel to a rubbing direction. The periphery sacrificial member 53 is formed of a light-shielding material between the image display region 4 and the sealing member 52. The conductive pad 54 is connected to the data signal driving circuit 120 via a relay wiring line shown in FIG. 3 so as to be electrically connected to a COM electrode (second conductive portion or conductive region) 57, which is formed in a counter substrate 20 to be described below. The scanning signal driving circuit 110 and the data signal driving circuit 120 are formed at one side of the TFD substrate 10 (the left side of FIG. 1). Then, the SEG electrode 56 which extends from the scanning signal driving circuit 110, overlaps the sealing member 52 (52a) between the scanning signal driving circuit 110 and the image display region 4. Further, the relay wiring line 55, which extends from the data signal driving circuit 120, overlaps the sealing member 52 (52a) between the data signal driving circuit 120 and the conductive pad 54.

Moreover, in FIG. 3, some of the relay wiring lines 55, a part of the conductive pad 54, and some of the COM electrodes 57 are shown. Actually, the same number of the relay wiring lines 55 as the number of terminals of the data signal driving circuit 120 are formed, and a plurality of conductive pads 54 and a plurality of COM electrodes 57 are formed in a horizontal direction of FIG. 1.

On the counter substrate 20, in a region facing the boundary region of the pixel electrodes on the TFD substrate 10, a light-shielding film 23, which is called a black matrix or a black stripe, is formed, and a pixel electrode 9 formed of ITO film is formed thereon. Further, on the pixel electrode 9, an alignment film, which is primarily formed of polyimide to be subjected to the rubbing treatment, is formed. Further, as shown in FIG. 3, outside the image display region 4, the COM electrode 57 is formed at a position where the pixel electrode 9 extends. The COM electrode 57 is formed to face the conductive pad 54, such that a sealing member 52b (described below) containing conductive particles is interposed between the COM electrode 57 and the conductive pad 54. Therefore, a driving signal of the data signal driving circuit 120 is applied to the pixel electrode 9 as a potential via the relay wiring line 55, the conductive pad 54, the conductive particles, and the COM electrode 57.

The sealing member 52 has an insulating sealing member (second sealing member) 52a and a conductive sealing member (first sealing member) 52b.

Here, the insulating sealing member 52a is a sealing member having an electrical insulation property, and the conductive sealing member 52b is a sealing member having conductivity. The insulating sealing member 52a is formed in a non-conductive region on the relay wiring line 55 and the SEG electrode 56 so as to cause a non-conduction state between a plurality of wiring lines or electrodes in the relay wiring line 55 and the SEG electrode 56. On the other hand, the conductive sealing member 52b is formed in a conductive region of the conductive pad 54 or the COM electrode 57 so as to cause a conduction state between the conductive pad 54 and the COM electrode 57.

Further, while the conductive sealing member 52b contains the conductive particles, the insulating sealing member 52a does not contain conductive particles. As the conductive particles, particles of conductive material, such as metal particles or the like, particles obtained by performing a plating treatment on the surface of resin, or the like are adopted. The conductive particles have elasticity, and thus, when the TFD substrate 10 and the counter substrate 20 are bonded to each other, the conductive pad 54 and the COM electrode 57 press the conductive particles, such that the conductive pad 54 and the COM electrode 57 are in conductive states.

Further, for any one of the insulating sealing member 52a and the conductive sealing member 52b, as a primary sealing material, a thermosetting or ultraviolet curable resin material or a resin material having both the thermosetting and ultraviolet curable characteristics according to a curing process is adopted. In the present embodiment, World Lock No. 717, supplied by Kyoritsu Chemical & Co., Ltd., is adopted as the sealing member 52. This material has viscosity of 400,000 mPa·s, and the thickness of the sealing member 52 after bonding is 8 μm.

In addition, the insulating sealing member 52a and the conductive sealing member 52b are formed in a pattern shown in FIG. 4, and thus a single ring-shaped portion 58 for holding the liquid crystal layer 50 therein and junction portions 59 for the insulating sealing member 52a and the conductive sealing member 52b are constituted. The sealing member 52 formed in such a pattern is formed in a closed frame shape within the surface of the TFD substrate 10 with no liquid crystal hole. Further, the sealing member 52 is formed by ejecting the sealing material onto the TFD substrate 10 or the counter substrate 20 from a dispenser, which is then pressed by the TFD substrate 10 and the counter substrate 20 so as to be compressed, such that a predetermined cell gap is maintained.

In the ring-shaped portion 58, the insulating sealing member 52a is formed so as to pass through points R, S, T, and O in FIG. 4 and the conductive sealing member 52b is formed so as to pass through points O, P, Q, and R in FIG. 4.

In the junction portions 59, the insulating sealing member 52a and the conductive sealing member 52b are joined at points O and R. Therefore, the junction portions 59 are formed at a place on the side TP and at a place on the side SQ. That is, the junction portions 59 are individually formed on opposite sides of the ring-shaped portion 58.

Further, the junction portions 59 are formed so as to be continuous with respect to the ring-shaped portion 58 and block (close) the ring-shaped portion 58 at the points O and R. Accordingly, the liquid crystal layer 50 held inside the ring-shaped portion 58 can be prevented from leaking outside the sealing member 52. Further, at the points O and R, parts of the individual junction portions 59 are integrated into the ring-shaped portion 58, and the other parts of the individual junction portions 59 are formed outside the ring-shaped portion 58. That is, the junction portions 59 are formed toward the outside of the ring-shaped portion 58 from the portions for blocking the ring-shaped portion 58 (points O and R). Therefore, the junction portions 59 are not formed to overlap the ring-shaped portion 58. Only parts of the individual junction portions 59 join the ring-shaped portion 58 and the other parts thereof are formed toward the outside of the ring-shaped portion 58.

Further, as shown in FIG. 3, the junction portion 59 is formed between an end (symbol A) of the conductive pad 54 and an end (symbol B) of the relay wiring line 55 crossing the sealing member 52, that is, in a portion indicated by a symbol L. In the liquid crystal device 100 of the present embodiment, the distance denoted by the symbol L is set to be equal to or less than 2 mm.

Further, as described below, the junction portions 59 are formed by drawing the insulating sealing member 52a and the conductive sealing member 52b from the dispenser in a non-contact state to face each other, and then pressing the sealing members 52a and 52b through the bonding process so as to be contacted and joined.

The liquid crystal layer 50 is disposed inside the ring-shaped portion 58. For example, the liquid crystal layer 50 is ejected and formed by an ink jet method (liquid droplet ejection method) or a dispenser method. Further, the thickness of the liquid crystal layer 50 is determined to have the predetermined cell gap in connection with the thickness of the sealing member 52. Further, for the liquid crystal layer 50, a material is suitably selected according to an operation mode of the liquid crystal device 100, for example, an operation mode, such as a TN (Twisted Nematic) mode or an STN (Super Twisted Nematic) mode, or a normally white mode/normally black mode.

Next, the image display region 4 of the liquid crystal device 100 will be described in detail.

As shown in the equivalent circuit of FIG. 5, the liquid crystal device 100 has a plurality of scanning lines 13 and a plurality of data lines (pixel electrodes) 9 crossing the scanning lines 13. The scanning lines 13 are driven by the scanning signal driving circuit 110 and the data lines are driven by the data signal driving circuit 120. Here, the scanning lines 13 are correspondingly connected to the SEG electrodes 56 outside the image display region 4. Therefore, in each pixel region 150, the TFD element 40 and a liquid crystal display element 160 (liquid crystal layer 150) are connected in series between the scanning line 13 and the data line 9. Moreover, in FIG. 5, the TFD element 40 is connected to the scanning line 13, and the liquid crystal display element 160 is connected to the data line 9. Alternatively, the TFD element 40 may be connected to the data line 9, and the liquid crystal display element 160 may be connected to the scanning line 13.

Further, as shown in the planar electrode structure of FIG. 6, in the liquid crystal device 100, the pixel electrodes 31, which have rectangular shapes in plan view and are connected to the scanning lines 13 via the TFD elements 40, are provided in a matrix shape. The pixel electrodes 9 are provided in stripe shape so as to face the pixel electrodes 31 in a vertical direction of FIG. 6. The pixel electrodes 9 are formed by the data lines and have the stripe shape so as to cross the scanning lines 13. In the present embodiment, an individual region in which each pixel electrode 31 is formed is one dot region, and the TFD elements 40 are provided in the individual dot regions arranged in a matrix shape, such that display can be performed for each dot region.

Here, the TFD element 40 is a switching element for connecting the scanning line 13 and the pixel electrode 31. The TFD element 40 has an MIM structure which includes a first conductive film primarily formed of tantalum (Ta), an insulating film formed on the surface of the first conductive film and primarily formed of $Ta_2O_3$, and a second conductive film formed on the surface of the insulating film and primarily formed of chromium (Cr). Further, the first conductive film of the TFD element 40 is connected to the scanning line 13, and the second conductive film thereof is connected to the pixel electrode 31.

Moreover, the scanning signal driving circuit 110 and the data signal driving circuit 120 may be not formed on the TFD substrate 10. Alternatively, a TAB (Tape Automated Bonding) substrate with a driving LSI mounted thereon may be electrically and mechanically connected via an anisotropy conductive film to a group of terminals which is formed in the peripheral portion of the TFD substrate 10. Moreover, in the liquid crystal device 100, a retardation plate, a polarizing plate, and the like, which are not shown in the drawings, may be disposed in a predetermined direction according to the kind of the liquid crystal layer 50 to be used, that is, the operation mode, such as the TN (Twisted Nematic) mode or the STN (Super Twisted Nematic) mode, or the normally white mode/normally black mode. Further, when the liquid crystal device 100 is constituted for color display, in regions facing individual pixel electrodes of the TFD substrate 10 described below in the counter substrate 20, color filters of R, G, and B, and a protective film for protecting the color filters may be formed.

Next, a method of manufacturing a liquid crystal device according to the first embodiment of the invention will be described.

First, in the following description, (1) Schematic Description of Manufacturing Method of Liquid Crystal Device, (2) Device Manufacturing Apparatus, and (3) Detailed Description of Manufacturing Method of Liquid Crystal Device will be sequentially described.

(1) Schematic Description of Manufacturing Method of Liquid Crystal Device

Figure 7A:
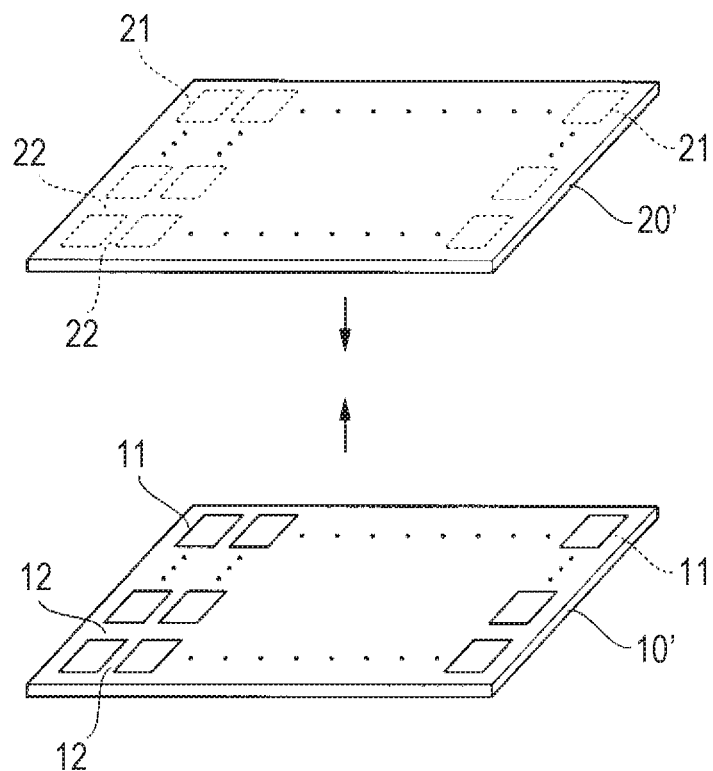
FIG. 7A is a diagram schematically illustrating a method of manufacturing a liquid crystal device according to an embodiment of the invention.
Figure 7B:
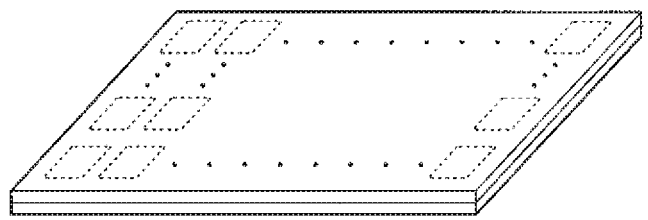
FIG. 7B is a diagram schematically illustrating a method of manufacturing a liquid crystal device according to the embodiment of the invention.
Figure 7C:
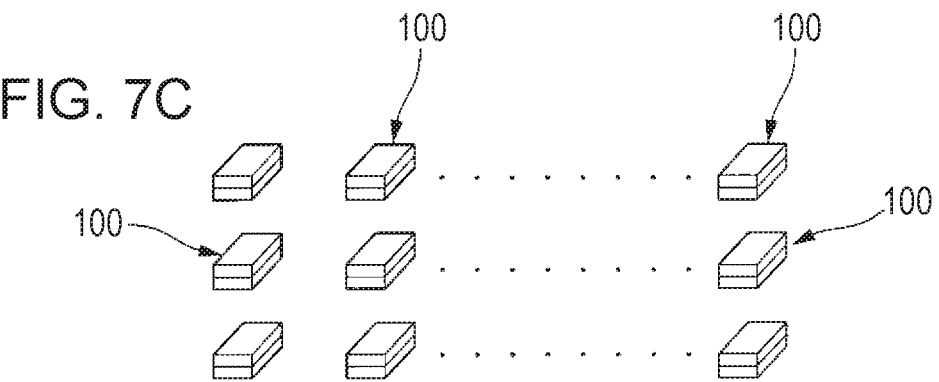
FIG. 7C is a diagram schematically illustrating a method of manufacturing a liquid crystal device according to the embodiment of the invention.

FIGS. 7A to 7C are diagrams schematically illustrating the method of manufacturing a liquid crystal device.

First, as shown in FIG. 7A, a mother substrate 10' for a TFD substrate (first base substrate) and a mother substrate 20' for a counter substrate (second base substrate) are prepared.

In the mother substrate 10' for the TFD substrate (first base substrate), a plurality of TFD formation regions (first element regions) 11 are divided and formed. Further, a periphery of each divided TFD formation region 11 becomes a mutual boundary portion 12. Next, on the mother substrate 10' for a TFD substrate, a semiconductor manufacturing process including a known photolithography technology is performed, such that the TFDs 40, the pixel electrodes 31, the conductive pad 54, the relay wiring lines 55, the SEG electrodes 56, the alignment film, and the like are formed in the individual TFD formation regions 11. Moreover, the scanning signal driving circuit 110 and the data signal driving circuit 120 may be simultaneously incorporated into the TFD formation region 11.

On the other hand, in the mother substrate 20' for a counter substrate, a plurality of counter electrode formation regions (second element regions) 21 are divided and formed. Further, a periphery of each divided counter electrode formation region 21 becomes a mutual boundary portion 22. Next, on the mother substrate 20' for a counter substrate, a semiconductor manufacturing process including a known photolithography technology is performed, such that the pixel electrodes 9, the COM electrodes 57, the alignment film, and the like are formed in the individual counter electrode formation regions 21.

Here, the number of TFD formation regions 11 is the same as the number of counter electrode formation regions 21. Further, when the mother substrate 10' for a TFD substrate and the mother substrate 20' for a counter substrate are bonded to each other, the individual regions 11 and 21 are positioned with respect to each other with high precision.

Next, as shown in FIG. 7B, the mother substrate 10' for a TFD substrate and the mother substrate 20' for a counter substrate are bonded to each other. Here, the mother substrate 10' for a TFD substrate and the mother substrate 20' for a counter substrate are bonded to each other in a state in which the sealing member or the liquid crystal layer 50 described below is interposed therebetween.

Next, as shown in FIG. 7C, in a state in which the mother substrates 10' and 20' are bonded to each other, the mother substrates 10' and 20' are divided and cut along the mutual boundary portions 12 and 22, such that a plurality of liquid crystal devices 100 are formed.

(2) Device Manufacturing Apparatus

Next, a device manufacturing apparatus which performs processes of the formation of the sealing member 52, the formation of the liquid crystal layer 50 by dropping liquid droplets, bonding of the substrates, and curing of the sealing member 52 in the manufacturing process of the liquid crystal device 100 will be described.

Figure 8:
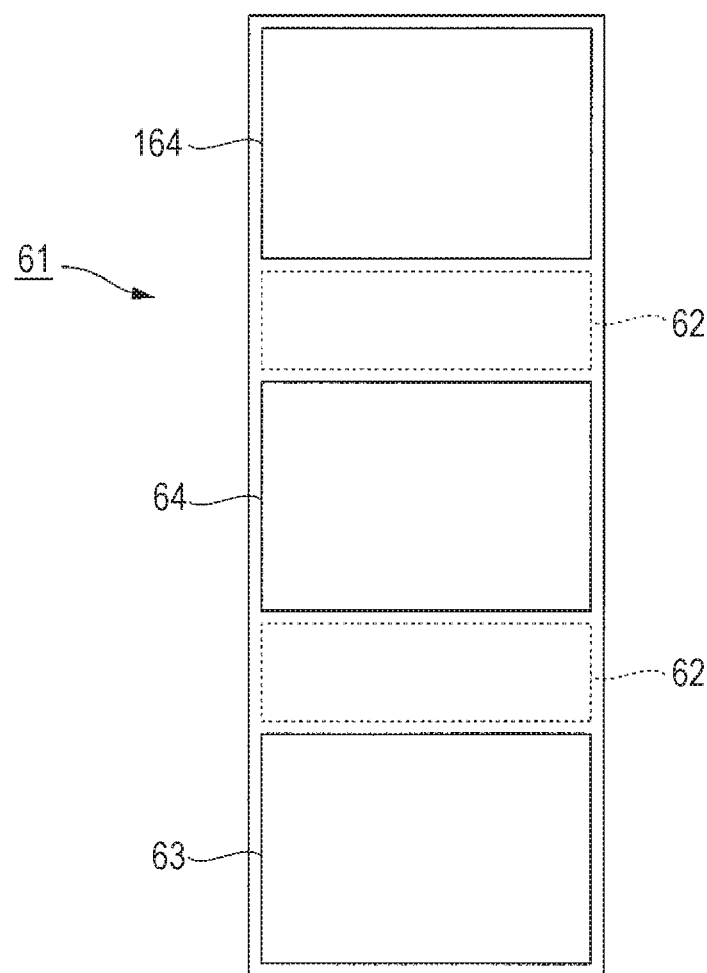
FIG. 8 is a diagram showing the configuration of a device manufacturing apparatus which is used for a method of manufacturing a liquid crystal device according to the embodiment of the invention.

FIG. 8 is a diagram showing the schematic configuration of the device manufacturing apparatus 61.

As shown in FIG. 8, the device manufacturing apparatus 61 primarily has a substrate load/unload unit 62 that loads and unloads a substrate, a material supply unit 63, a substrate bonding unit 64, and a precise alignment unit 164.

Figure 9:
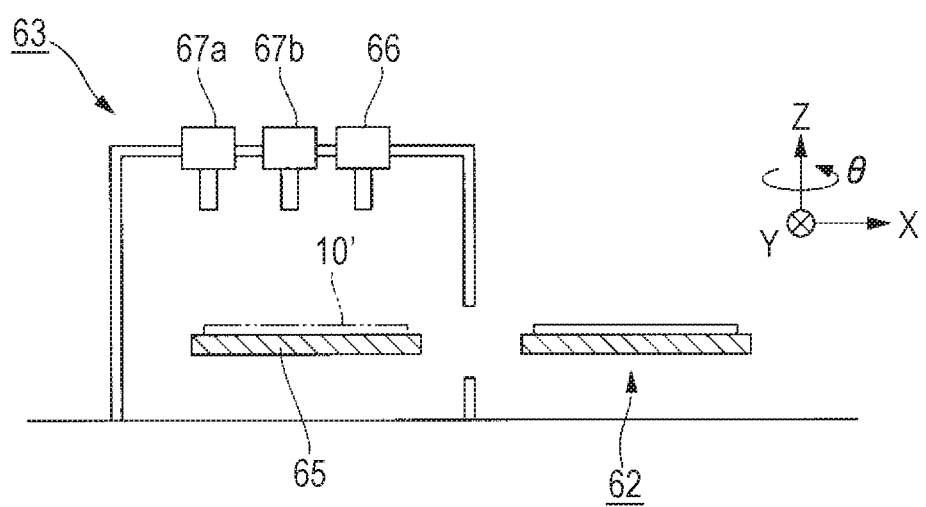
FIG. 9 is a diagram showing the configuration of a substrate load/unload unit and a material supply unit which are used for a method of manufacturing a liquid crystal device according to the embodiment of the invention.

FIG. 9 is a diagram showing the schematic configurations of the substrate load/unload unit 62 and the material supply unit 63. Moreover, hereinafter, on an assumption that directions along the surface of the substrate are referred to as an X direction (for example, a horizontal direction in FIG. 9) and a Y direction (for example, a vertical direction to the paper in FIG. 9), and a direction perpendicular to an XY plane is referred to as a Z direction, the description will be given.

As shown in FIG. 9, the material supply unit 63 primarily has a table 65 which freely moves in the X direction, the Y direction, and a θ direction (rotation direction around an axis parallel to the Z axis) while holding the substrate, a liquid droplet ejection head 66 that is disposed above the table 65 so as to eject and drop a liquid crystal material (electro-optical material), and sealing material coating units 67a and 67b that are disposed in the vicinity of the liquid droplet ejection head 66 so as to coat the sealing material.

In the sealing material coated by the sealing material coating units 67a and 67b, a substantially spherical gap control material is included, the diameter of the gap control material is formed to have the appropriate size (for example, the diameter of 8 μm) to maintain the cell gap of the substrate at a predetermined thickness (for example, 3 μm). The diameter (about 8 μm) of the gap control material is set to maintain the thickness (about 5 μm) of the color filter in the display region or the like and the cell gap (3 μm).

Further, the sealing material coating unit 67a coats the insulating sealing member 52a and the sealing material coating unit 67b coats the conductive sealing member 52b.

Moreover, in order to drop the liquid crystal material, in addition to the liquid droplet ejection head 66, any device may be used as long as the dropping amount of the liquid crystal material can be controlled. For example, a precise liquid ejector (measuring dispenser) or the like may be used. Further, the gap control material is not limited to a spherical shape or one included in the sealing material. For example, various gap control materials, such as one which is formed in a fibrous shape and is included in the sealing material, one which is formed to protrude from the substrate in a columnar shape, not included in the sealing material, and the like, can be used. Preferably, one, which is fixed at a predetermined position of the substrate and does not move on the substrate at the time of bonding the substrates or the like, is used.

Further, the substrate load/unload unit 62 primarily has a carrier which transfers the substrate between the material supply unit 63 and the substrate bonding unit 64 and between the substrate bonding unit 64 and the precise alignment unit 164.

Moreover, in addition to the configuration shown in FIG. 9, the substrate load/unload unit 62 may be configured to have a transfer robot or a unit having a transfer function for connecting the material supply unit 63, the substrate bonding unit 64, and the precise alignment unit 164.

Figure 10:
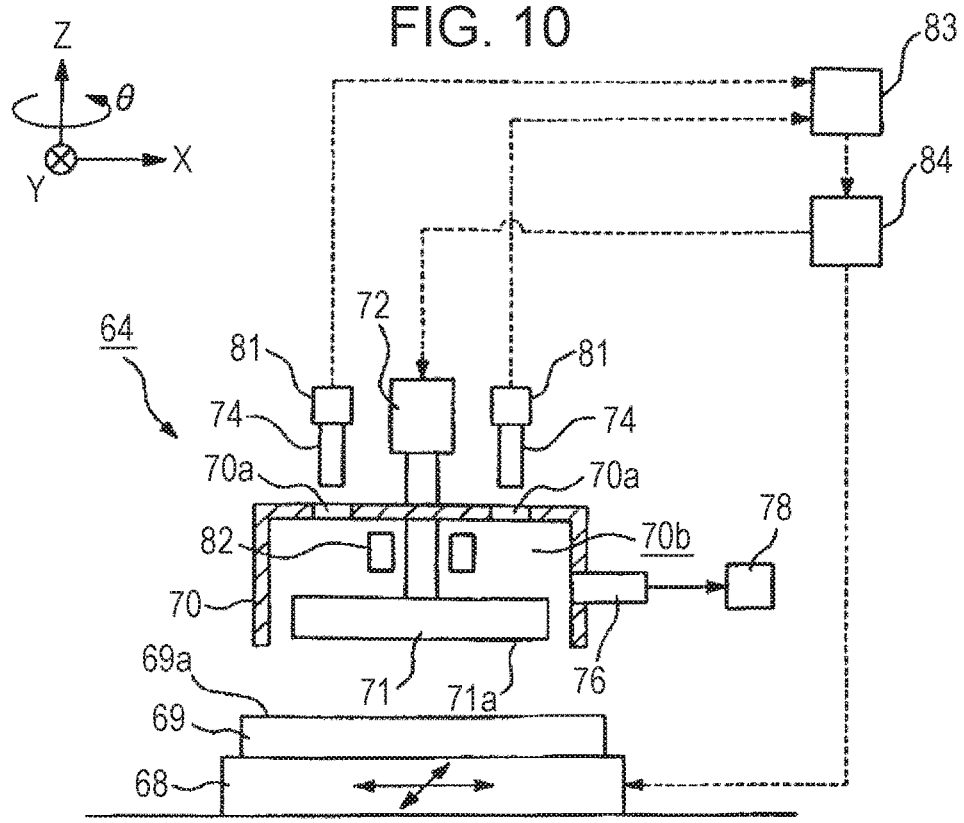
FIG. 10 is a diagram showing the configuration of a substrate bonding unit which is used for a method of manufacturing a liquid crystal device according to the embodiment of the invention.

FIG. 10 is a diagram showing the schematic configuration of the substrate bonding unit 64.

As shown in FIG. 10, the substrate bonding unit 64 is configured to have a table 68 that freely moves in the X direction, the Y direction, and the θ direction while holding the substrate, a lower chuck unit 69 that is disposed on the table 68, a vacuum chamber 70 that is disposed above the lower chuck unit 69, an upper chuck unit 71 that is disposed in the vacuum chamber 70 to face the lower chuck unit 69, and a descending mechanism 72 that movably supports the upper chuck unit 71 in the Z direction and presses the upper chuck unit 71 toward the lower chuck unit 69.

In a wall surface of the vacuum chamber 70, inspection windows 70a and an exhaust portion 76 are provided. Above the inspection window 70a, optical measuring units, each having a bonding microscope 74 that magnifies and observes an alignment mark on the substrate via the inspection window 70a, and a CCD camera 81 that captures an image of the magnified and observed alignment mark, are provided. To the exhaust portion 76, a suction device 78 having a vacuum pump for exhausting gas in a housing space 70b (drawing a vacuum) is connected.

Further, the vacuum chamber 70 has a UV irradiation unit 82. The UV irradiation unit 82 has a UV lamp, such as a mercury lamp or the like, for radiating ultraviolet rays to temporarily cure the sealing member 52, and, if necessary, a light-guiding unit, such as a fiber or the like.

Moreover, preferably, the UV irradiation unit 82 supplies sufficient energy to increase the viscosity of the sealing member 52. Further, a unit for applying energy to the sealing member 52 is not limited to the UV lamp. For example, according to the nature of the sealing member 52, various devices, such as a heating/cooling device, a visible light irradiation device, and the like, can be used.

In addition, in the substrate bonding unit 64, an image processing unit 83 that processes the image captured by the CCD camera 81, and a control unit 84 that controls the table 68 and the descending mechanism 72 on the basis of image information processed by the image processing unit 83 are provided.

Further, in the lower chuck unit 69 and the upper chuck unit 71, holding mechanisms (not shown) for holding the substrate on holding surfaces 69a and 71a, which face each other, are provided.

Moreover, in the lower chuck unit 69 and the upper chuck unit 71, any mechanism may be provided as long as the substrate can be held under a vacuum atmosphere. For example, a chuck mechanism using electrostatic force or adhesive force, or a mechanical holding mechanism for mechanically holding the substrate may be used. Further, a holding method using adhesive force, inter-molecular force, or vacuum force, or a mechanical holding method may be used.

Figure 11:
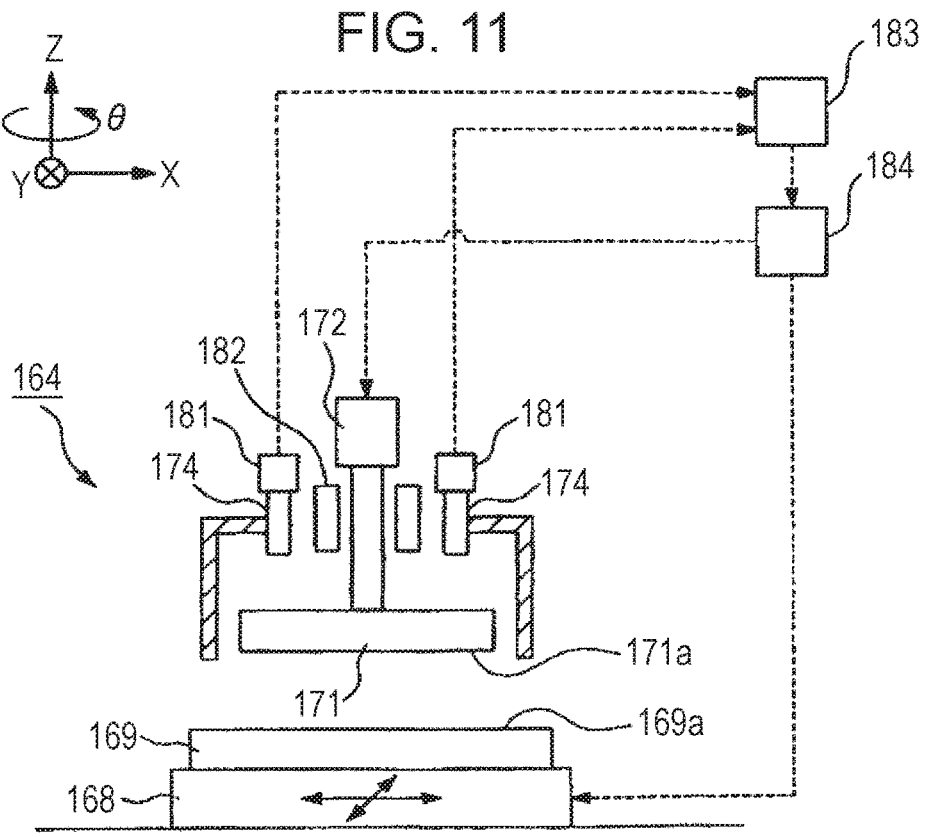
FIG. 11 is a diagram showing the configuration of a precise alignment unit which is used for a method of manufacturing a liquid crystal device according to the embodiment of the invention.

FIG. 11 is a diagram showing the schematic configuration of the precise alignment unit 164.

The precise alignment unit 164 schematically has a table 168 that freely moves in the X direction, the Y direction, and the θ direction while holding the substrate, a lower chuck unit 169 that is provided on the table 168, an upper chuck unit 171 that is disposed to face the lower chuck unit 169, a pressing mechanism 172 that movably supports the upper chuck unit 171 in the Z direction and presses the upper chuck unit 171 toward the lower chuck unit 169, microscopes 174 for alignment that magnify and observe the alignment mark on the substrate, and a UV lamp 182, such as a mercury lamp or the like, that irradiates ultraviolet rays to cure the sealing member 52. Each microscope 174 for alignment constitutes an optical measuring unit of the present apparatus, together with a CCD camera 181 that captures an image of the magnified and observed alignment mark.

Further, in the precise alignment unit 164, an image processing unit 183 that processes the image captured by the CCD camera 181 and a control unit 184 that controls the table 168 on the basis of image information processed by the image processing unit 183 are provided.

In the lower chuck unit 169 and the upper chuck unit 171, attraction mechanisms (not shown) for vacuum-attracting the substrate onto holding surfaces 169a and 171a, which face each other, are provided.

Moreover, in the lower chuck unit 169 and the upper chuck unit 171, any mechanism may be provided as long as sufficient holding force to move the bonded substrates in the X-axis direction and the Y-axis direction can be exerted. For example, a chuck mechanism using electrostatic force or adhesive force, or a mechanical holding mechanism for mechanically holding the substrate may be used.

Further, in the precise alignment unit 164, the pressing mechanism that presses the upper chuck unit 171 toward the lower chuck unit 169 may be provided.

Further, the UV lamp 182 is sufficient to cure the sealing member 52. In addition to the UV lamp 182, for example, various devices, such as a heating/cooling device, a visible light irradiation device, and the like, can be used according to the nature of the sealing member 52.

Figure 12A:
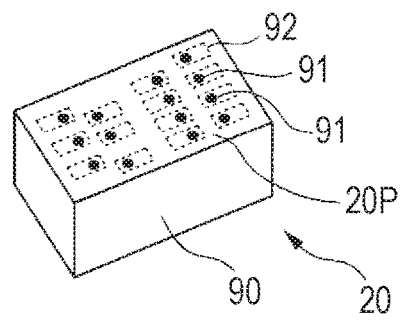
FIG. 12A is a diagram showing the configuration of an example of a liquid droplet ejection head which is used for a method of manufacturing a liquid crystal device according to the embodiment of the invention.
Figure 12B:
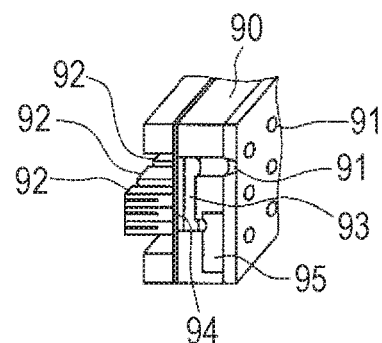
FIG. 12B is a diagram showing the configuration of an example of a liquid droplet ejection head which is used for a method of manufacturing a liquid crystal device according to the embodiment of the invention.

As the liquid droplet ejection head 66 shown in FIG. 6, for example, a liquid droplet ejection head having the configuration shown in FIG. 12A or 12B can be used. In a head main body 90 of the liquid droplet ejection head 66, a reservoir 95 and a plurality of ink chamber (pressure generating chambers) 93 are formed. The reservoir 95 is a flow channel for supplying ink including an electro-optical material, such as liquid crystal or the like, to the individual ink chambers 93. Further, on one end surface of the head main body 90, a nozzle plate constituting an ink ejection surface 66P is mounted. In the nozzle plate, a plurality of nozzles 91 opens so as to eject ink. Further, a flow channel is formed from each ink chamber 93 toward the corresponding nozzle 91. On the other hand, on the other end surface of the head main body 90, a vibrating plate 94 is mounted.

The vibrating plate 94 constitutes wall surfaces of the ink chambers 93. Outside the vibrating plate 94, piezoelectric elements (pressure generating unit) 92 are provided to correspond to the ink chambers 93. In each of the piezoelectric elements 92, a piezoelectric material, such as crystal or the like, is interposed between a pair of electrodes (not shown).

Figure 13:
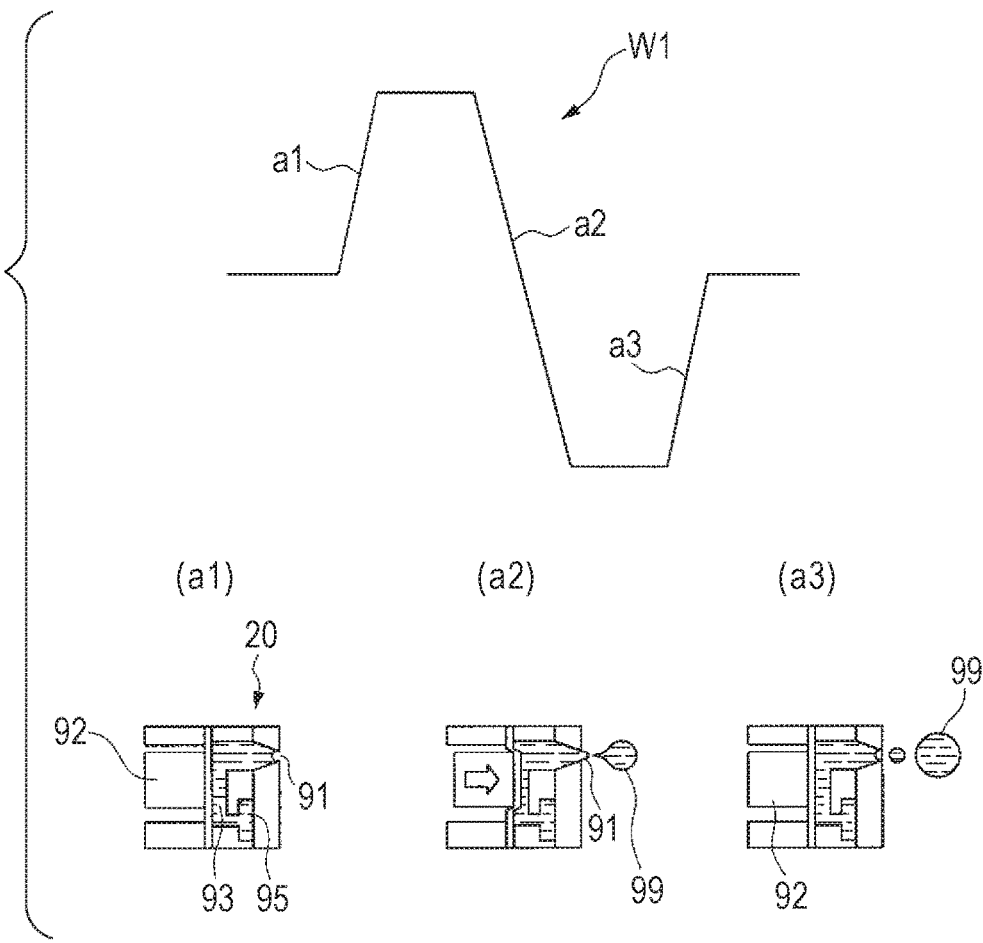
FIG. 13 is a diagram illustrating a driving voltage waveform and an operation of a piezoelectric element in the liquid droplet ejection head of FIG. 12.

FIG. 13 is a schematic view showing a driving voltage waveform W1 of the piezoelectric element and the operation of the liquid droplet ejection head 66 according to the driving voltage. Hereinafter, a case in which the driving voltage of the waveform W1 is applied to the pair of electrodes constituting the piezoelectric element 92 will be described. First, in positive gradient portions a1 and a3, the piezoelectric element 92 contracts, the volume of the ink chamber 93 is increased, and then ink flows from the reservoir 95 into the ink chamber 93. Further, in a negative gradient portion a2, the piezoelectric element 92 expands, the volume of the ink chamber 93 is decreased, and then a pressed ink 99 is ejected from the nozzle 91. The coating amount of ink is determined according to the amplitude of the driving voltage waveform W1 or the number of application times.

Moreover, a driving method of the liquid droplet ejection head 66 is not limited to a piezoelectric jet type using the piezoelectric element 92. For example, a thermal ink jet type using thermal expansion may be adopted. Further, as a unit for coating liquid crystal, in addition to an ink jet head, other coating units may be used. As a liquid crystal coating unit, other than the ink jet head, for example, a dispenser may be adopted. The dispenser has a large-diameter nozzle, as compared with the ink jet head, and thus liquid crystal with high viscosity can be ejected.

(3) Detailed Description of Manufacturing Method of Liquid Crystal Device

Next, a process of manufacturing the liquid crystal device 100 by using the device manufacturing apparatus 61 will be described with reference to FIGS. 14A to 18C.

Hereinafter, under an assumption that the pixel electrodes 9 and 31, and the like described in FIG. 7A have already been formed in the mother substrate 10' for a TFD substrate and the mother substrate 20' for a counter substrate, the description will be given.

Figure 14A:
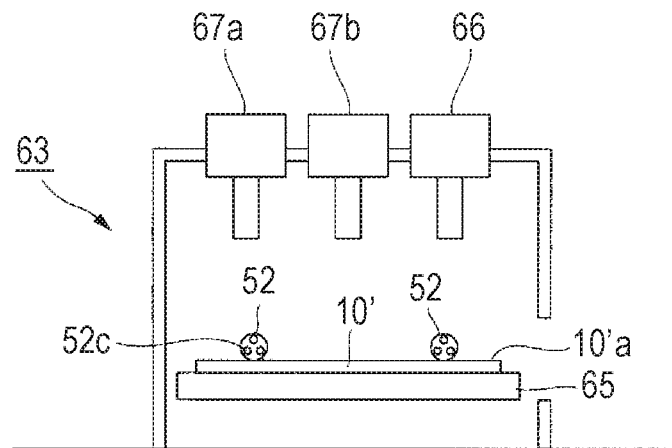
FIG. 14A is a diagram illustrating a method of manufacturing a liquid crystal device according to the embodiment of the invention.

First, as shown in FIG. 14A, the mother substrate 10' for a TFD substrate, on which the pixel electrodes 31 and the like are formed, is transported by the substrate load/unload unit 62, and is loaded on the table 65 of the material supply unit 63 while turning a sealing surface 10'a upward. Subsequently, while the table 65 is moved, the sealing materials are coated on the mother substrate 10' for a TFD substrate from the sealing material coating units 67a and 67b, such that the sealing member 52 is formed on the mother substrate 10' for a TFD substrate (sealing member forming process). Here, the sealing member 52 is formed by the insulating sealing member 52a and the conductive sealing member 52b. The insulating sealing member 52a is coated from the sealing material coating unit 67a, and the conductive sealing member 52b is coated from the sealing material coating unit 67b.

Here, a method of forming the sealing member 52 will be described in detail.

Figure 17A:
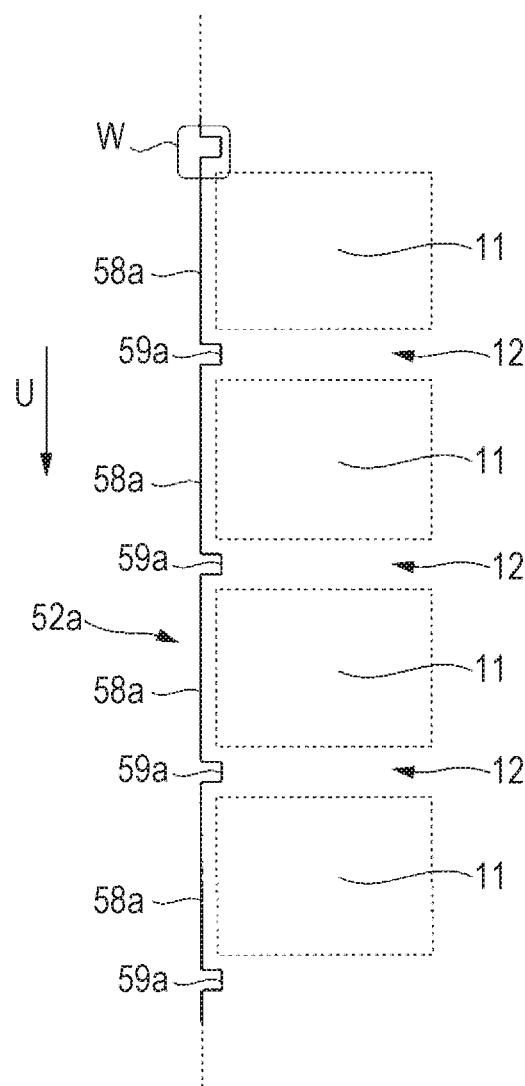
FIG. 17A is a diagram showing a method of forming a sealing member in a method of manufacturing a liquid crystal device according to the embodiment of the invention.
Figure 17B:
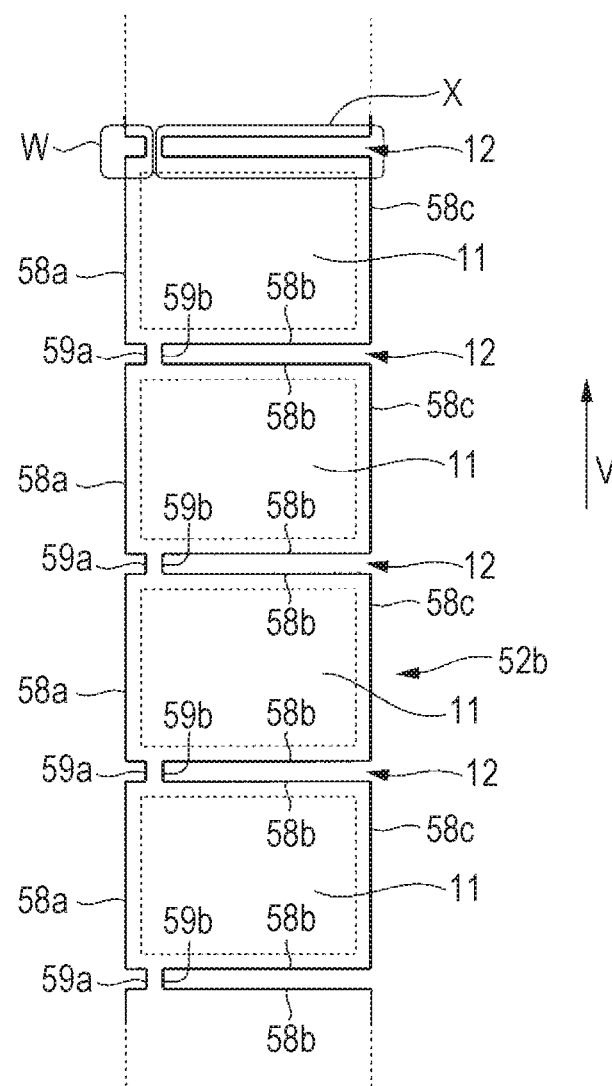
FIG. 17B is a diagram showing a method of forming a sealing member in a method of manufacturing a liquid crystal device according to the embodiment of the invention.
Figure 18A:
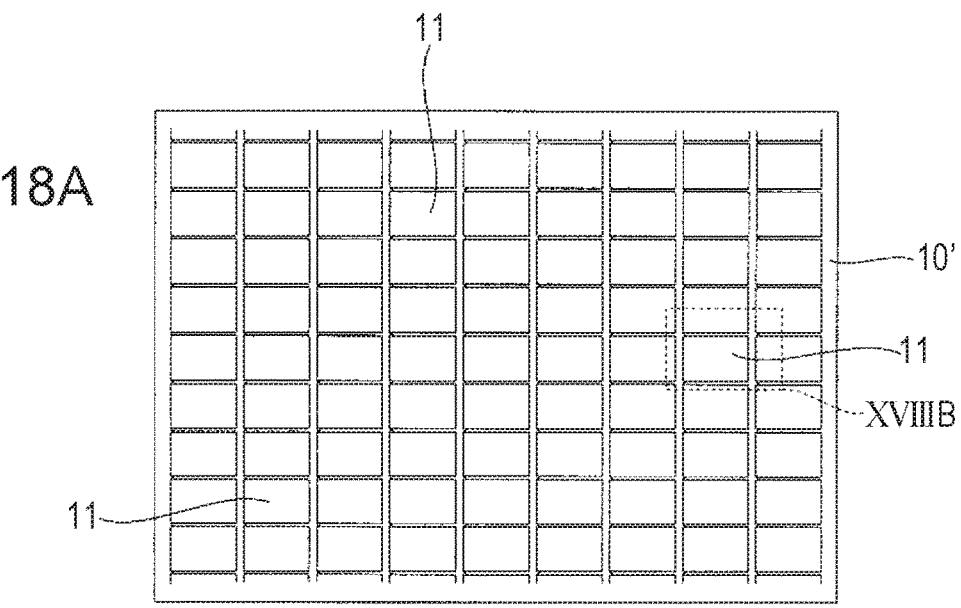
FIG. 18A is a diagram showing the appearance of a mother substrate in a method of manufacturing a liquid crystal device according to the embodiment of the invention.
Figure 18B:
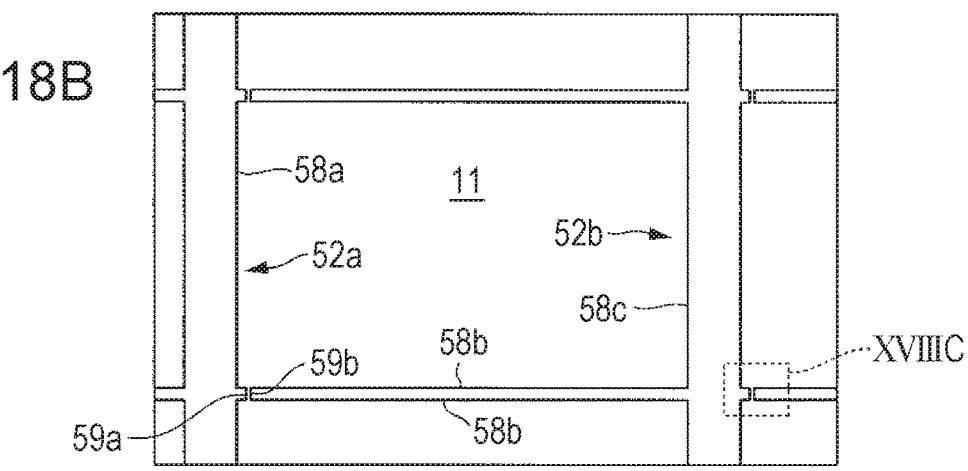
FIG. 18B is a diagram showing the appearance of a mother substrate in a method of manufacturing a liquid crystal device according to the embodiment of the invention.
Figure 18C:
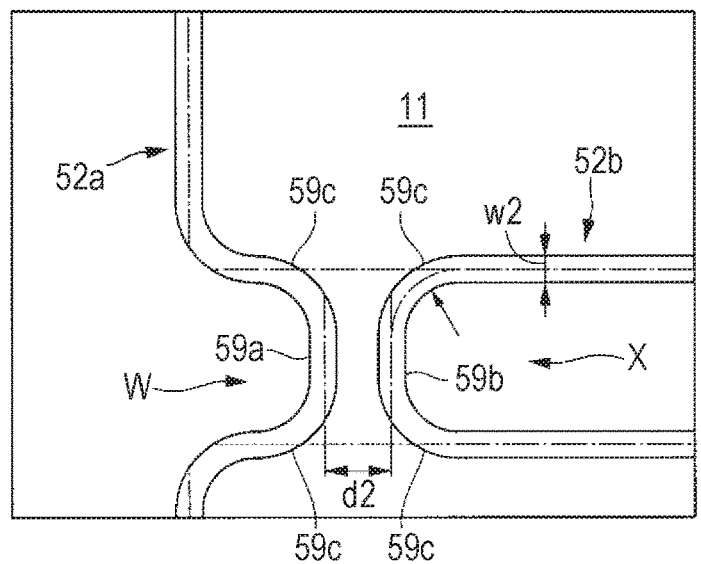
FIG. 18C is a diagram showing the appearance of a mother substrate in a method of manufacturing a liquid crystal device according to the embodiment of the invention.

FIGS. 17A and 17B are plan views illustrating the method of forming the sealing member 52. FIGS. 18A to 18C are plan views showing the sealing member formed on the mother substrate. FIG. 18A is a diagram showing the appearance of the mother substrate, FIG. 18B is a diagram of a portion indicated by a symbol E in FIG. 18A on a magnified scale, and FIG. 18C is a diagram of a portion indicated by a symbol F in FIG. 18B on a magnified scale.

As shown in FIG. 17A, the insulating sealing member 52a is coated on the mother substrate 10' for a TFD substrate in a direction indicated by a symbol U (second sealing member forming process). Here, as described above, the plurality of TFD formation regions 11 and the mutual boundary portions 12 are formed on the mother substrate 10' for a TFD substrate, and then the insulating sealing member 52a is continuously and collectively coated to cover the TFD formation regions 11 and the mutual boundary portions 12. Further, the direction indicated by the symbol U represents the same direction as the arrangement direction of the plurality of TFD formation regions 11.

Here, when the insulating sealing member 52a is coated and formed, a first side 58a, which is a part of the ring-shaped portion 58, is formed on a lateral side of the TFD formation region 11. Further, in the mutual boundary portion 12, a first sealing layer 59a, which is formed so as to be continuous with respect to the first side 58a, is formed. Here, the first sealing layer 59a is formed in an indented portion W which is indented toward the TFD formation region 11 from an extended axis direction (symbol U) of the first side 58a in the mutual boundary portion 12. The indented portion W is formed in a so-called 'U' shape.

Next, as shown in FIG. 17B, the conductive sealing member 52b is coated on the mother substrate 10' for a TFD substrate in a direction indicated by a symbol V (first sealing member forming process). In this process, like the insulating sealing member 52a, the conductive sealing member 52b is continuously and collectively coated to cover the plurality of TFD formation regions 11 and the mutual boundary portions 12. Further, the direction indicated by the symbol V represents the same direction as the arrangement direction of the plurality of TFD formation regions 11.

Here, when the conductive sealing member 52b is coated and formed, a second side 58b, which is a part of the ring-shaped portion 58, is formed in an axis direction perpendicular to the extended axis (symbol V) of the first side 58a, and a third side 58c is formed on a lateral side of the TFD formation region 11 to face the first side 58a. Further, in the mutual boundary portion 12, a second sealing layer 59b, which is formed so as to be continuous with respect to the second side 58b, is formed. Here, the second sealing layer 59b is formed in an indented portion X which is indented toward the TFD formation region 11 from an extended axis direction of the third side 58c in the mutual boundary portion 12. The indented portion X is in a so-called 'U' shape.

Further, the first sealing layer 59a and the second sealing layer 59b are formed to face each other. Accordingly, the indented portions W and X having the U shapes face each other. Further, the insulating sealing member 52a formed in such a manner constitutes a part of the ring-shaped portion 58, and the conductive sealing member 52b constitutes the remaining parts of the ring-shaped portion 58. In addition, the first sealing layer 59a and the second sealing layer 59b form the junction portion 59 formed in the mutual boundary portion 12 through the subsequent bonding process.

Moreover, in the present embodiment, the insulating sealing member 52a is coated in the direction indicated by the symbol U, and the conductive sealing member 52b is coated in the direction indicated by the symbol V opposite to the direction indicated by the symbol U, but the invention is not limited to this configuration. For example, the insulating sealing member 52a and the conductive sealing member 52b may be coated and formed in the same direction.

Further, in the present embodiment, as indicated by the symbols U and V, the insulating sealing member 52a and the conductive sealing member 52b are formed in the vertical directions of the paper, but the sealing members 52a and 52b may be formed in the horizontal directions of the paper. In any case, the insulating sealing member 52a and the conductive sealing member 52b are formed in the arrangement direction of the plurality of TFD formation regions 11.

Further, in the present embodiment, the line width of each of the sealing members 52a and 52b is uniform, but the line width may be different according to a portion where each of the sealing members 52a and 52b is formed or a shape of the junction portion to be formed by bonding.

With such a method of forming the sealing member 52, the plurality of TFD formation regions 11, in which the insulating sealing member 52a and the conductive sealing member 52b are coated and formed, are formed on the mother substrate 10' for a TFD substrate shown in FIG. 18A. In addition, as shown in FIG. 18B, a part of the TFD formation region 11 is formed by the insulating sealing member 52a and remaining parts thereof are formed by the conductive sealing member 52b. Accordingly, the ring-shaped portion 58 having the sealing members 52a and 52b is formed. Further, as shown in FIG. 18C, the insulating sealing member 52a and the conductive sealing member 52b have the first sealing layer 59a and the second sealing layer 59b which face each other at the indented portions W and X, respectively. Each of the first sealing layer 59a and the second sealing layer 59b has symmetrical curved portions 59c. As described below, when the mother substrate 10' for a TFD substrate and the mother substrate 20' for a counter substrate are bonded to each other, the first sealing layer 59a and the second sealing layer 59b are crushed and joined, such that the junction portion 59 shown in FIG. 4 is formed.

Next, the shape sizes of the first sealing layer 59a and the second sealing layer 59b will be described with reference to FIG. 18C. Hereinafter, it is defined that R2 is the radius of the curved portion 59c, d2 is the distance between central lines at a region where the first sealing layer 59a and the second sealing layer 59b are closest to each other, and w2 is the width of the sealing member 52a or 52b after the bonding process. If doing so, in the present embodiment, the following relationship is established.

$$0 \le d2 \le 0.8 \times w2 \quad \text{Equation 15}$$

Further, the following relationship is established.

$$(R2/w2) \le -1.2 \times (d2/w2) + 2.0 \quad \text{Equation 16}$$

Further, the following relationship is established.

$$(R2/w2) \le -(d2/w2) + 1.2 \quad \text{Equation 17}$$

$$(R2/w2) \ge -0.6 \times (d2/w2) + 0.4 \quad \text{Equation 18}$$

By doing so, as verified with examples described below, even when a variation in size of the sealing member 52a or 52b occurs, the first sealing layer 59a and the second sealing layer 59b can be reliably joined, thereby forming the junction portion 59. Further, the sealing member 52a or 52b can be drawn at the same speed all over. Further, since a writing start portion or a writing end portion is sufficiently separated from the liquid crystal device, a complex control can be eliminated. Accordingly, drawing time can be markedly reduced to half to one-third of drawing time in the related art. In addition, thickening of the sealing member 52a or 52b toward the inside of the liquid crystal device 100 in the junction portion 59 can be solved.

Next, returning to FIGS. 14A to 14C, the method of manufacturing the liquid crystal device will be continuously described.

Figure 14B:
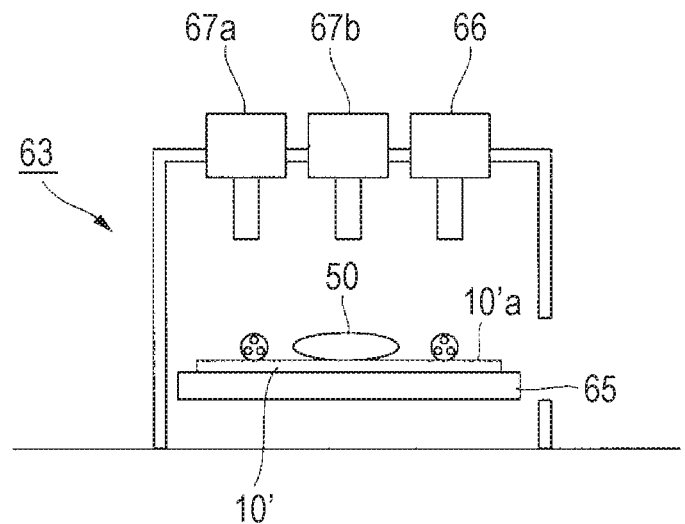
FIG. 14B is a diagram illustrating a method of manufacturing a liquid crystal device according to the embodiment of the invention.

As shown in FIG. 14B, in a state in which the mother substrate 10' for a TFD substrate is supplied onto the table 65 in the material supply unit 63, liquid crystal 50 is dropped from the liquid droplet ejection head 66. Specifically, when the table 65 is moved while turning the sealing surface 10'a upward, liquid crystal is ejected and dropped from the liquid droplet ejection head 66, such that liquid crystal 50 is disposed at a predetermined position on the sealing surface 10'a. Liquid crystal 50 is dropped in the ring-shaped portion 58 for each TFD formation region 11.

Further, in the present embodiment, viscosity of liquid crystal to be dropped on the sealing surface 10'a of the mother substrate 10' for a TFD substrate is preferably in a range of 130 Pa-s to 250 Pa-s. With viscosity of liquid crystal in the above-described range, liquid crystal 50 can be effectively prevented from sinking into an adhesive region of the sealing member 52a or 52b and the mother substrate 10' for a TFD substrate, such that the mother substrates 10' and 20' can be reliably bonded to each other.

Figure 14C:
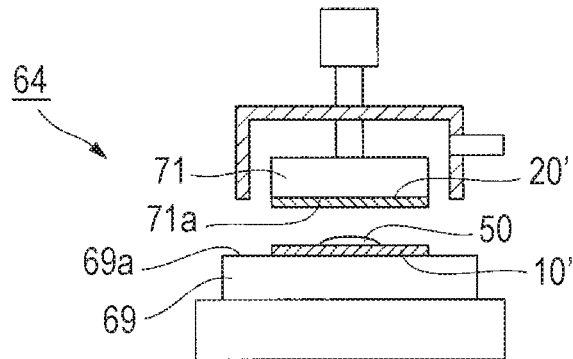
FIG. 14C is a diagram illustrating a method of manufacturing a liquid crystal device according to the embodiment of the invention.

Next, as shown in FIG. 14C, the mother substrate 20' for a counter substrate is transported and turned over, and is loaded on the upper chuck unit 71 of the substrate bonding unit 64 by the substrate load/unload unit 62. Next, the mother substrate 20' for a counter substrate is held on the holding surface 71a by the holding mechanism.

On the other hand, the mother substrate 10' for a TFD substrate, on which the sealing members 52a and 52b and liquid crystal 50 are disposed, is transported and loaded on the lower chuck unit 69 of the substrate bonding unit 64 by the substrate load/unload unit 62, and is held on the holding surface 69a by the holding mechanism.

In the present embodiment, the load of the mother substrate 20' for a counter substrate on the substrate bonding unit 64 is performed prior to the load of the mother substrate 10' for a TFD substrate. Accordingly, in a state in which cleanliness of the sealing surfaces 10'a and 20'a of the mother substrate 10' for a TFD substrate and the mother substrate 20' for a counter substrate is maintained, both mother substrates 10'a and 20' are bonded. If the load of the mother substrate 10' for a TFD substrate to be held in the lower chuck unit 69 on the substrate bonding unit 64 is performed first, when the mother substrate 20' for a counter substrate is loaded on the upper chuck unit 71, a foreign substance may be accumulated onto the mother substrate 10' for a TFD substrate disposed previously or liquid crystal 50 disposed on the sealing surface 10'a.

Moreover, in the present embodiment, though the disposition process of the sealing members 52a and 52b onto the mother substrate 10' for a TFD substrate and the disposition process of liquid crystal 50 are performed by a single material supply unit 63, the disposition processes of the sealing members 52a and 52b and liquid crystal 50 may be performed by two material supply units 63. In this case, since the two processes can be performed in parallel, a throughput can be enhanced.

Further, in the present embodiment, the sealing members 52a and 52b are formed on the mother substrate 10' for a TFD substrate, but the sealing members 52a and 52b may be formed on the mother substrate 20' of a counter substrate. In this case, each of the sealing members 52a and 52b is continuously and collectively formed to cover the plurality of counter electrode formation regions 21 and the mutual boundary portions 22. Further, in this case, the turning-over operation of the mother substrate 20' for a counter substrate by the substrate load/unload unit 62 is preferably performed just after the substrate is discharged from the material supply unit 63. The sealing members 52a and 52b spread on the mother substrate 20' for a counter substrate as time lapses after coating, such that a coating height is lowered. In particular, when viscosity of the sealing member 52 is equal to or less than 200,000 cps, the change in coating height becomes conspicuous. Accordingly, when the mother substrate 20' for a counter substrate is turned over and held just after coating of the sealing members 52a and 52b, the spread of the sealing members 52a and 52b can be suppressed, and 'dripping' of the sealing material can be reduced. As a result, bonding strength of the mother substrate 20' for a counter substrate and the mother substrate 10' for a TFD substrate can be maintained, and thus a liquid crystal device having excellent reliability can be manufactured.

Further, one of the sealing members 52a and 52b may be formed on the mother substrate 10' for a TFD substrate, and the other may be formed on the mother substrate 20' for a counter substrate. In this case, as described above, the mother substrate 10' for a TFD substrate and the mother substrate 20' for a counter substrate are bonded, while reducing 'dripping' of the sealing material. Further, bonding is performed after positioning is performed such that the positions of the sealing members 52a and 52b are aligned with each other.

Figure 15A:
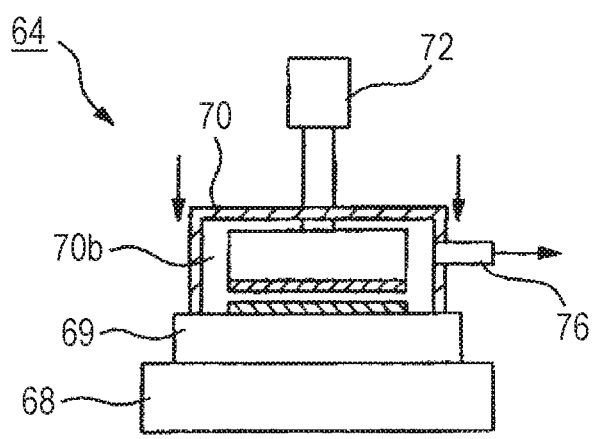
FIG. 15A is a diagram illustrating a method of manufacturing a liquid crystal device according to the embodiment of the invention.

Subsequently, as shown in FIG. 15A, the vacuum chamber 70 descends to be brought into contact with the lower chuck unit 69, and the housing space 70b is sealed in a sealed state. After the housing space 70b is in the sealed state, the housing space 70b becomes substantially a vacuum state (1.33 Pa to $1.33 \times 10^{-2}$ Pa) through negative-pressure suction from the exhaust portion 76.

Figure 15B:
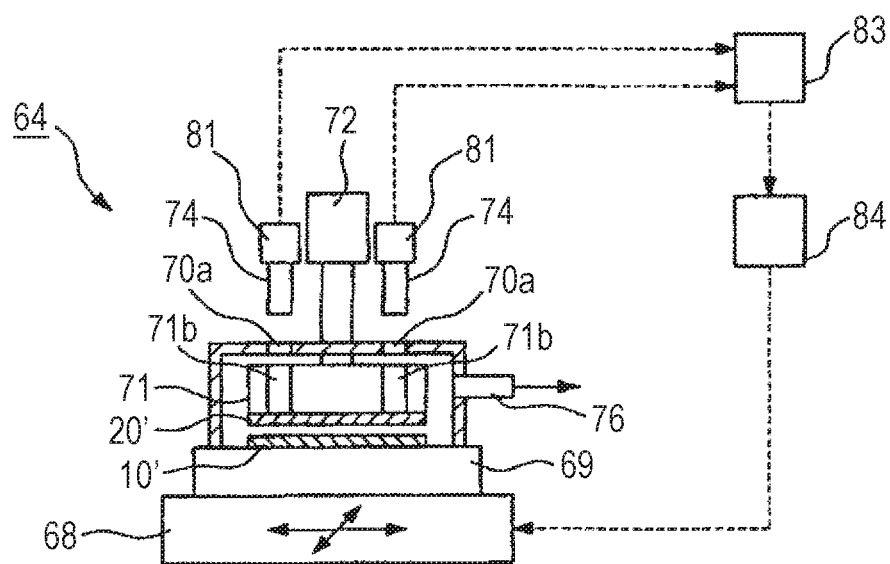
FIG. 15B is a diagram illustrating a method of manufacturing a liquid crystal device according to the embodiment of the invention.

After the housing space 70b becomes substantially the vacuum state, as shown in FIG. 15B, the alignment marks (not shown) formed in the mother substrate 20' for a counter substrate and the mother substrate 10' for a TFD substrate are magnified by use of the microscopes 74 for bonding and are captured by the CCD cameras 81. Image data of the alignment marks captured by the CCD cameras 81 is input to the image processing unit 83, and then relative positions of the mother substrate 20' for a counter substrate and the mother substrate 10' for a TFD substrate are detected. The control unit 84 drives the table 68 so as to horizontally move the mother substrate 20' for a counter substrate on the basis of the relative positions detected by the image processing unit 83 and positions the mother substrate 20' for a counter substrate such that a deviation in relative position with respect to the mother substrate 10' for a TFD substrate is within ±10 μm.

Moreover, drawing the vacuum in the housing space 70*b* and positioning of the mother substrates 10' and 20' may be simultaneously performed in parallel, or positioning may be performed first and then drawing the vacuum may be performed subsequently. When drawing the vacuum and positioning are simultaneously performed, manufacturing time can be reduced.

Further, in the upper chuck unit 71, through holes 71*b* are formed just below the microscopes 74 for bonding and the inspection windows 70*a*. Via the through holes 71*b*, the alignment marks of the individual mother substrates 10' and 20' are detected.

Figure 15C:
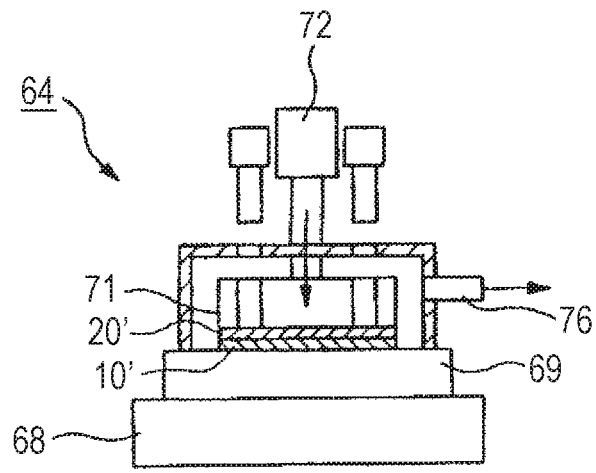
FIG. 15C is a diagram illustrating a method of manufacturing a liquid crystal device according to the embodiment of the invention.

After the mother substrates 10' and 20' are positioned, as shown in FIG. 15C, the upper chuck unit 71 descends (relative movement) by the descending mechanism 72, such that the mother substrates 10' and 20' facing each other are bonded to each other. In addition, the upper chuck unit 71 descends toward the lower chuck unit 69 so as to press the mother substrates 10' and 20', such that the sealing member 52 is compressed to a predetermined thickness.

If the mother substrates 10' and 20' are completely bonded to each other, ultraviolet rays are irradiated by the UV irradiation unit 82 so as to temporarily cure the sealing member 52 and to increase viscosity of the sealing material.

Moreover, pressing after the mother substrates 10' and 20' are bonded to each other may be not performed according to a manufacturing process or the selection of the sealing members 52*a* and 52*b* or the like. Further, similarly, temporary curing of the sealing member 52 by the UV irradiation unit 82 may be not performed according to the sealing member 52.

Further, after bonding and before precise positioning to be described below, occurrence of a positional deviation of both substrates is expected. When deviation width and direction are statistically expected, these may be offset in advance such that the positional relationship of the mother substrates 10' and 20' after the occurrence of the positional deviation falls within the above-described range, and the positioning may be performed.

Figure 16A:
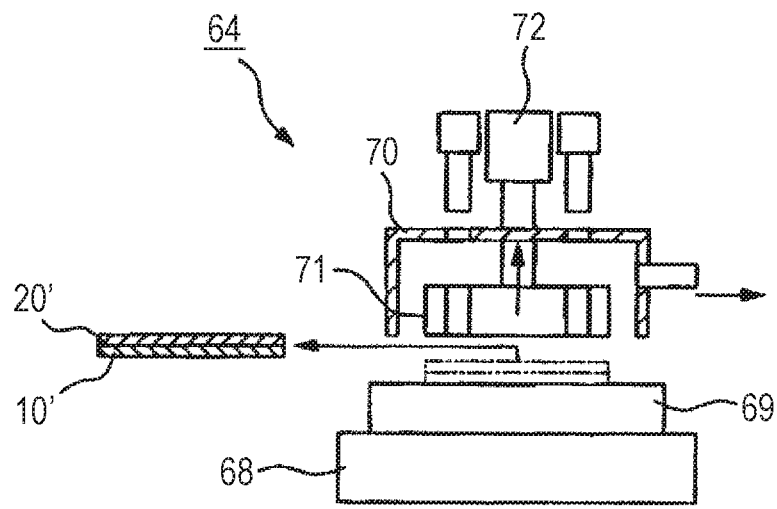
FIG. 16A is a diagram illustrating a method of manufacturing a liquid crystal device according to the embodiment of the invention.

Subsequently, air is introduced into the housing space 70*b*, and the housing space 70*b* returns from the vacuum state back to the air pressure. If the housing space 70*b* of the vacuum chamber 70 is in the air pressure, both mother substrates 10' and 20' are pressed, such that the sealing member 52 is further compressed. Subsequently, holding of the upper chuck unit 71 and the lower chuck unit 69 is released, and, as shown in FIG. 16A, the vacuum chamber 70 ascends. Next, the substrate (in this case, the liquid crystal device 100 with the mother substrates 10' and 20' bonded to each other) disposed on the lower chuck unit 69 in a not-held state is unloaded by the substrate load/unload unit 62.

Figure 16B:
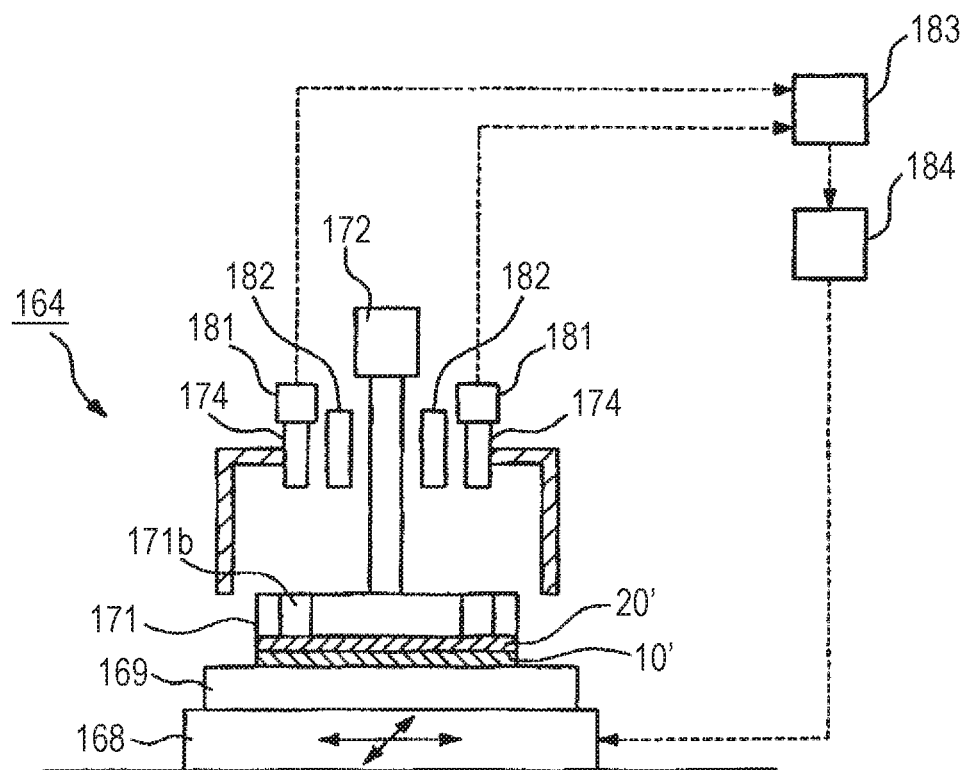
FIG. 16B is a diagram illustrating a method of manufacturing a liquid crystal device according to the embodiment of the invention.

Both mother substrates 10' and 20' bonded to each other is transported to the precise alignment unit 164 by the substrate load/unload unit 62 and, as shown in FIG. 16B, is loaded such that the mother substrate 20' for a counter substrate turns toward the upper chuck unit 171 and the mother substrate 10' for a TFD substrate turns toward the lower chuck unit 169. The upper chuck unit 171 and the lower chuck unit 169 vacuum-attracts the mother substrate 20' for a counter substrate and the mother substrate 10' for a TFD substrate by attraction mechanisms, respectively.

If the mother substrate 10' for a TFD substrate and the mother substrate 20' for a counter substrate are completely held, under the air pressure, the alignment marks (not shown) formed in both mother substrates 10' and 20' are captured by the CCD cameras 181 and 181 via the microscopes 174 and 174 for alignment. Image data of the alignment marks captured by the CCD cameras 181 is input to the image processing unit 183, and the relative positions of the mother substrate 20' for a counter substrate and the mother substrate 10' for a TFD substrate are detected. The control unit 184 drives the table 168 so as to precisely position on the basis of the relative positions detected by the image processing unit 183 such that the deviation in relative position of the mother substrate 20' for a counter substrate and the mother substrate 10' for a TFD substrate is within ±1 μm.

Further, in the upper chuck unit 171, through holes 171*b* are formed at positions just below the microscopes 174 for alignment. Via the through holes 171*b*, the alignment marks of the individual mother substrates 10' and 20' are detected.

After both mother substrates 10' and 20' are precisely positioned, the upper chuck unit 171 further descends (relative movement) by the pressing mechanism 172, such that the mother substrates 10' and 20' disposed to face each other are pressed. If doing so, the sealing member 52 is further compressed, the gap control materials 52*c* included in the sealing members 52*a* and 52*b* are brought into contact with the mother substrates 10' and 20', such that the gap between both mother substrates 10' and 20' is adjusted to be equal to or less than about 3 μm.

Moreover, as the pressing method by the pressing mechanism 172, various pressing methods, such as a pressing method in which pressing force is gradually increased, a pressing method in which pressing force is continuously increased, an S-shaped pressing method in which pressing force at the time of pressing is temporarily maintained and then pressing force is increased, and the like, can be used.

Further, as for regions where the upper chuck unit 171 and the lower chuck unit 169 are brought into contact with and press the mother substrate 20' for a counter substrate and the mother substrate 10' for a TFD substrate, an entire contact surface may be pressed or only regions where the gap control materials 52*c* included in the sealing member 52 are disposed may be pressed. In a method in which only the disposition regions of the gap control materials 52*c* are pressed, regions where the gap control materials 52*c* are not pressed. Accordingly, the gap between the substrates due to bending of both mother substrates 10' and 20' can be prevented from narrowing or constituent members by the spacers disposed on the substrate can be prevented from being damaged.

If the gap between both mother substrates 10' and 20' is adjusted, the ultraviolet rays are irradiated onto the sealing member 52 by the UV lamp 182, and the sealing member 52 is cured, such that the gap between both mother substrates 10' and 20' is maintained.

Moreover, the irradiation of the UV lamp 182 may be performed just after pressing force of the pressing mechanism 172 reaches a predetermined pressure, or may be performed after liquid crystal 50 spreads to every TFD formation region 11 left behind for predetermined time. That is, the irradiation can be performed with various timings. According to the material to be used, in order to obtain required adhesive force, a process of curing the sealing member may be further provided.

If the sealing members 52*a* and 52*b* are completely cured, the upper chuck unit 171 and the lower chuck unit 169 open sequentially or simultaneously, and then the liquid crystal device 100 disposed on the lower chuck unit 169 in the non-held state is unloaded by the substrate load/unload unit 62.

Next, as shown in FIG. 7C, the mother substrates 10' and 20' are cut out, such that the manufacture of the liquid crystal device 100 is completed.

Moreover, in the present embodiment, the bonding process is performed according to the following steps [1] to [8].
[1] Set the mother substrates 10' and 20' on the table
[2] Draw the vacuum in the housing space 70b
[3] Position the mother substrates 10' and 20'
[4] Temporarily fix by UV irradiation
[5] Open the housing space 70b to air
[6] Move to the precise alignment unit 164
[7] Precisely position the mother substrates 10' and 20'
[8] Fix by UV irradiation Further, the invention is not limited to this bonding process. For example, a bonding process according to the following steps [1] to [11] may be performed.
[1] Set the mother substrates 10' and 20' on the table
[2] Draw the vacuum in the housing space 70b
[3] Descend the upper chuck unit 71 to a constant position
[4] Position the mother substrates 10' and 20'
[5] Descend the upper chuck unit 71 further
[6] Precisely position the mother substrates 10' and 20'
[7] Press and fix
[8] Temporarily fix by UV irradiation
[9] Turn off electrostatic chuck and ascend the upper chuck unit 71
[10] Open the housing space 70b to air
[11] Fix by UV irradiation In such a bonding process according to the steps [1] to [11], precise alignment is not performed in air, but the mother substrates 10' and 20' can be reliably bonded to each other.

As described above, in the liquid crystal device 100 and the method of manufacturing a liquid crystal device of the present embodiment, since the sealing members 52a and 52b constitute the ring-shaped portion 58 and the junction portion 59, the ring-shaped portion 58 is blocked by the part of the junction portion 59. Therefore, leakage of the liquid crystal layer 50 from the junction portion 59 can be suppressed, and reliability of the liquid crystal device 100 can be advanced. Further, since the junction portion 59 is formed toward the outside of the ring-shaped portion 58, when the bonding process is performed, the width of the junction portion 59 is increased only outside the ring-shaped portion 58, and thus the sealing members 52a and 52b can be suppressed from protruding inside the ring-shaped portion 58. Further, there is no case in which a cell gap inside the ring-shaped portion 58 is influenced, and thus the cell gap can be uniformly maintained.

Further, as compared with the related art, the width of each member of the ring-shaped portion 58 and the junction portion 59 does not need to be adjusted, and the ring-shaped portion 58 and the junction portion 59 can be formed with a member having the same width, such that the sealing members 52a and 52b can be easily formed. Therefore, the dispenser can be easily controlled, and drawing of the sealing members 52a and 52b can end in short time. Further, a variation of the amount of the sealing material remaining in the dispenser or a variation in viscosity between lots of the sealing material does not need to be regarded as questionable, and the shapes of the sealing members 52a and 52b can be easily managed.

Further, since the conductive sealing member 52b connects the conductive pad 54 and the COM electrode 57, the liquid crystal layer 50 can be held inside the ring-shaped portion 58, and the conductive pad 54 and the COM electrode 57 can be connected to each other. Further, since the insulating sealing member 52a is formed in the non-conduction region on the surfaces of the relay wiring line 55 and the SEG electrode 56, the liquid crystal layer 50 can be held in the ring-shaped portion 58, and an electrical insulation property in the non-conduction region can be obtained.

Further, with the insulating sealing member 52a and the conductive sealing member 52b, the ring-shaped portion 58 having conductivity and an electrical insulation property can be formed, and the junction portion 59 in which the members having conductivity and electrical insulation property are joined can be formed. Further, in this case, the junction portion 59 is formed between the conduction region and the non-conduction region. However, since the junction portion 59 is formed toward the outside of the ring-shaped portion 58, when the bonding process is performed, the width of the junction portion 59 is increased only outside the ring-shaped portion 58, and thus the sealing members 52a and 52b can be suppressed from protruding inside the ring-shaped portion 58. Further, there is no case in which the cell gap inside the ring-shaped portion 58 is influenced, and thus the cell gap can be uniformly maintained.

Further, when the relationship of Equations 15 to 18 is established, the first sealing layer 59a and the second sealing layer 59b can be reliably joined to each other, thereby forming the junction portion 59, regardless of the variation in size of the sealing members 52a and 52b. Further, in the related art method, the sealing members 52a and 52b in the junction portion 59 may be thickened, and the distance of the overlap portion needs to be increased in order to control thickening to the minimum. Further, the control of the device may be complicated, and then it will take a long time for drawing the sealing member. In contrast, in the present embodiment, the sealing member 52a and 52b can be drawn at the same speed all over. Further, since the writing start portion or the writing end portion is sufficiently separated from the liquid crystal device, the complex control can be eliminated. Therefore, drawing time can be markedly reduced, and thickening of the sealing members 52a and 52b toward the inside of the liquid crystal device 100 in the junction portion 59 can be solved.

Further, since the liquid crystal device 100 is manufactured by bonding and cutting out the mother substrate 10' for a TFD substrate and the mother substrate 20' for a counter substrate, a plurality of liquid crystal devices 100 can be cut out, and thus a manufacturing method having excellent productivity can be implemented.

Further, in the manufacturing method of the liquid crystal device 100, the insulating sealing member 52a is continuously and collectively coated so as to cover the TFD formation regions 11 and the mutual boundary portions 12, and the conductive sealing member 52b also is continuously and collectively coated. Therefore, excellent effects can be obtained, as compared with the related art.

Specifically, with the single process from the start of drawing of the conductive sealing member 52b to the end of drawing and the single process from the start of drawing of the insulating sealing member 52a to the end of drawing, the sealing members 52a and 52b are collectively formed with respect to the arrangement direction of the plurality of TFD formation regions 11. Accordingly, the sealing members 52a and 52b can be easily and rapidly formed, and thus a manufacturing method having excellent productivity can be implemented.

On the other hand, like the related art, when the sealing members 52a and 52b are formed for each TFD formation region 11, the start of drawing and the end of drawing of the sealing members 52a and 52b should be performed for each TFD formation region 11, and thus the start of drawing and the end of drawing should be repeatedly performed more. Accordingly, since the ejection and the non-ejection of the sealing material are continuously performed, it is difficult to cause the sealing material in the dispenser to stably flow, and the variation in the amount of the sealing material to be ejected tends to occur. Further, since the dispenser should scan the mother substrate 10' for a TFD substrate, the operation of the dispenser is complicated.

In contrast, in the present embodiment, since the conductive sealing member 52b and the insulating sealing member 52a are continuously and collectively formed in the arrangement direction of the TFD formation regions, the start of drawing and the end of drawing can be performed for each column or each row of the TFD formation regions, such that the number of starts of drawing and the number of ends of drawing can be reduced. Accordingly, the conductive sealing member 52b and the insulating sealing member 52a can be continuously and collectively formed, while causing the sealing material in the dispenser to stably flow. Further, the sealing members 52a and 52b can be formed in short time. Further, since the dispenser does not scan the mother substrate 10' for a TFD substrate in the non-ejection state, the sealing material filled in the dispenser can be prevented from being inadvertently dropped. As a result, the operation of the dispenser can be simplified, and the variation in viscosity of the sealing material or the variation in ejection amount can be suppressed.

Further, the sealing members 52a and 52b of the individual TFD formation regions 11 formed in such a method are connected to each other via the junction portion 59, and thus leakage of liquid crystal 50 in the mutual boundary portion 12 can be prevented.

Next, second to fourth embodiments of the method of manufacturing a liquid crystal device will be described.

In the following description, only different parts from the above-described embodiment will be described. The same parts or the same processes as those in the above-described embodiment are represented by the same reference numerals, and the descriptions thereof will be omitted.

Second Embodiment

Figure 19:
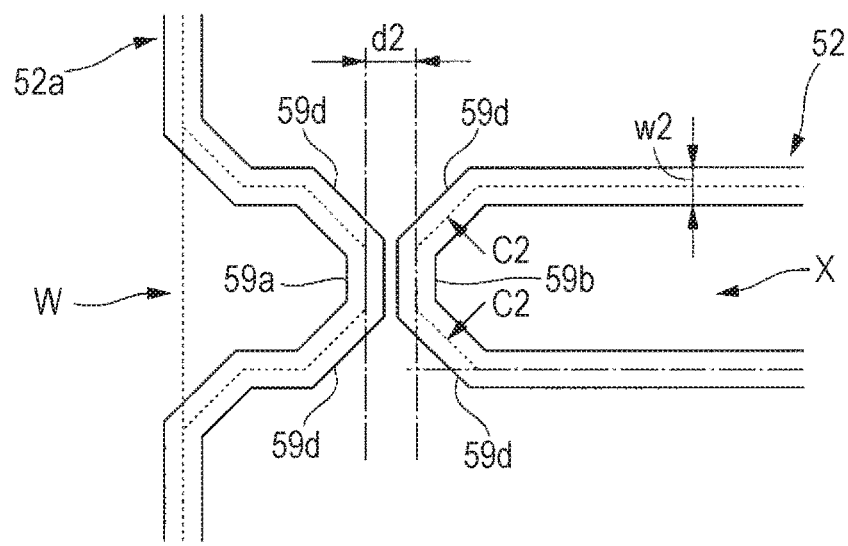
FIG. 19 is a plan view showing parts of a sealing member of a liquid crystal device according to a second embodiment of the invention.

FIG. 19 is a diagram illustrating a manufacturing method of a liquid crystal device according to the second embodiment of the invention. Further, FIG. 19 is a plan view illustrating a method of forming a sealing member 52. In addition, FIG. 19 is a diagram showing a portion indicated by a symbol F in FIG. 18B on a magnified scale.

In the first embodiment, the first sealing layer 59a and the second sealing layer 59b are configured to have the curved portions 59c. On the other hand, in the present embodiment, the first sealing layer 59a and the second sealing layer 59b are configured to have inclined portions 59d. Then, as described above, when the mother substrate 10' for a TFD substrate and the mother substrate 20' for a counter substrate are bonded to each other, the first sealing layer 59a and the second sealing layer 59b are crushed and joined, such that the junction portion 59 shown in FIG. 4 is formed.

Next, the shape sizes of the first sealing layer 59a and the second sealing layer 59b will be described with reference to FIG. 19. Hereinafter, it is defined that c2 is the chamfered amount of the inclined portion 59d, d2 is the distance between the central lines in a region where the first sealing layer 59a and the second sealing layer 59b is closest to each other, and w2 is the width of the sealing member 52a or 52b after the bonding process. If doing so, in the present embodiment, the following relationship is established.

$$0 \leq d2 \leq 0.8 \times w2 \qquad \text{Equation 19}$$

Further, the following relationship is established.

$$(c2/w2) \leq -0.5 \times (d2/w2) + 1.2 \qquad \text{Equation 20}$$

Further, the following relationship is established.

$$(c2/w2) \leq -0.5 \times (d2/w2) + 0.7 \qquad \text{Equation 21}$$

$$(c2/w2) \geq -0.5 \times (d2/w2) + 0.3 \qquad \text{Equation 22}$$

By doing so, as verified with examples described below, even when the variation in size of the sealing member 52a or 52b occurs, the first sealing layer 59a and the second sealing layer 59b can be reliably joined, thereby forming the junction portion 59. Further, the sealing member 52a or 52b can be drawn at the same speed all over. Further, since the writing start portion or the writing end portion is sufficiently separated from the liquid crystal device, the complex control can be eliminated. Accordingly, drawing time can be markedly reduced to half to one-third of drawing time in the related art. In addition, thickening of the sealing member 52a or 52b toward the inside of the liquid crystal device 100 in the junction portion 59 can be solved.

Third Embodiment

Figure 20:
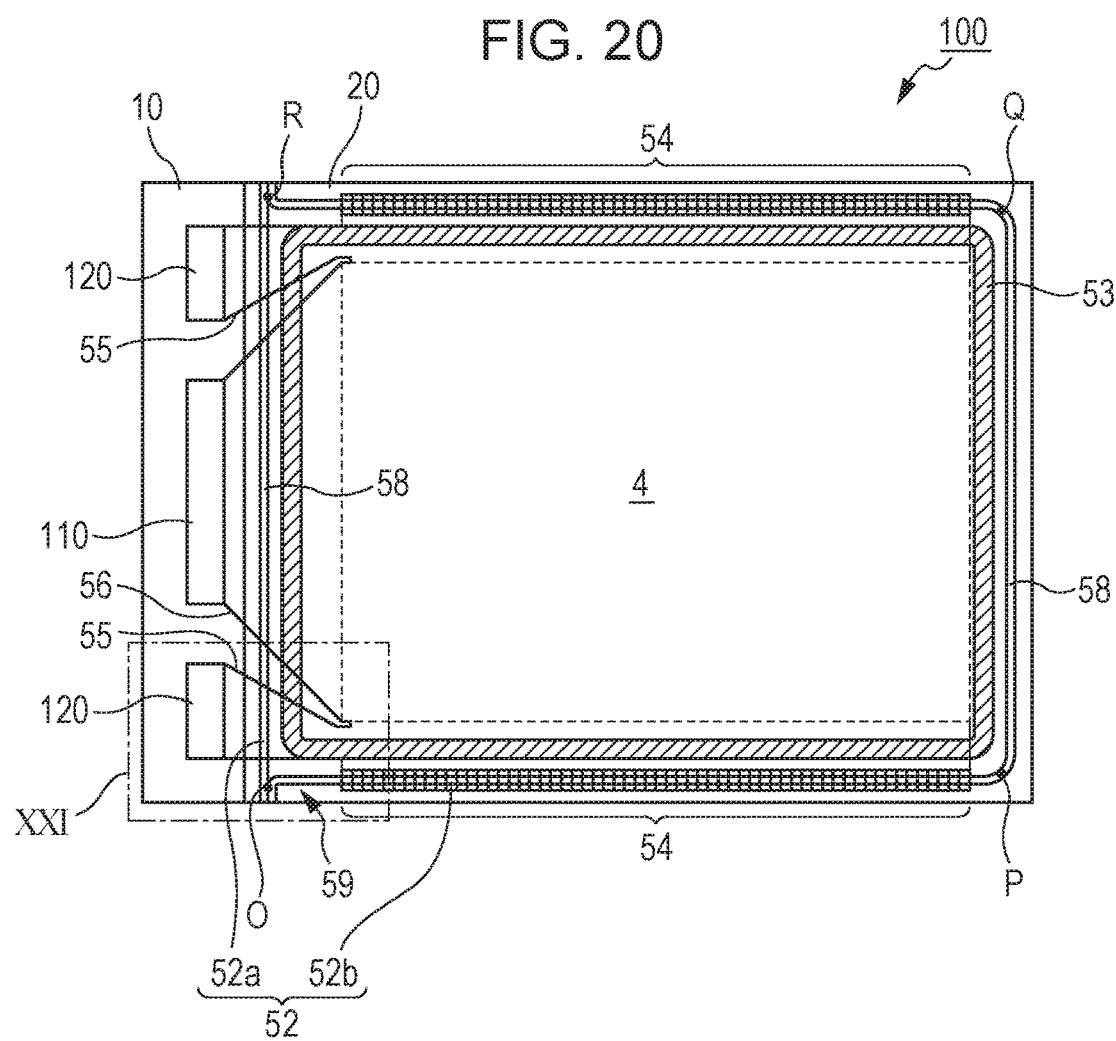
FIG. 20 is a plan view of a liquid crystal device according to a third embodiment of the invention.
Figure 21:
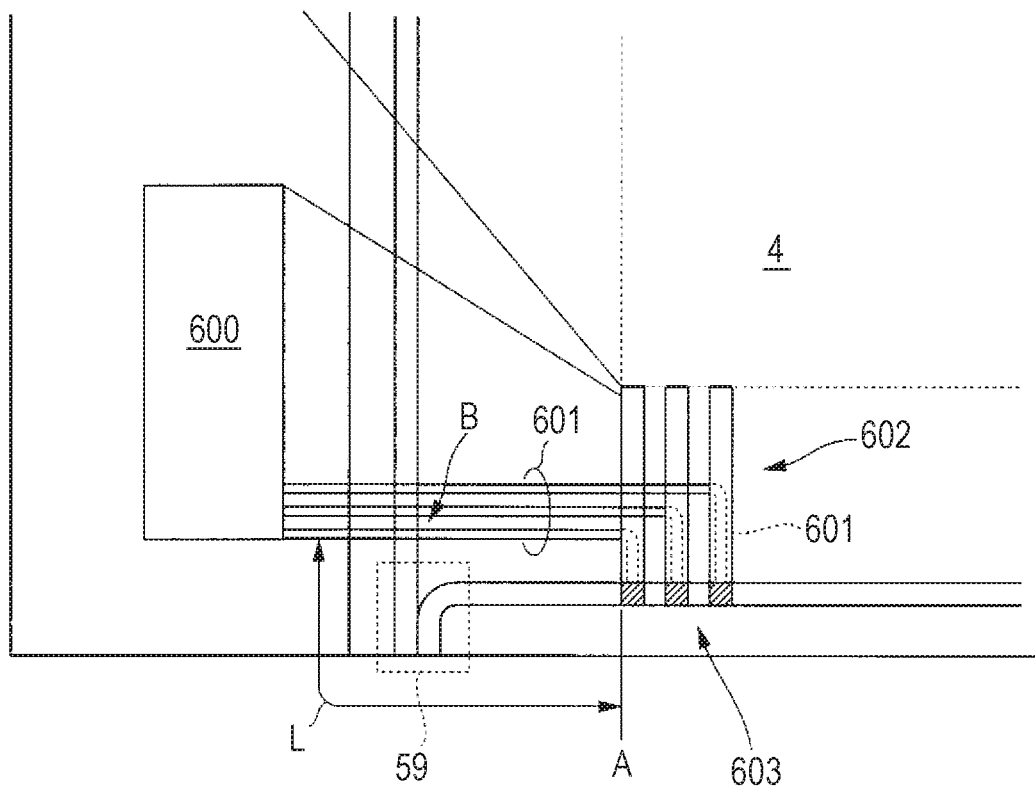
FIG. 21 is a plan view of parts of the liquid crystal device according to the third embodiment of the invention.
Figure 22:
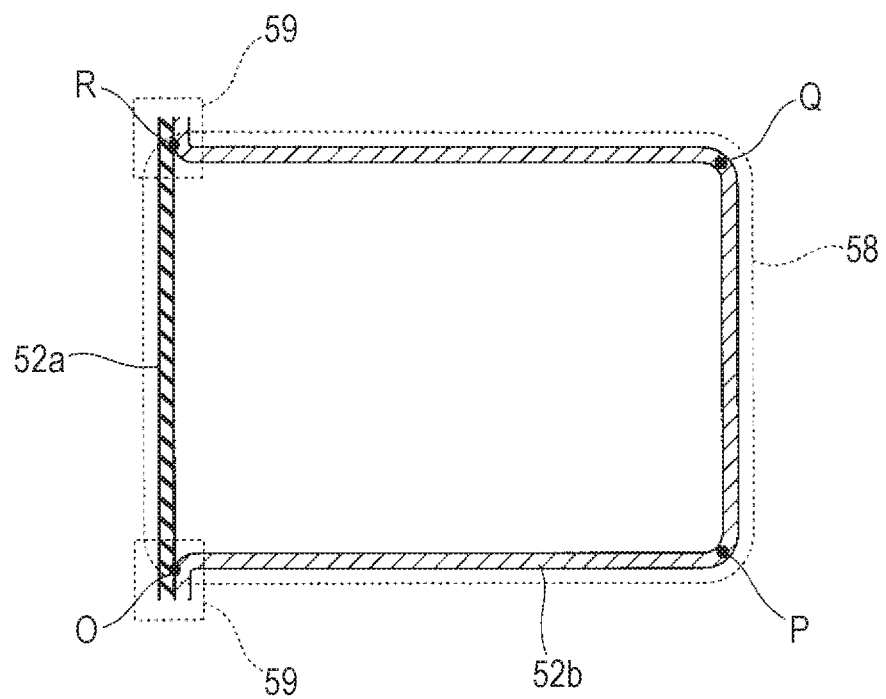
FIG. 22 is a plan view of parts of the liquid crystal device according to the third embodiment of the invention.

FIG. 20 is a diagram illustrating a manufacturing method of a liquid crystal device according to a third embodiment of the invention. Further, FIG. 20 is a plan view showing respective constituent parts of the liquid crystal device as viewed from the counter substrate. FIG. 21 is a plan view showing a region indicated by a symbol C of FIG. 20 on a magnified scale. FIG. 22 is a plan view specifically illustrating the configuration of the sealing member.

As shown in FIGS. 20 to 22, in the liquid crystal device 100 of the present embodiment, the insulating sealing member (second sealing member) 52a is linearly formed in a vertical direction of the paper. Further, at points O and R, the insulating sealing member 52a and the conductive sealing member (first sealing member) 52b are connected to each other.

Further, the insulating sealing member 52a and the conductive sealing member 52b are formed in a pattern shown in FIG. 22, and thus a single ring-shaped portion 58 that holds the liquid crystal layer 50 therein and a junction portion 59 in which the insulating sealing member 52a and the conductive sealing member 52b are joined are configured. The sealing member 52 formed in such a pattern is a formed in a closed box shape in a region on the surface of the TFD substrate 10, with no liquid crystal injection hole.

In the ring-shaped portion 58, the insulating sealing member 52a is formed to pass through points R and O in FIG. 22, and the conductive sealing member 52b is formed to pass through points O, P, Q, and R in FIG. 22.

In the junction portion 59, the insulating sealing member 52a and the conductive sealing member 52b are joined at the points O and R. Therefore, the junction portions 59 are formed at a place on an end of the side OP and at a place on an end of the side QR. That is, the junction portions 59 are individually formed on opposite sides of the ring-shaped portion 58.

Further, the junction portions 59 are formed so as to be continuous with respect to the ring-shaped portion 58 and block the ring-shaped portion 58 at the points O and R. Accordingly, the liquid crystal layer 50 held inside the ring-shaped portion 58 can be prevented from leaking outside the sealing member 52. Further, at the points O and R, parts of the individual junction portions 59 are integrated into the ring-shaped portion 58, and the other parts of the individual junction portions 59 are formed outside the ring-shaped portion 58. That is, the junction portions 59 are formed toward the outside of the ring-shaped portion 58 from the portions for blocking the ring-shaped portion 58 (points O and R). Therefore, the junction portions 59 are not formed to overlap the ring-shaped portion 58. Only the parts of the individual junction portions 59 join the ring-shaped portion 58 and the other parts thereof are formed toward the outside of the ring-shaped portion 58.

Further, as shown in FIG. 21, the junction portion 59 is formed between an end (symbol A) of the conductive pad 54 and an end (symbol B) of the relay wiring line 55 crossing the sealing member 52, that is, in a portion indicated by a symbol L. In the liquid crystal device 100 of the present embodiment, the distance of the symbol L is set to be equal to or less than 2 mm.

Further, as described below, the junction portions 59 are formed by drawing the insulating sealing member 52a and the conductive sealing member 52b from the dispenser in the non-contact state to face each other, and then pressing the sealing members 52a and 52b through the bonding process so as to contact and to be joined.

Next, a method of manufacturing a liquid crystal device according to the present embodiment will be described.

Figure 24A:
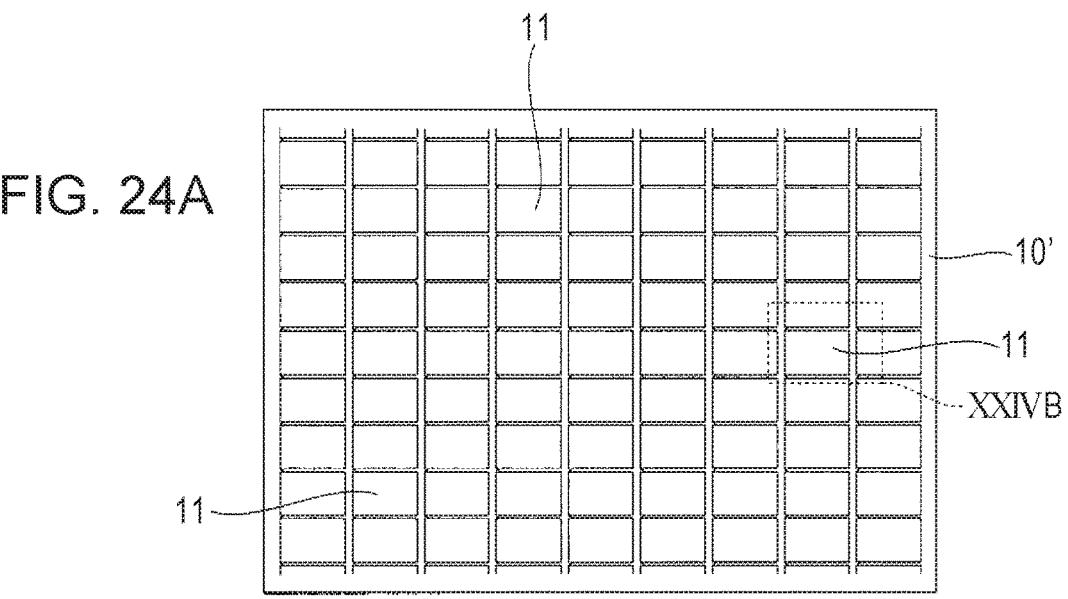
FIG. 24A is a plan view showing parts of a sealing member of the liquid crystal device according to the third embodiment of the invention.
Figure 24B:
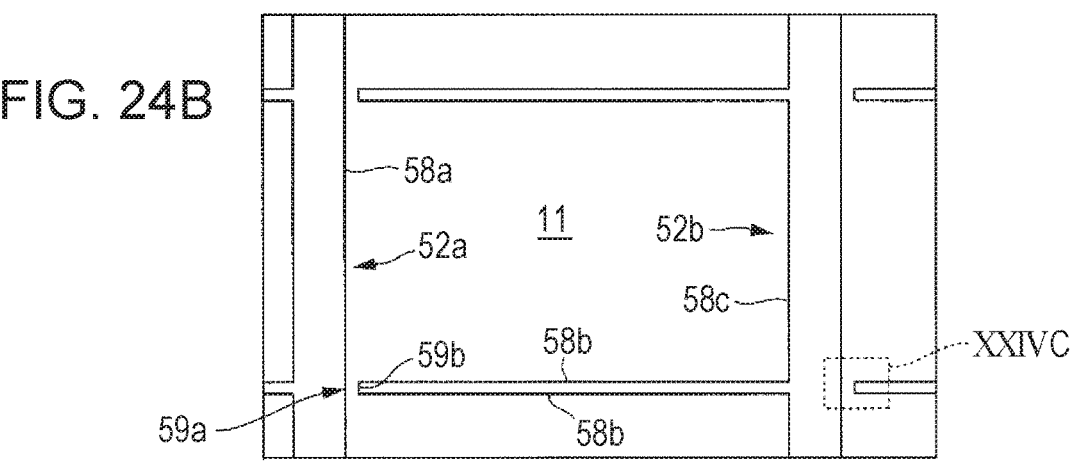
FIG. 24B is a plan view showing parts of a sealing member of the liquid crystal device according to the third embodiment of the invention.
Figure 24C:
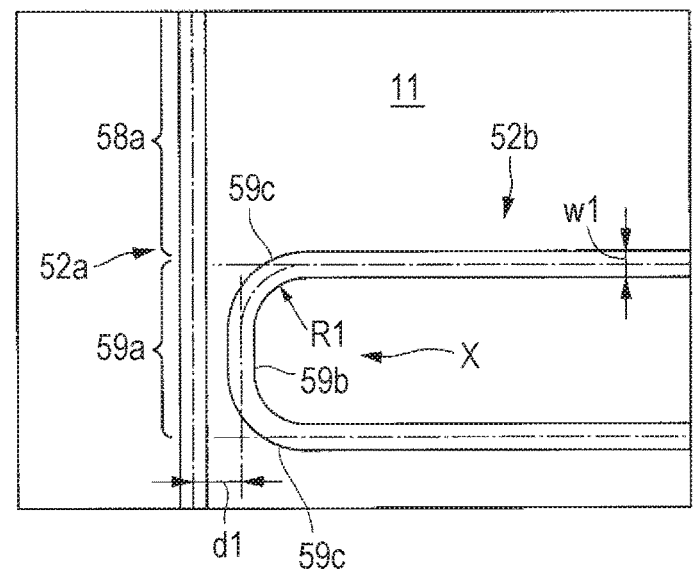
FIG. 24C is a plan view showing parts of a sealing member of the liquid crystal device according to the third embodiment of the invention.

FIGS. 23A and 23B are plan views illustrating a method of forming the sealing member 52. FIGS. 24A to 24C are plan views showing the sealing member 52 formed on the mother substrate. Specifically, FIG. 24A is a diagram showing the appearance of the mother substrate, FIG. 24B is a diagram showing a portion indicated by a symbol E of FIG. 24A on a magnified scale, and FIG. 24C is a diagram showing a portion indicated by a symbol F of FIG. 24B on a magnified scale.

As shown in FIG. 23A, the insulating sealing member 52a is coated on the mother substrate 10' for a TFD substrate in a direction indicated by a symbol U (second sealing member forming process). Here, as described above, the plurality of TFD formation regions 11 and the mutual boundary portions 12 are formed on the mother substrate 10' for a TFD substrate, and then the insulating sealing member 52a is continuously and collectively coated to cover the TFD formation regions 11 and the mutual boundary portions 12. Further, the direction indicated by the symbol U represents the same direction as the arrangement direction of the plurality of TFD formation regions 11.

Here, when the insulating sealing member 52a is coated and formed, a first side 58a, which is a part of the ring-shaped portion 58, is formed on a lateral side of the TFD formation region 11. Further, in the mutual boundary portion 12, a first sealing layer 59a, which is formed so as to be continuous with respect to the first side 58a, is formed. Here, the first sealing layer 59a is formed on a coaxial straight line (symbol U) to the first side 58a in the mutual boundary portion 12.

Next, as shown in FIG. 23B, the conductive sealing member 52b is coated on the mother substrate 10' for a TFD substrate in a direction indicated by a symbol V (first sealing member forming process). In this process, like the insulating sealing member 52a, the conductive sealing member 52b is continuously and collectively coated to cover the plurality of TFD formation regions 11 and the mutual boundary portions 12. Further, the direction indicated by the symbol V represents the same direction as the arrangement direction of the plurality of TFD formation regions 11.

Here, when the conductive sealing member 52b is coated and formed, a second side 58b, which is a part of the ring-shaped portion 58, is formed in an axis direction perpendicular to the extended axis (symbol V) of the first side 58a, and a third side 58c is formed on a lateral side of the TFD formation region 11 to face the first side 58a. Further, in the mutual boundary portion 12, a second sealing layer 59b, which is formed so as to be continuous with respect to the second side 58b, is formed. Here, the second sealing layer 59b is formed in an indented portion X which is indented toward the TFD formation region 11 from an extended axis direction of the third side 58c in the mutual boundary portion 12. The indented portion X is in a so-called 'U' shape.

Further, the first sealing layer 59a and the second sealing layer 59b are formed to face each other. Accordingly, the first sealing layer 59a formed on the coaxial straight line to the first side 58a and the indented portion X having the U shape face each other. Further, the insulating sealing member 52a formed in such a manner constitutes a part of the ring-shaped portion 58, and the conductive sealing member 52b constitutes the remaining parts of the ring-shaped portion 58. In addition, the first sealing layer 59a and the second sealing layer 59b form the junction portion 59 formed in the mutual boundary portion 12 through the subsequent bonding process.

With such a method of forming the sealing member 52, the plurality of TFD formation regions 11, in which the insulating sealing member 52a and the conductive sealing member 52b are coated and formed, are formed on the mother substrate 10' for a TFD substrate shown in FIG. 24A. In addition, as shown in FIG. 24B, a part of the TFD formation region 11 is formed by the insulating sealing member 52a and remaining parts thereof are formed by the conductive sealing member 52b. Accordingly, the ring-shaped portion 58 having the sealing members 52a and 52b is formed. Further, as shown in FIG. 24C, the insulating sealing member 52a and the conductive sealing member 52b have the first sealing layer 59a and the second sealing layer 59b which face each other, respectively. Next, when the mother substrate 10' for a TFD substrate and the mother substrate 20' for a counter substrate are bonded to each other, the first sealing layer 59a and the second sealing layer 59b are crushed and joined, such that the junction portion 59 shown in FIG. 22 is formed.

Next, the shape sizes of the first sealing layer 59a and the second sealing layer 59b will be described with reference to FIG. 24C. Hereinafter, it is defined that R1 is the radius of the curved portion 59c, d1 is the distance between the central lines at the region where the first sealing layer 59a and the second sealing layer 59b are closest to each other, and w1 is the width of the sealing member 52a or 52b after the bonding process. If doing so, in the present embodiment, the following relationship is established.

$$0 \le d1 \le 0.8 \times w1 \qquad \text{Equation 23}$$

Further, the following relationship is established.

$$(R1/w1) \le -2.0 \times (d1/w1) + 3.0 \qquad \text{Equation 24}$$

Further, the following relationship is established.

$$(R1/w1) \leq -1.7 \times (d1/w1) + 2.0 \qquad \text{Equation 25}$$

$$(R1/w1) \geq -1.2 \times (d1/w1) + 1.0 \qquad \text{Equation 26}$$

By doing so, as verified with examples described below, even when a variation in size of the sealing member 52a or 52b occurs, the first sealing layer 59a and the second sealing layer 59b can be reliably joined, thereby forming the junction portion 59. Further, the sealing member 52a or 52b can be drawn at the same speed all over. Further, since the writing start portion or the writing end portion is sufficiently separated from the liquid crystal device, the complex control can be eliminated. Accordingly, drawing time can be markedly reduced to half to one-third of drawing time in the related art. In addition, thickening of the sealing member 52a or 52b toward the inside of the liquid crystal device 100 in the junction portion 59 can be solved.

Further, since the first sealing layer 59a and the first side 58a are formed, drawing time can be reduced, as compared with a case in which the first sealing layer 59a is formed while drawing a curve or an inclined line.

Fourth Embodiment

Figure 25:
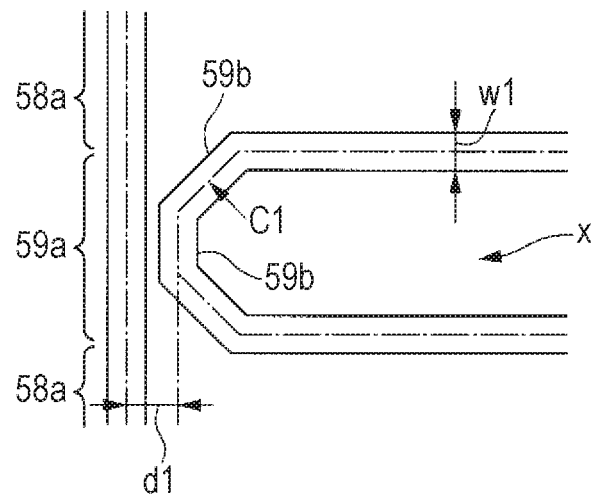
FIG. 25 is a plan view showing parts of a sealing member of a liquid crystal device according to a fourth embodiment of the invention.

FIG. 25 is a diagram illustrating a manufacturing method of a liquid crystal device according to the fourth embodiment of the invention. Further, FIG. 25 is a plan view illustrating a method of forming a sealing member 52. In addition, FIG. 25 is a diagram showing a portion indicated by the symbol F in FIG. 18B on a magnified scale.

In the third embodiment, the second sealing layer 59b is configured to have the curved portion 59c. On the other hand, in the present embodiment, the second sealing layer 59b is configured to have an inclined portion 59d. Then, as described above, when the mother substrate 10' for a TFD substrate and the mother substrate 20' for a counter substrate are bonded to each other, the first sealing layer 59a and the second sealing layer 59b are crushed and joined, such that the junction portion 59 shown in FIG. 22 is formed.

Next, the shape sizes of the first sealing layer 59a and the second sealing layer 59b will be described with reference to FIG. 25. Hereinafter, it is defined that c1 is the chamfered amount of the inclined portion 59d, d1 is the distance between the central lines in the region where the first sealing layer 59a and the second sealing layer 59b is closest to each other, and w1 is the width of the sealing member 52a or 52b after the bonding process. If doing so, in the present embodiment, the following relationship is established.

$$0 \leq d1 \leq 0.8 \times w1 \qquad \text{Equation 27}$$

Further, the following relationship is established.

$$(c1/w1) \leq -0.5 \times (d1/w1) + 1.2 \qquad \text{Equation 28}$$

Further, the following relationship is established.

$$(c1/w1) \leq -0.5 \times (d1/w1) + 0.7 \qquad \text{Equation 29}$$

$$(c1/w1) \geq -0.5 \times (d1/w1) + 0.3 \qquad \text{Equation 30}$$

By doing so, as verified with examples described below, even when the variation in size of the sealing member 52a or 52b occurs, the first sealing layer 59a and the second sealing layer 59b can be reliably joined, thereby forming the junction portion 59. Further, the sealing member 52a or 52b can be drawn at the same speed all over. Further, since the writing start portion or the writing end portion is sufficiently separated from the liquid crystal device, the complex control can be eliminated. Accordingly, drawing time can be markedly reduced to half to one-third of drawing time in the related art. In addition, thickening of the sealing member 52a or 52b toward the inside of the liquid crystal device 100 in the junction portion 59 can be solved.

Moreover, in the present embodiment, the inclined portions 59d are formed according to the chamfered amounts c1 and c2. That is, the inclined portion 59d is formed to be inclined at 45 degrees with respect to the central line direction of the second sealing layer 59b. The invention is not limited to this configuration, in which the inclined portion 59d is formed at 45 degrees. For example, the inclined portion 59d may be formed to an acute angle or an obtuse angle from 45 degrees.

Further, in the present embodiment, the sizes of the sealing members 52a and 52b are the same, but the sizes may be different from each other. The conductive sealing member 52b may be larger than the insulating sealing member 52a. For example, the insulating sealing member 52a may be 0.5 mm and the conductive sealing member 52b may be 0.7 mm.

Next, fifth to ninth embodiments of the liquid crystal device will be described.

In the following description, only different parts from the above-described embodiments will be described. The same parts as those in the above-described embodiments are represented by the same reference numerals, and the descriptions thereof will be omitted. Moreover, the liquid crystal devices of the fifth to ninth embodiments are manufactured by use of the manufacturing method of any one of the first to fourth embodiments.

Fifth Embodiment

First, the liquid crystal device according to the fifth embodiment of the invention will be described.

Figure 26:
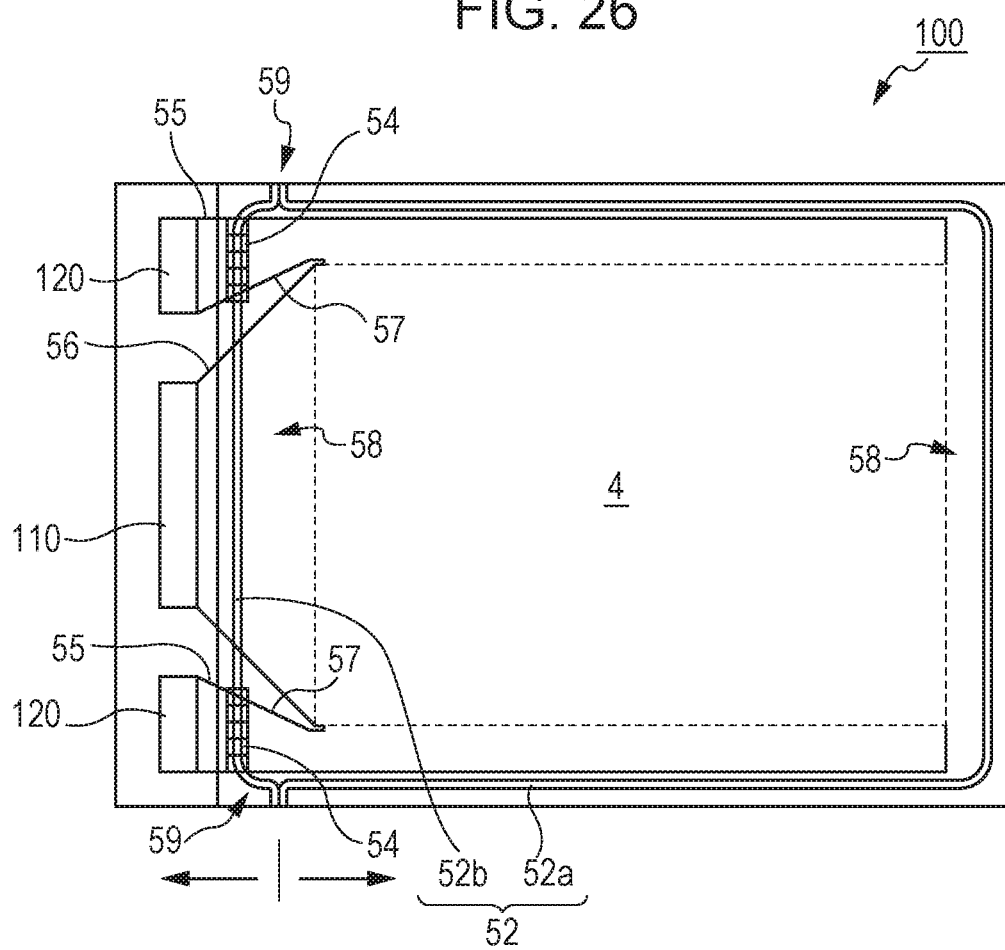
FIG. 26 is a plan view of a liquid crystal device according to a fifth embodiment of the invention.

FIG. 26 is a plan view showing respective constituent parts of the liquid crystal device according to the present embodiment as viewed from the counter substrate. In the present embodiment, it is configured such that the conductive sealing member 52b is formed between the image display region 4 and the scanning signal driving circuit 110, and the insulating sealing member 52a is formed on an opposite side to the conductive sealing member 52b via the junction portion 59. That is, as compared with the first embodiment, the positions of the insulating sealing member 52a and the conductive sealing member 52b are inverted.

Further, in the TFD substrate 10, the conductive pad 54 is formed on a lateral side of the data signal driving circuit 120 and is connected to the data signal driving circuit 120 via the relay wiring lines 55. On the other hand, in the counter substrate 20, the COM electrodes 57 are formed outside of the image display region 4 and extend toward the conductive pad 54. Then, the conductive sealing member 52b is interposed between the COM electrodes 57 and the conductive pad 54, such that the conductive particles electrically connect the COM electrodes 57 and the conductive pad 54. Here, since the conductive sealing member 52b is formed on wiring lines of the SEG electrodes 56, the conductive sealing member 52b is configured in consideration of the electrical short-circuit of the wiring lines of the SEG electrodes 56 to adjacent wiring lines.

As such, when the conductive sealing member 52b is formed between the image display region 4 and the scanning signal driving circuit 110, the same effects as those in the above-described embodiments can be obtained.

Sixth Embodiment

Next, a liquid crystal device according to the sixth embodiment of the invention will be described.

Figure 27:
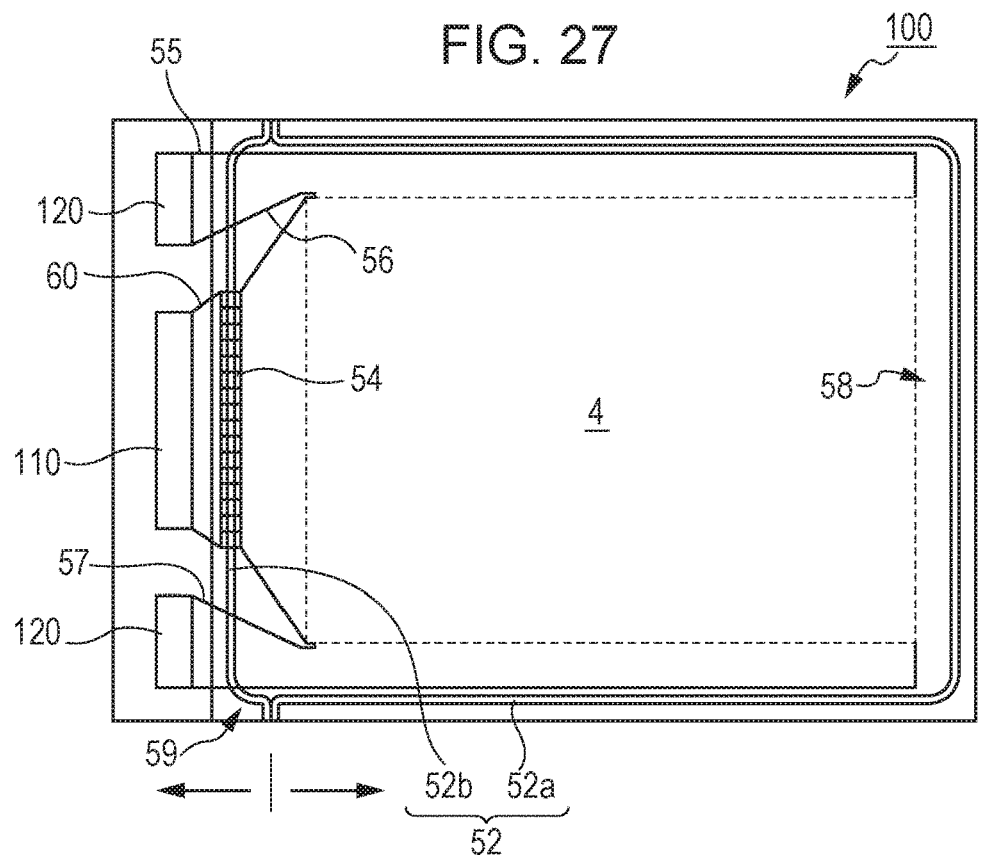
FIG. 27 is a plan view of a liquid crystal device according to a sixth embodiment of the invention.

FIG. 27 is a plan view of respective constituent parts of the liquid crystal device according to the present embodiment as viewed from the counter substrate. Like the fifth embodiment, in the present embodiment, it is configured such that the conductive sealing member 52b is formed between the image display region 4 and the scanning signal driving circuit 110, and the insulating sealing member 52a is formed on an opposite side to the conductive sealing member 52b via the junction portion 59.

Further, unlike the first to fifth embodiments, in the present embodiment, the scanning signal driving circuit 110 and the data signal driving circuit 120 are formed in the counter substrate 20. Therefore, the scanning signal driving circuit 110 is connected to the SEG electrodes 56 via the conductive pad 54.

Accordingly, in the counter substrate 20, the conductive pad 54 is formed on the lateral side of the scanning signal driving circuit 110 and is connected to the scanning signal driving circuit 110 via relay wiring lines 60. Further, the data signal driving circuit 120 is connected to the pixel electrodes 9 via the COM electrodes 57. On the other hand, in the TFD substrate 10, the SEG electrodes are formed outside the image display region 4 and extend toward the conductive pad 54. Then, the conductive sealing member 52b is interposed between the SEG electrodes 56 and the conductive pad 54, such that the conductive particles electrically connect the SEG electrodes 56 and the conductive pad 54. Here, since the conductive sealing member 52b is formed on wiring lines of the COM electrodes 57, the conductive sealing member 52b is configured in consideration of the electrical short-circuit of the wiring lines of the COM electrodes 57 to adjacent wiring lines.

As such, when the conductive sealing member 52b is formed between the image display region 4 and the scanning signal driving circuit 110, the same effects as those in the above-described embodiments can be obtained.

Moreover, the liquid crystal device of each of the first to sixth embodiments is an active matrix type in which the TFD element 40 is used as a switching element, but the invention is not limited to the active matrix-type liquid crystal device. For example, the invention can be applied to a passive-type liquid crystal device.

Seventh Embodiment

Next, a liquid crystal device according to the seventh embodiment of the invention will be described.

Figure 28:
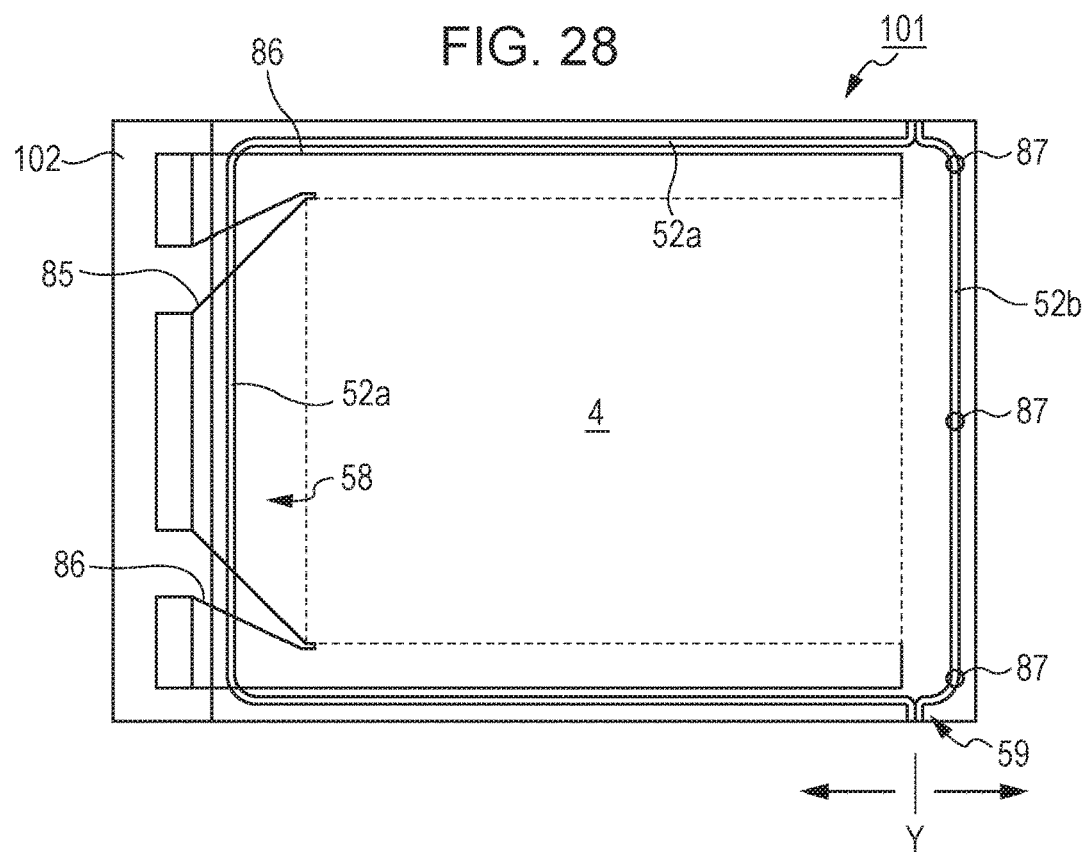
FIG. 28 is a plan view of a liquid crystal device according to a seventh embodiment of the invention.

The liquid crystal device of the present embodiment is an active matrix-type liquid crystal device in which a thin film transistor (hereinafter, referred to as TFT) is used as a switching element. FIG. 28 is a plan view showing respective constituent parts of the liquid crystal device according to the present embodiment as viewed from the counter substrate.

Here, in the liquid crystal device having the TFD of each of the first to sixth embodiment, a potential is applied from the SEG electrode 56 of the TFD substrate 10 to the pixel electrode 31, and a potential is applied from the COM electrode 57 to the pixel electrode 9, such that a voltage is applied to the liquid crystal layer 50 between the pixel electrodes 31 and 9. That is, the TFD is a two-terminal element.

On the other hand, in the liquid crystal device having the TFT of the present embodiment, a potential is applied to a pixel electrode by signals, which are applied to a data line and a gate line formed in a TFT substrate, and a voltage, which is generated between the pixel electrode and a counter substrate formed on an entire surface, is applied to the liquid crystal layer 50. That is, the TFT is a three-terminal element.

As shown in FIG. 28, the liquid crystal device 101 has, on the TFT substrate 102, data relay wiring lines 85, gate relay wiring lines 86, an insulating sealing member 52a, a conductive sealing member 52b, and dot conductive portions (first conductive portions or conductive regions) 87. Here, the insulating sealing member 52a is formed on a left side from a portion indicated by a symbol Y, and the conductive sealing member 52b is formed on a right side from the portion indicated by the symbol Y. Then, the liquid crystal layer 50 is held inside a ring-shaped portion 58 surrounded by the sealing members 52a and 52b, such that the image display region 4 is formed. Further, a junction portion 59 is formed on a line of the symbol Y. In addition, the conductive sealing member 52b extends on the dot conductive portions 87. That is, when the TFT substrate 102 and the counter substrate are bonded to each other, the TFT substrate 102 is electrically connected to the counter substrate via the dot conductive portions 87.

As such, in the liquid crystal device 101 using the TFT, the conductive sealing member 52b is formed on the dot conductive portions 87, and thus the dot seals for the connection of the upper and lower substrates in the related art do not need to be provided.

Modification of Seventh Embodiment

FIG. 29 is a diagram showing a modification of the seventh embodiment. Specifically, FIG. 29 is a plan view showing respective constituent parts of a liquid crystal device as viewed from the counter substrate.

In the present modification, as shown in FIG. 29, the gate relay wiring lines 86 are formed on one side of the image display region 4.

In such a configuration, the same effects as those in the seventh embodiment can be obtained.

Eighth Embodiment

Next, a liquid crystal device according to the eighth embodiment of the invention will be described.

FIG. 30 is a plan view showing respective constituent parts of the liquid crystal device according to the present embodiment as viewed from the counter substrate. Further, the liquid crystal device of the present embodiment has the TFT, like the seventh embodiment.

As shown in FIG. 30, in the liquid crystal device 101, in the ring-shaped portion 58, the insulating sealing member 52a and the conductive sealing member 52b have the same length. Further, other parts are the same as those in the seventh embodiment. Specifically, the junction portion 59 is substantially disposed at a center of one side of the ring-shaped portion 58. The conductive sealing member 52b is formed on a right side from a portion indicated by a symbol Z, and the insulating sealing member 52a is formed on a left side from the portion indicated by the symbol Z. Accordingly, the insulating sealing member 52a and the conductive sealing member 52b have the same length.

In such a configuration, when each of the sealing members 52a and 52b is drawn by a separate dispenser, tack time of the apparatus can be arranged, and the liquid crystal device 101 can be efficiently produced. Further, the TFT substrate 102 and the counter substrate are electrically connected by the conductive sealing member 52b formed on the dot conductive portions 87.

Moreover, the fifth to eighth embodiments relate to the liquid crystal device manufactured by use of the manufacturing method of the first or second embodiment. Specifically, the first sealing layer 59a is formed on the central line different from the axis along which the first side 58a of the ring-shaped portion 58 extends, and the second sealing layer 59b is formed to face the first sealing layer 59a. The fifth to eighth embodiments are not limited to the liquid crystal device formed by such a manufacturing method, but may relate to the liquid crystal device manufactured by use of the manufacturing method of the third or fourth embodiment. Specifically, the first side 58a of the ring-shaped portion 58 and the first sealing layer 59a may be formed on the same straight line, and the second sealing layer 59b may be formed to face the first sealing layer 59a.

Ninth Embodiment

Next, a liquid crystal device according to a ninth embodiment of the invention will be described.

Figure 31:
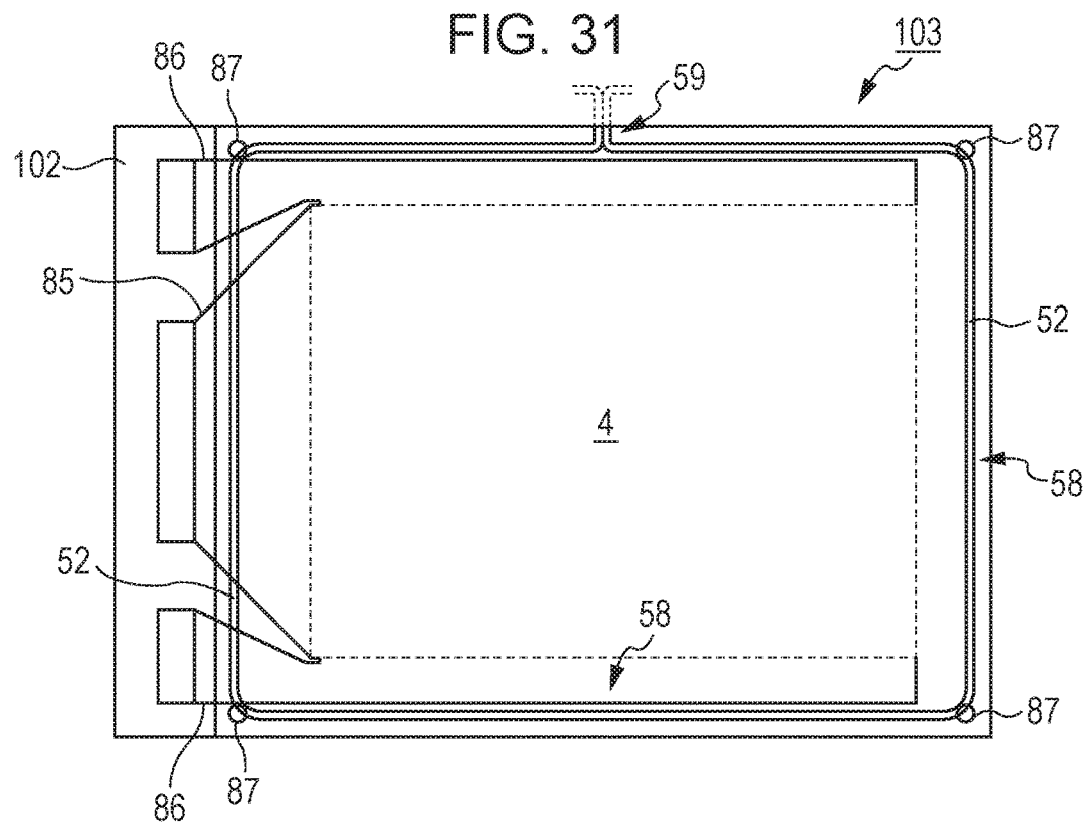
FIG. 31 is a plan view of a liquid crystal device according to a ninth embodiment of the invention.

FIG. 31 is a plan view showing respective constituent parts of the liquid crystal device according to the present embodiment as viewed from the counter substrate. Further, the liquid crystal device of the present embodiment has the TFT, like the seventh embodiment. In addition, the liquid crystal device of the present embodiment can be used for a large display, such as a large television or the like.

As shown in FIG. 31, a liquid crystal device 103 has a single sealing member 52. Specifically, though the sealing member 52 is formed by the conductive sealing member and the insulating sealing member in the first to eighth embodiments, in the present embodiment, the sealing member is formed by the insulating sealing member.

Further, in the liquid crystal device 103, the ring-shaped portion 58 has the liquid crystal layer 50 therein, and the junction portion 59 blocks the ring-shaped portion 58 at one place. The ring-shaped portion 58 and the junction portion 59 are continuously and collectively formed. The ring-shaped portion 58 and the junction portion 59 are formed by coating the sealing member 52 with so-called one stroke of a brush. That is, the sealing member 52 is formed from one end of the single member to the other end and forms the junction portion 59 by joining one end and the other end. In addition, the liquid crystal layer 50 is held inside the ring-shaped portion 58 surrounded by the single member. Here, the junction portion 59 is formed toward the outside of the ring-shaped portion 58, not to overlap the path of the ring-shaped portion 58.

Further, the dot conductive portions 87 are formed of conductive members different from the sealing member 52, and the TFT substrate 102 and the counter substrate can be electrically connected via the dot conductive portions 87.

If doing so, since the ring-shaped portion 58 is blocked by the junction portion 59 in which one end of the sealing member 52 and the other end thereof are joined at one place, the number of junction portions 59 is minimized. Therefore, as compared with a case in which a plurality of junction portions 59 are provided, a liquid crystal device, in which a defective cell gap is reliably suppressed, can be implemented. In addition, since the junction portion 59 is formed toward the outside of the ring-shaped portion 58, when the bonding process is performed, the width of the junction portion 59 is increased only outside the ring-shaped portion 58, and thus the sealing member 52 can be suppressed from protruding inside the ring-shaped portion 58. Further, there is no case in which the cell gap inside the ring-shaped portion 58 is influenced, and thus the cell gap can be uniformly maintained.

Examples

Next, an example of the invention will be described.

In the present example, for the shapes of the first and second sealing layers 59a and 59b of <1> to <4> described below, the measurement results of reliability of a panel (liquid crystal device), the shape of the junction portion 59 formed by the bonding process, the ratio of the hollow depth and the width of the sealing member, and the panel state are shown.

<1> When the first and second sealing layers 59a and 59b have the curved portions 59c at the indented portions W and X (FIG. 18C, First Embodiment)

<2> When the first and second sealing layers 59a and 59b have the inclined portions 59d at the indented portions W and X (FIG. 19, Second Embodiment)

<3> When the first side 58a of the ring-shaped portion 58 and the first sealing layer 59a are the straight lines, and the second sealing layer 59b has the curved portion 59c (FIG. 24C, Third Embodiment)

<4> When the first side 58a of the ring-shaped portion 58 and the first sealing layer 59a are the straight lines, and the second sealing layer 59b has the inclined portion 59d (FIG. 25, Fourth Embodiment)

<1> When the first and second sealing layers 59a and 59b have the curved portions 59c at the indented portions W and X (FIG. 18C, First Embodiment)

Table 1 shows the examination result of the panel for the shapes of the first and second sealing layers 59a and 59b in the first embodiment.

TABLE 1

| w2 | R2 | d2 | h2 | h2/w2 | RELIABILITY | Δ | x |
|---|---|---|---|---|---|---|---|
| 0.5 mm | 0.4 mm | 0.2 mm | 0.23 mm | 0.47 | ○ | 0% | 0% |
| 0.5 mm | 0.5 mm | 0.2 mm | 0.30 mm | 0.60 | Δ | 1% | 0% |
| 0.5 mm | 0.75 mm | 0.2 mm | 0.47 mm | 0.95 | Δ | 6% | 0% |
| 0.5 mm | 0.8 mm | 0.2 mm | 0.51 mm | 1.02 | x | 8% | 2% |
| 0.7 mm | 0.3 mm | 0.5 mm | 0.30 mm | 0.43 | ○ | 0% | 0% |
| 0.7 mm | 0.45 mm | 0.5 mm | 0.41 mm | 0.59 | Δ | 1% | 0% |
| 0.7 mm | 0.75 mm | 0.5 mm | 0.64 mm | 0.92 | Δ | 4% | 0% |
| 0.7 mm | 0.9 mm | 0.5 mm | 0.76 mm | 1.09 | x | 6% | 1% |

Figure 32:
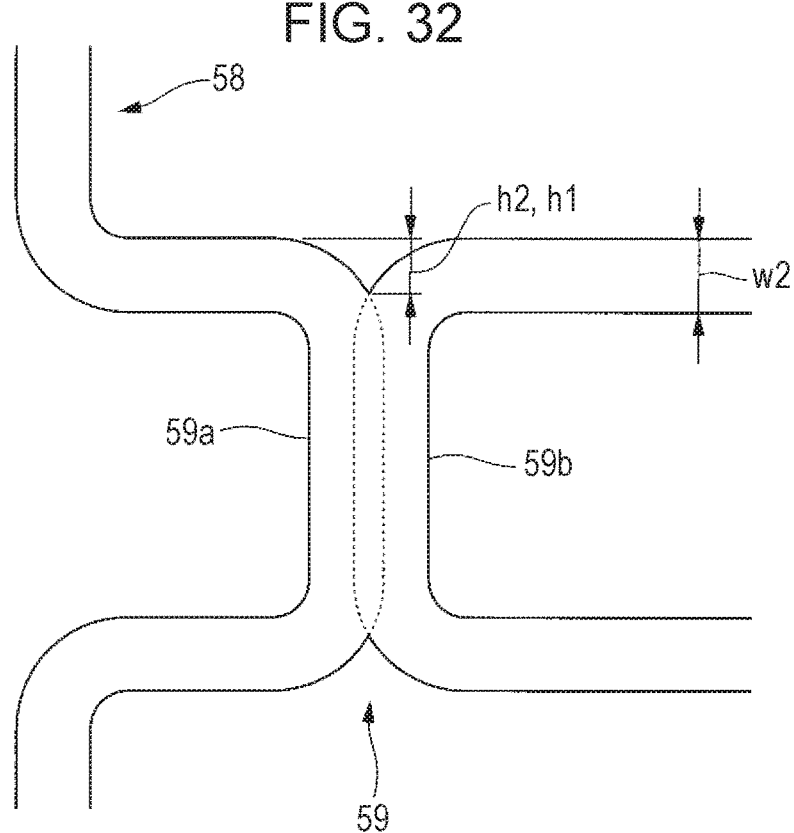
FIG. 32 is a diagram illustrating an example of the invention.

In Table 1, w2 is the width of the sealing member after bonding, R2 is the radius of the curved portion 59c, d2 is the distance between the central lines of the sealing members, and h2 is the hollow depth from the inside of the ring-shaped portion 58 to the indented portion of the junction portion 59 (FIG. 32). That is, R2 and d2 are parameters of a pattern shape when the sealing member is drawn, and w2 and h2 are parameters obtained by performing the bonding process. Further, Table 1 shows the evaluation results obtained under an atmosphere of 60° C., 90% RH for 1000 hours. Further, in a column of reliability, '○' means favorable with no change, 'Δ' represents that a slight change in threshold value is recognized, but within a tolerance range, and 'x' means that occurrence of irregularity of a defective level is recognized.

From the results of Table 1, it was confirmed the reliability is influenced by the ratio h2/w2 of the hollow depth h2 and the width of the sealing member w2, without depending on the width w2 of the sealing member, the radius R2 of the curved portion 59c, and the distance d2 between the central lines of the sealing members. Then, it was confirmed that, when h2/w2 is equal to or less then 1.0, a defect does not occur and, when h2/w2 is equal to or less than 0.5, irregularity is not recognized at all.

Table 2 shows the examination results of the shape of the junction portion 59 formed by the bonding process for the shapes of the first and second sealing layers 59a and 59b in the first embodiment.

TABLE 2

| W2 | R2 | d2 | h2 | h2/w2 | CONVEX OF JUNCTION PORTION | Δ | x |
|---|---|---|---|---|---|---|---|
| 0.5 mm | 0 mm | 0 mm | 0.00 mm | 0.00 | Δ | 4% | 0% |
| 0.5 mm | 0.2 mm | 0 mm | 0.05 mm | 0.09 | Δ | 1% | 0% |
| 0.5 mm | 0.05 mm | 0.25 mm | 0.06 mm | 0.11 | ○ | 0% | 0% |
| 0.7 mm | 0 mm | 0.1 mm | 0.01 mm | 0.01 | Δ | 0% | 0% |
| 0.7 mm | 0.3 mm | 0 mm | 0.07 mm | 0.10 | ○ | 0% | 0% |
| 0.7 mm | 0.15 mm | 0.2 mm | 0.07 mm | 0.10 | ○ | 0% | 0% |
| 0.7 mm | 0 mm | 0.4 mm | 0.06 mm | 0.09 | Δ | 1% | 0% |

Figure 33:
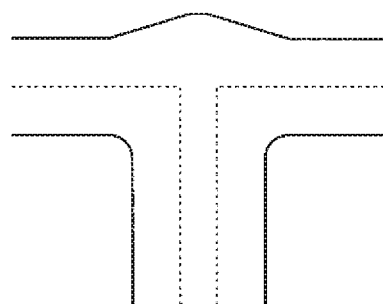
FIG. 33 is a diagram illustrating an example of the invention.

In Table 2, w2 is the width of the sealing member after bonding, R2 is the radius of the curved portion 59c, d2 is the distance between the central lines of the sealing members, and h2 is the hollow depth of the junction portion 59 (FIG. 32). Further, in a column of 'convex of junction portion', '○' means that the convex is formed but favorable, 'Δ' means that the convex is formed but does not become a defective level, and 'x' means that the swelled amount of the convex exceeds two times of the size of the sealing member, that is, the defective level. Moreover, in general, it is known that, when the sealing member is coated and formed with the dispenser, the size of the sealing member is varied by about 10%. As a result, even when the average of h2/w2 is 0.09, that is, even when the junction portion 59 averagedly has a indented shape, there is a case in which the junction portion 59 does not have the indented shape, but is swelled (FIG. 33) not more than 1%. The swelled amount is the maximum when w2 is 0.5 mm, R2 is 0 mm, and d2 is 0 mm, but it is equal to or less than 20 percent with respect to the width of the sealing member, and thus it does not matter practically. However, in order to completely eliminate the convex of the junction portion 59 including the variation in the seal size, it was confirmed that it is preferable to set h2/w2 to be equal to or less than 0.1.

Table 3 shows the examination results of the ratio h2/w2 of the hollow depth h2 and the width w2 of the sealing member, and the panel state for the shapes of the first and sealing layers 59a and 59b in the first embodiment, when the width w2 of the sealing member after bonding is fixed to 0.5 mm, and the radius R2 of the curved portion 59c and the distance d2 between the central lines of the sealing members are changed.

Figure 34:
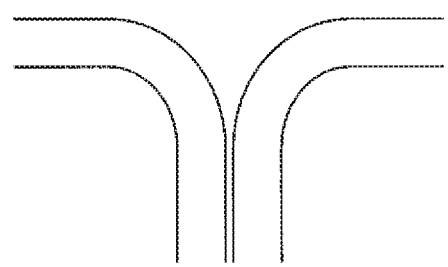
FIG. 34 is a diagram illustrating an example of the invention.

In Table 3 of FIG. 51, in a first portion, the ratio h2/w2 of the hollow depth h2 of the junction portion 59 and the width w2 of the sealing member is equal to or less than 1.0 and, in this range, reliability of the panel can be ensured. Further, a second portion does not matter practically in the junction portion 59, but, in this range, the sealing member is not indented, but is slightly swelled. Further, in a third portion, h2/w2 is larger than 0.1 and equal to or less then 0.5, which is an ideal range. In a portion where d2/w2 exceeds 0.9, the sealing members were not brought into contact with each other due to the variation in size of the sealing member or the like (FIG. 34), leakage of liquid crystal or the like occurred.

Figure 35:
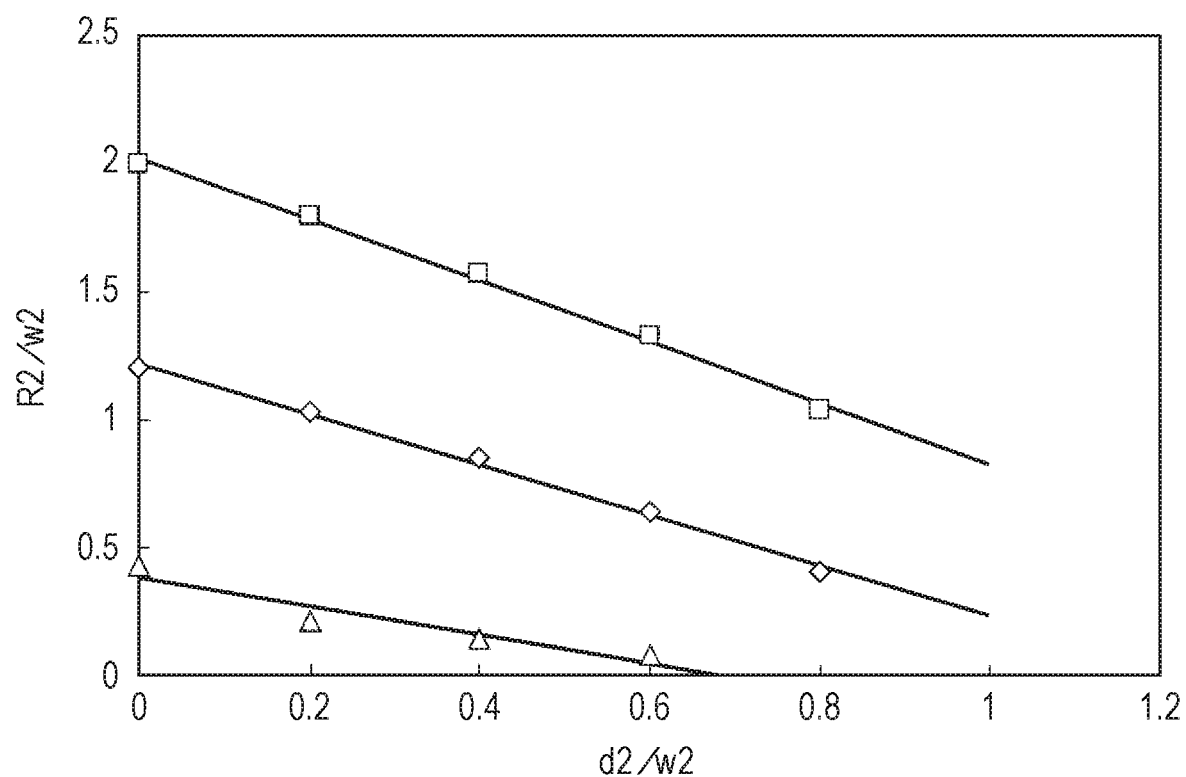
FIG. 35 is a diagram illustrating an example of the invention.

Further, in Table 3, d2/w2 and R2/w2 of a boundary where reliability can be ensured and a boundary where the convex occurs in the junction portion are plotted to be substantially on straight lines, as shown in FIG. 35. Here, the values of R2/w2 when h2/w2 serving as the boundary becomes 0.1, 0.5, and 1.0 were calculated by interpolation.

Next, Table 4 shows the examination results of the ratio h2/w2 of the hollow depth h2 and the width w2 of the sealing member, and the panel state for the shapes of the first and sealing layers 59a and 59b in the first embodiment, when the width w2 of the sealing member after bonding is fixed to 0.7 mm, and the radius R2 of the curved portion 59c and the distance d2 between the central lines of the sealing members are changed.

In Table 4 of FIG. 52, in a first portion, the ratio h2/w2 of the hollow depth h2 of the junction portion 59 and the width w2 of the sealing member is equal to or less than 1.0 and, in this range, reliability of the panel can be ensured. Further, a second portion does not matter practically in the junction portion 59, but, in this range, the sealing member is not indented, but is slightly swelled. Further, in a third portion, h2/w2 is larger than 0.1 and equal to or less then 0.5, which is an ideal range. In a portion where d2/w2 exceeds 0.85, the sealing members were not brought into contact with each other due to the variation in size of the sealing member or the like (FIG. 34), leakage of liquid crystal or the like occurred.

Figure 36:
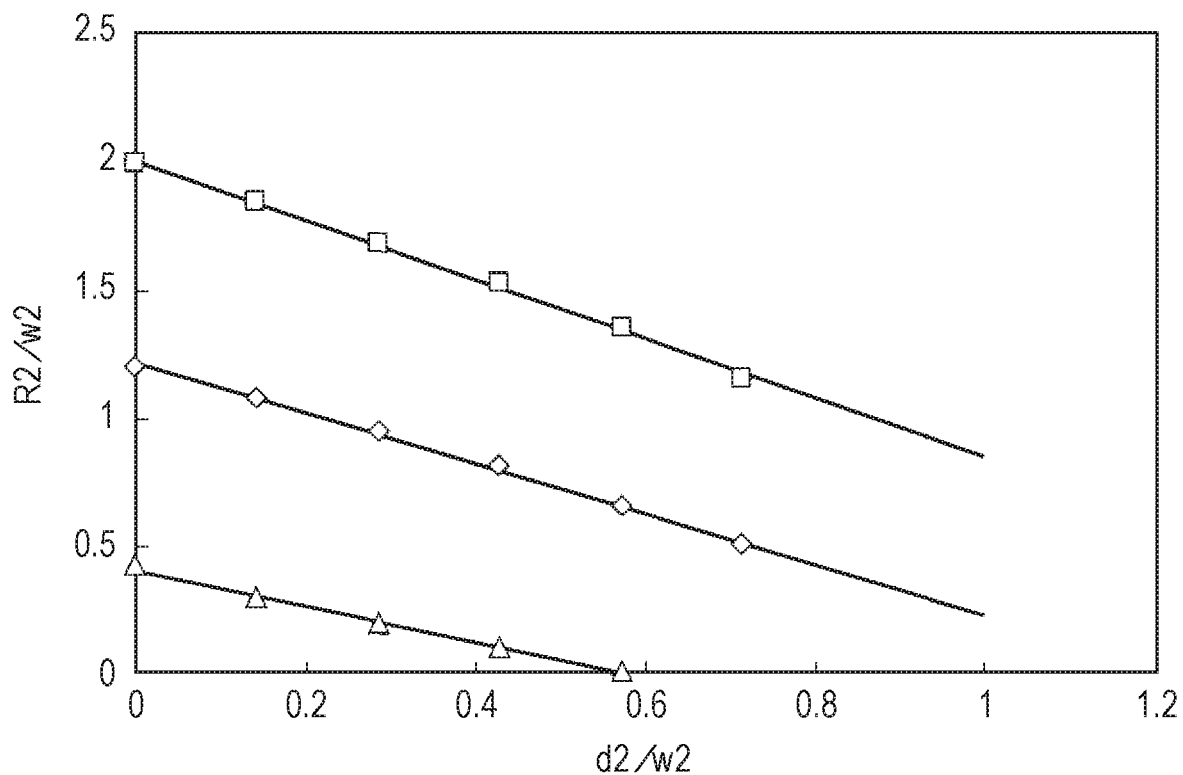
FIG. 36 is a diagram illustrating an example of the invention.

Further, in Table 4, when d2/w2 and R2/w2 of the boundary where reliability can be ensured and the boundary where the convex occurs in the junction portion are plotted to be substantially on straight lines, as shown in FIG. 36.

Figure 37:
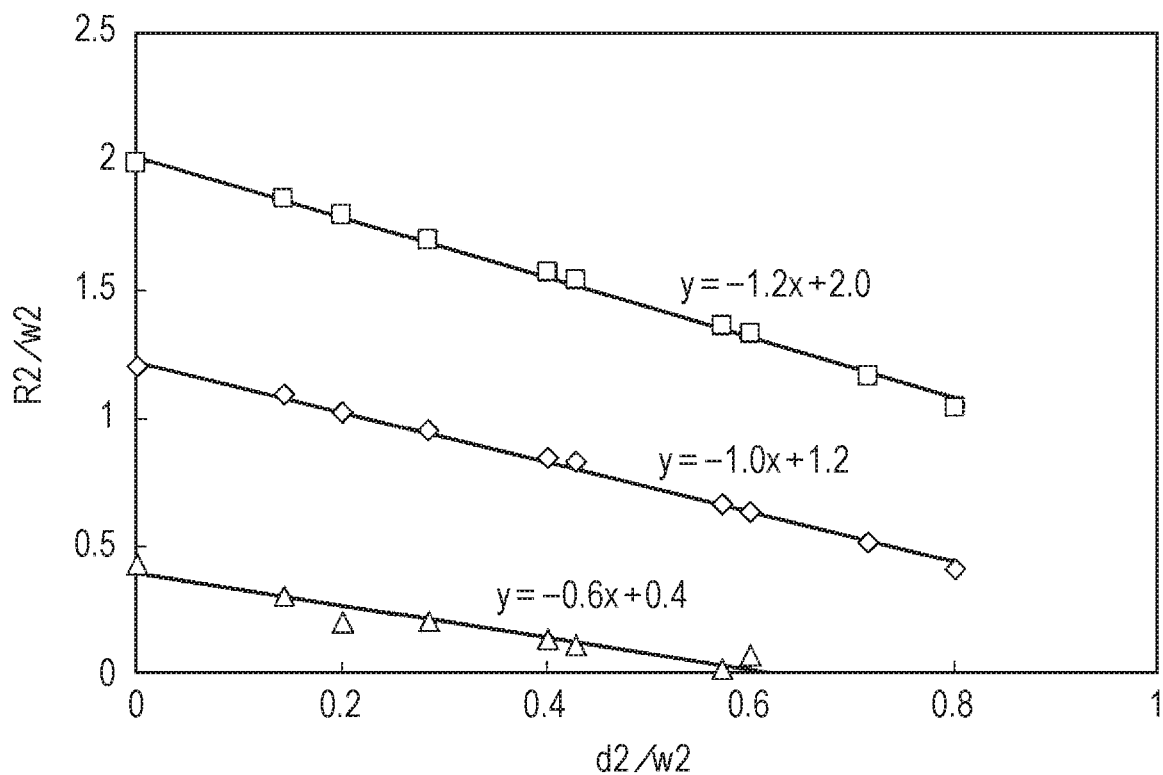
FIG. 37 is a diagram illustrating an example of the invention.

Here, in a case in which the width w2 of the sealing member is 0.5 mm and 0.7 mm, for the boundary where reliability can be ensured and the boundary where the convex occurs in the junction portion, on the same graph, the boundaries of d2/w2 and R2/w2 (FIGS. 35 and 36) are plotted as shown in FIG. 37.

As shown in FIG. 37, when the width w2 of the sealing member after bonding is 0.5 mm or 0.7 mm, the boundaries are on the same line. Therefore, even when w2 is out of the above-described range, the boundaries are on the line of FIG. 37.

From FIG. 37, it can be seen that the relationship of d2/w2 and R2/w2 is plotted to be on the same line, without depending on the width of the sealing member.

As such, in order to ensure reliability, without depending on the size of the sealing member, the following condition is satisfied.

$$(R2/w2) \leq -1.2 \times (d2/w2) + 2.0 \qquad \text{Equation 31}$$

Ideally, the following condition is to be satisfied.

$$(R2/w2) \leq -(d2/w2) + 1.2 \qquad \text{Equation 32}$$

Further, the convex (thickening) of the sealing member in the junction portion is less than 20 percent for the width of the sealing member, which does not matter practically. However, in order to completely eliminate the convex of the junction portion including the variation in size of the sealing member, ideally, it is preferable that the following condition is satisfied.

$$(R2/w2) \geq -0.6 \times (d2/w2) + 0.4 \qquad \text{Equation 33}$$

In addition, in order to prevent the sealing members from being not brought into contact with each other and to prevent liquid crystal from leaking due to the variation in size of the sealing member in the junction portion, ideally, it is preferable that the following condition is satisfied.

$$d2/w2 \leq 0.8 \qquad \text{Equation 34}$$

As described above, by defining the shapes of the first and second sealing layers 59a and 59b, the same effects as those in the above-described embodiments can be obtained. On the other hand, in the related art, the sealing member in the junction portion may be thickened, and the distance of the overlap portion needs to be increased in order to control thickening to the minimum. Further, the control of the device may be complicated, and then it will take a long time for drawing the sealing member. In contrast, in the method of the present example, the sealing member can be drawn at the same speed all over. Further, since the writing start portion or the writing end portion is sufficiently separated from the panel, the complex control can be eliminated. Accordingly, drawing time can be markedly reduced to half to one-third of drawing time in the related art. In addition, thickening of the sealing member toward the inside of the liquid crystal device in the junction portion of the sealing member can be solved.

<2> When the first and second sealing layers 59a and 59b have the inclined portions 59d at the indented portions W and X (FIG. 19, Second Embodiment)

Table 5 shows the examination results of the ratio h2/w2 of the hollow depth h2 and the width w2 of the sealing member, and the panel state for the shapes of the first and sealing layers 59a and 59b in the second embodiment, when the width w2 of the sealing member after bonding is fixed to 0.5 mm, and the chamfered amount c2 of the inclined portion 59d and the distance d2 between the central lines of the sealing members are changed.

In Table 5 of FIG. 53, in a first portion, the ratio h2/w2 of the hollow depth h2 of the junction portion 59 and the width w2 of the sealing member is equal to or less than 1.0 and, in this range, reliability of the panel can be ensured. Further, a second portion does not matter practically in the junction portion 59, but, in this range, the sealing member is not indented, but is slightly swelled. Further, in a third portion, h2/w2 is larger than 0.1 and equal to or less then 0.5, which is an ideal range. In a portion where d2/w2 exceeds 0.9, the sealing members were not brought into contact with each other due to the variation in size of the sealing member or the like (FIG. 34), leakage of liquid crystal or the like occurred.

Figure 38:
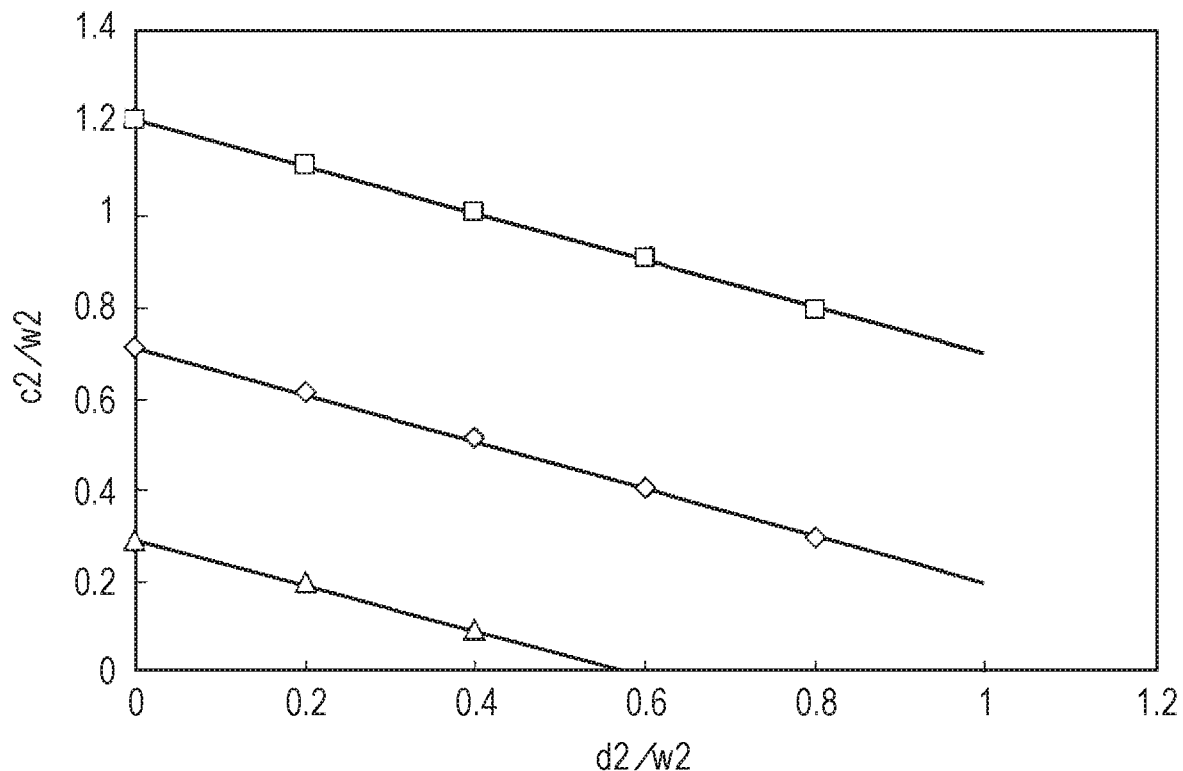
FIG. 38 is a diagram illustrating an example of the invention.

Further, in Table 5, d2/w2 and c2/w2 of the boundary where reliability can be ensured and the boundary where the convex occurs in the junction portion are plotted to be substantially on straight lines, as shown in FIG. 38. Here, the values of c2/w2 when h2/w2 serving as the boundary becomes 0.5 and 1.0 were calculated by interpolation.

Next, Table 6 shows the examination results of the change of hollow depth h2 and the panel state for the shapes of the first and sealing layers 59a and 59b in the second embodiment, when the width w2 of the sealing member after bonding is fixed to 0.7 mm, and the chamfered amount c2 of the inclined portion 59d and the distance d2 between the central lines of the sealing members are changed.

In Table 6 of FIG. 54, in a first portion, the ratio h2/w2 of the hollow depth h2 of the junction portion 59 and the width w2 of the sealing member is equal to or less than 1.0 and, in this range, reliability of the panel can be ensured. Further, a second portion does not matter practically in the junction portion 59, but, in this range, the sealing member is not indented, but is slightly swelled. Further, in a third portion, h2/w2 is larger than 0.1 and equal to or less then 0.5, which is an ideal range. In a portion where d2/w2 exceeds 0.85, the sealing members were not brought into contact with each other due to the variation in size of the sealing member or the like (FIG. 34), leakage of liquid crystal or the like occurred.

Figure 39:
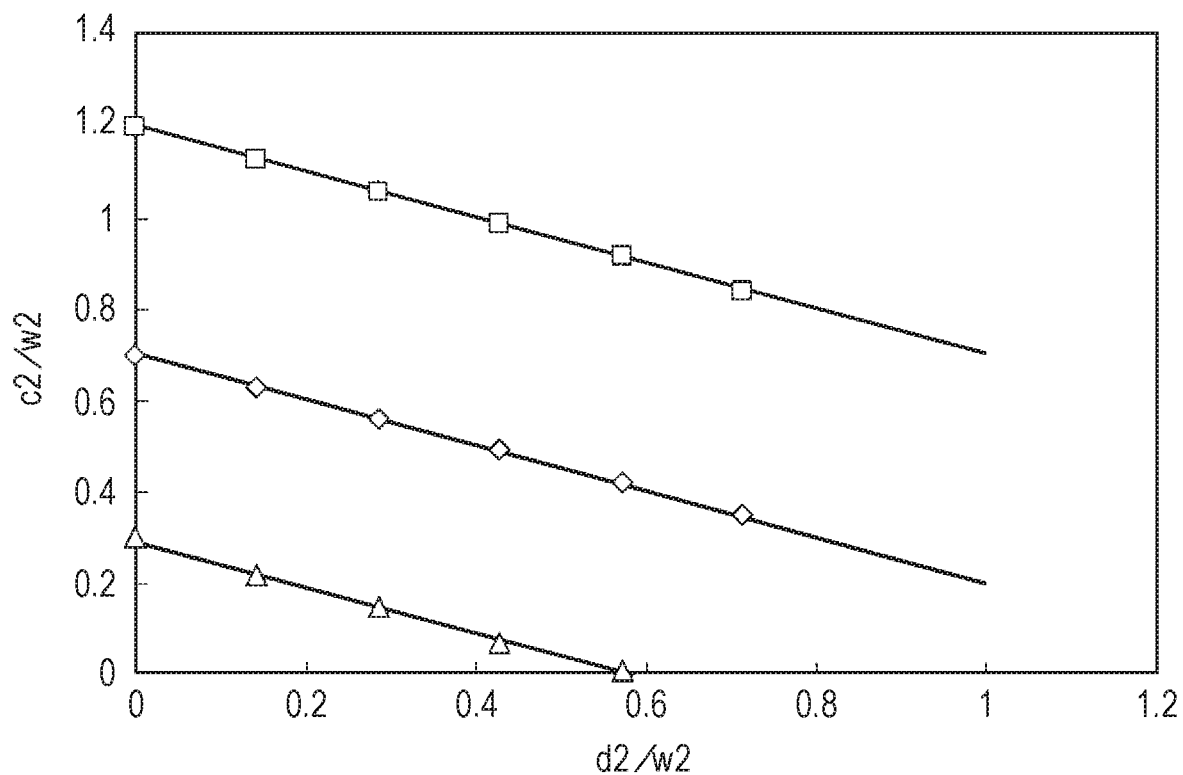
FIG. 39 is a diagram illustrating an example of the invention.

Further, in Table 6, when d2/w2 and R2/w2 of the boundary where reliability can be ensured and the boundary where the convex occurs in the junction portion are plotted to be substantially on straight lines, as shown in FIG. 39. Here, the values of c2/w2 when h2/w2 serving as the boundary is 0.1, 0.5, and 1.0 were calculated by interpolation.

Here, in a case in which the width w2 of the sealing member is 0.5 mm and 0.7 mm, for the boundary where reliability can be ensured and the boundary where the convex occurs in the junction portion, on the same graph, the boundaries of d2/w2 and c2/w2 (FIGS. 38 and 39) are plotted as shown in FIG. 37.

Figure 40:
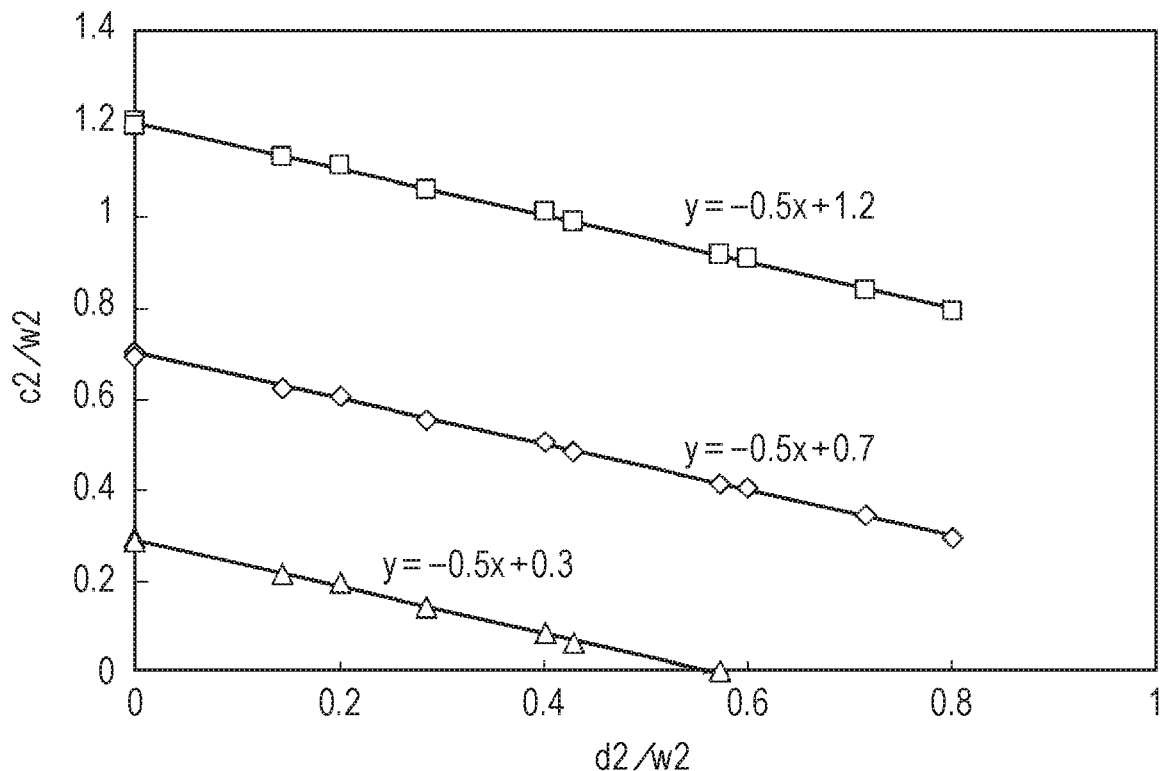
FIG. 40 is a diagram illustrating an example of the invention.

As shown in FIG. 40, when the width w2 of the sealing member after bonding is 0.5 mm or 0.7 mm, the boundaries are on the same line. Therefore, even when w2 is out of the above-described range, the boundaries are on the line of FIG. 40.

From FIG. 40, it can be seen that the relationship of d2/w2 and c2/w2 is plotted to be on the same line, without depending on the width of the sealing member.

As such, in order to ensure reliability, without depending on the size of the sealing member, the following condition is satisfied.

$$(c2/w2) \leq -0.5 \times (d2/w2) + 1.2 \qquad \text{Equation 35}$$

Ideally, the following condition is to be satisfied.

$$(c2/w2) \leq -0.5 \times (d2/w2) + 0.7 \qquad \text{Equation 36}$$

Further, the convex (thickening) of the sealing member in the junction portion is less than 20 percent for the width of the sealing member, which does not matter practically. However, in order to completely eliminate the convex of the junction portion including the variation in size of the sealing member, ideally, it is preferable that the following condition is satisfied.

$$(c2/w2) \geq -0.5 \times (d2/w2) + 0.3 \qquad \text{Equation 37}$$

In addition, in order to prevent the sealing members from being not brought into contact with each other and to prevent liquid crystal from leaking due to the variation in size of the sealing member in the junction portion, ideally, it is preferable that the following condition is satisfied.

$$d2/w2 \leq 0.8 \qquad \text{Equation 38}$$

As described above, by defining the shapes of the first and second sealing layers 59a and 59b, the same effects as those in the above-described embodiments can be obtained. That is, the sealing member can be drawn at the same speed all over. Further, since the writing start portion or the writing end portion is sufficiently separated from the panel, the complex control can be eliminated. Accordingly, drawing time can be markedly reduced to half to one-third of drawing time in the related art. In addition, thickening of the sealing member toward the inside of the liquid crystal device in the junction portion of the sealing member can be solved.

<3> When the first side 58a of the ring-shaped portion 58 and the first sealing layer 59a are the straight lines, and the second sealing layer 59b has the curved portion 59c (FIG. 24C, Third Embodiment)

Table 7 shows the examination results of the ratio h1/w1 of the hollow depth h1 and the width w1 of the sealing member, and the panel state for the shapes of the first and sealing layers 59a and 59b in the third embodiment, when the width w1 of the sealing member after bonding is fixed to 0.5 mm, and the radius R1 of the curved portion 59c and the distance d1 between the central lines of the sealing members are changed.

In Table 7 of FIG. 55, in a first portion, the ratio h1/w1 of the hollow depth h1 of the junction portion 59 and the width w1 of the sealing member is equal to or less than 1.0 and, in this range, reliability of the panel can be ensured. Further, a second portion does not matter practically in the junction portion 59, but, in this range, the sealing member is not indented, but is slightly swelled. Further, in a third portion, h1/w1 is larger than 0.1 and equal to or less then 0.5, which is an ideal range. In a portion where d1/w1 exceeds 0.9, the sealing members were not brought into contact with each other due to the variation in size of the sealing member or the like (FIG. 34), leakage of liquid crystal or the like occurred.

Figure 41:
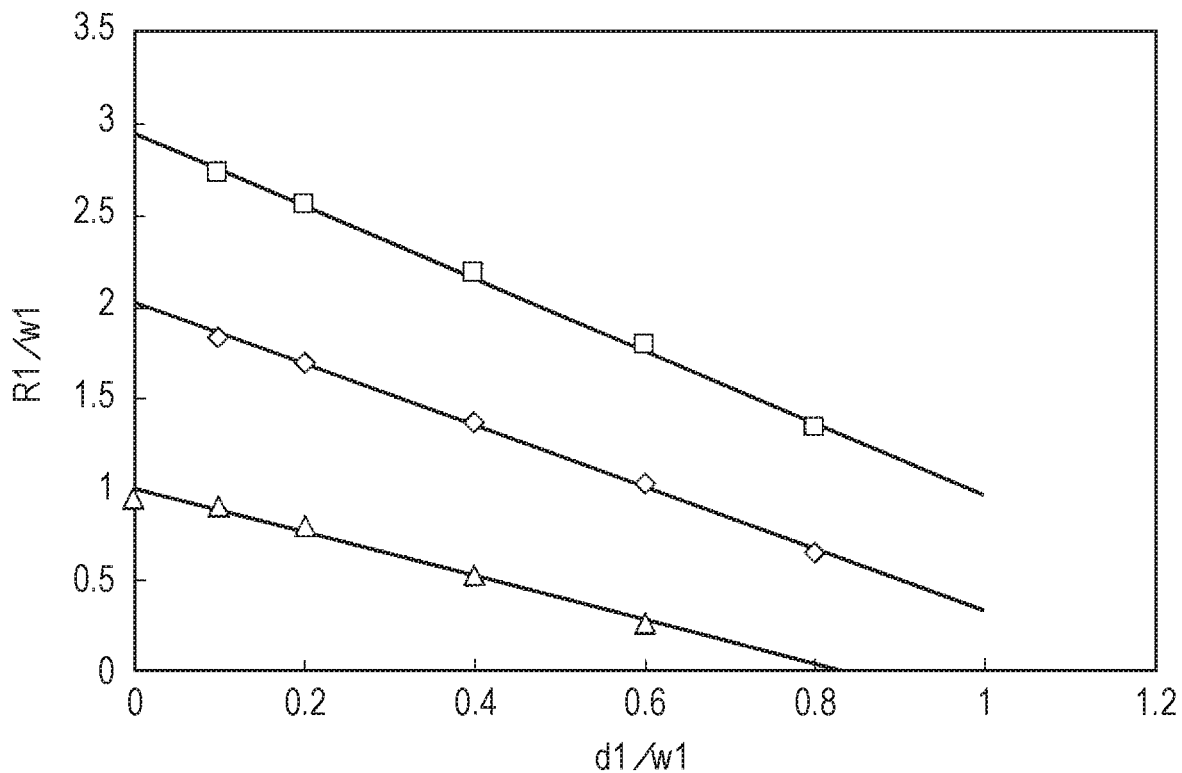
FIG. 41 is a diagram illustrating an example of the invention.

Further, in Table 7, d1/w1 and R1/w1 of the boundary where reliability can be ensured and the boundary where the convex occurs in the junction portion are plotted to be substantially on straight lines, as shown in FIG. 41.

Next, Table 8 shows the examination results of the change of hollow depth h1 and the panel state for the shapes of the first and sealing layers 59a and 59b in the third embodiment, when the width w1 of the sealing member after bonding is fixed to 0.7 mm, and the radius of the curved portion 59c and the distance d2 between the central lines of the sealing members are changed.

In Table 8 of FIG. 56, in a first portion, the ratio h1/w1 of the hollow depth hl of the junction portion 59 and the width w1 of the sealing member is equal to or less than 1.0 and, in this range, reliability of the panel can be ensured. Further, a second portion does not matter practically in the junction portion 59, but, in this range, the sealing member is not indented, but is slightly swelled. Further, in a third portion, h1/w1 is larger than 0.1 and equal to or less then 0.5, which is an ideal range. In a portion where d1/w1 exceeds 0.85, the sealing members were not brought into contact with each other due to the variation in size of the sealing member or the like (FIG. 34), leakage of liquid crystal or the like occurred.

Figure 42:
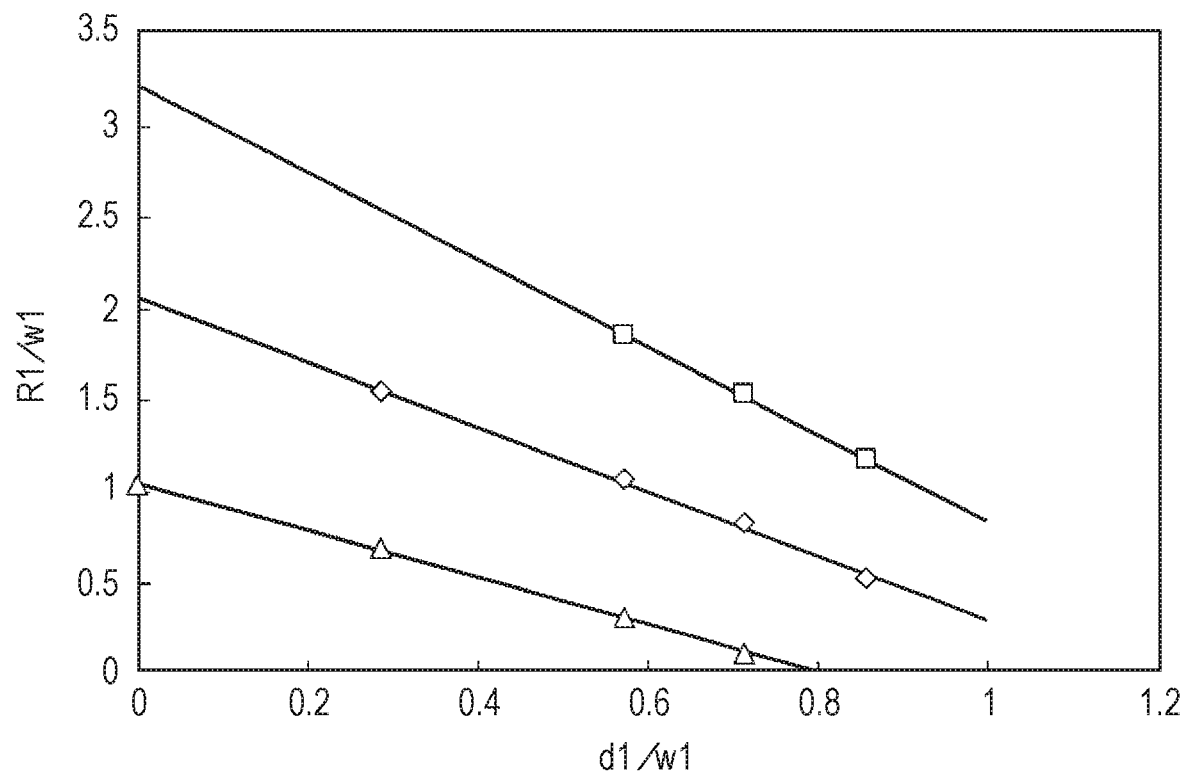
FIG. 42 is a diagram illustrating an example of the invention.

Further, in Table 8, when d1/w1 and R1/w1 of the boundary where reliability can be ensured and the boundary where the convex occurs in the junction portion are plotted to be substantially on straight lines, as shown in FIG. 42.

Figure 43:
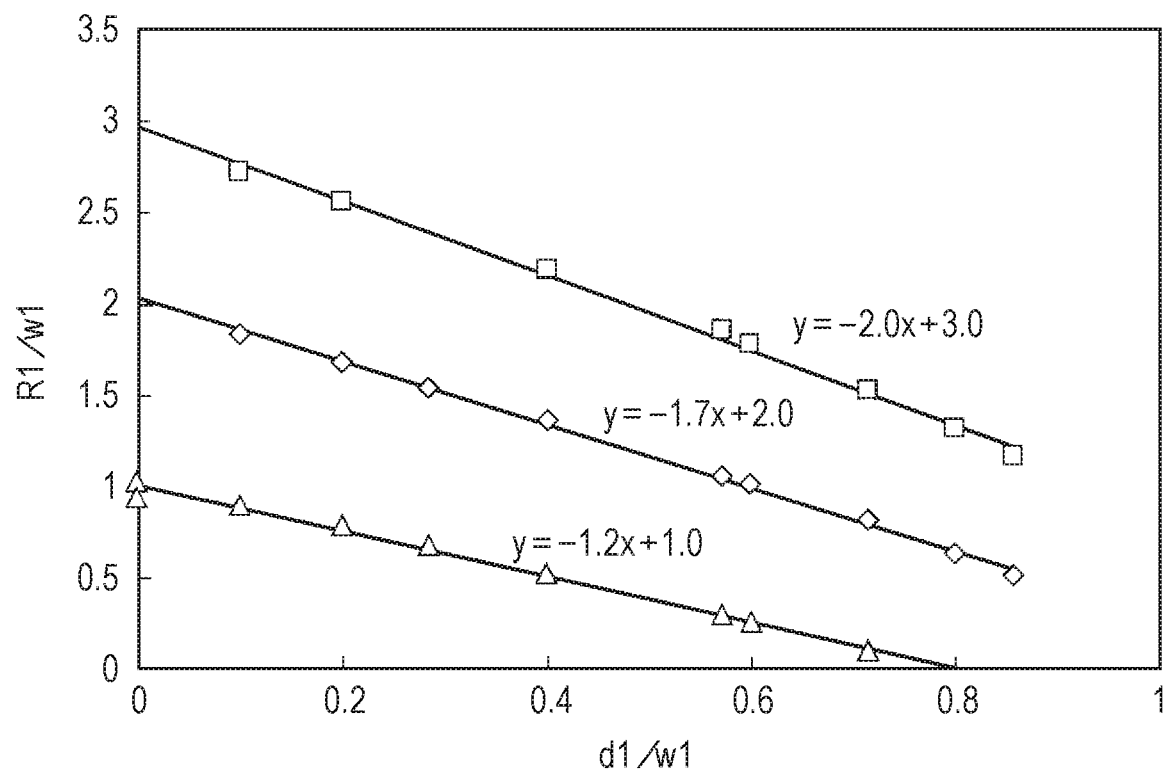
FIG. 43 is a diagram illustrating an example of the invention.

Here, in a case in which the width w1 of the sealing member is 0.5 mm and 0.7 mm, for the boundary where reliability can be ensured and the boundary where the convex occurs in the junction portion, on the same graph, the boundaries of d1/w1 and R1/w1 (FIGS. 41 and 42) are plotted as shown in FIG. 43.

As shown in FIG. 43, when the width w1 of the sealing member after bonding is 0.5 mm or 0.7 mm, the boundaries are on the same line. Therefore, even when w1 is out of the above-described range, the boundaries are on the line of FIG. 43.

From FIG. 43, it can be seen that the relationship of d1/w1 and R1/w1 is plotted to be on the same line, without depending on the width of the sealing member.

As such, in order to ensure reliability, without depending on the size of the sealing member, the following condition is satisfied.

$$(R1/w1) \leq -2.0 \times (d1/w1) + 3.0 \qquad \text{Equation 39}$$

Ideally, the following condition is to be satisfied.

$$(R1/w1) \leq -1.7 \times (d1/w1) + 2.0 \qquad \text{Equation 40}$$

Further, the convex (thickening) of the sealing member in the junction portion is less than 20 percent for the width of the sealing member, which does not matter practically. However, in order to completely eliminate the convex of the junction portion including the variation in size of the sealing member, ideally, it is preferable that the following condition is satisfied.

$$(R1/w1) \geq -1.2 \times (d1/w1) + 1.0 \qquad \text{Equation 41}$$

In addition, in order to prevent the sealing members from being not brought into contact with each other and to prevent liquid crystal from leaking due to the variation in size of the sealing member in the junction portion, ideally, it is preferable that the following condition is satisfied.

$$d1/w1 \leq 0.8 \qquad \text{Equation 42}$$

As described above, by defining the shapes of the first and second sealing layers 59a and 59b, the same effects as those in the above-described embodiments can be obtained. That is, the sealing member can be drawn at the same speed all over. Further, since the writing start portion or the writing end portion is sufficiently separated from the panel, the complex control can be eliminated. Accordingly, drawing time can be markedly reduced to half to one-third of drawing time in the related art. In addition, thickening of the sealing member toward the inside of the liquid crystal device in the junction portion of the sealing member can be solved.

<4> When the first side 58a of the ring-shaped portion 58 and the first sealing layer 59a are the straight lines, and the second sealing layer 59b has the inclined portion 59d (FIG. 25, Fourth Embodiment)

Table 9 shows the examination results of the ratio h1/w1 of the hollow depth h1 and the width w1 of the sealing member, and the panel state for the shapes of the first and sealing layers 59a and 59b in the fourth embodiment, when the width w1 of the sealing member after bonding is fixed to 0.5 mm, and the chamfered amount c1 of the inclined portion 59d and the distance d1 between the central lines of the sealing members are changed.

In Table 9 of FIG. 57, in a first portion, the ratio h1/w1 of the hollow depth h1 of the junction portion 59 and the width w1 of the sealing member is equal to or less than 1.0 and, in this range, reliability of the panel can be ensured. Further, a second portion does not matter practically in the junction portion 59, but, in this range, the sealing member is not indented, but is slightly swelled. Further, in a third portion, h1/w1 is larger than 0.1 and equal to or less then 0.5, which is an ideal range. In a portion where d1/w1 exceeds 0.9, the sealing members were not brought into contact with each other due to the variation in size of the sealing member or the like (FIG. 34), leakage of liquid crystal or the like occurred.

Figure 44:
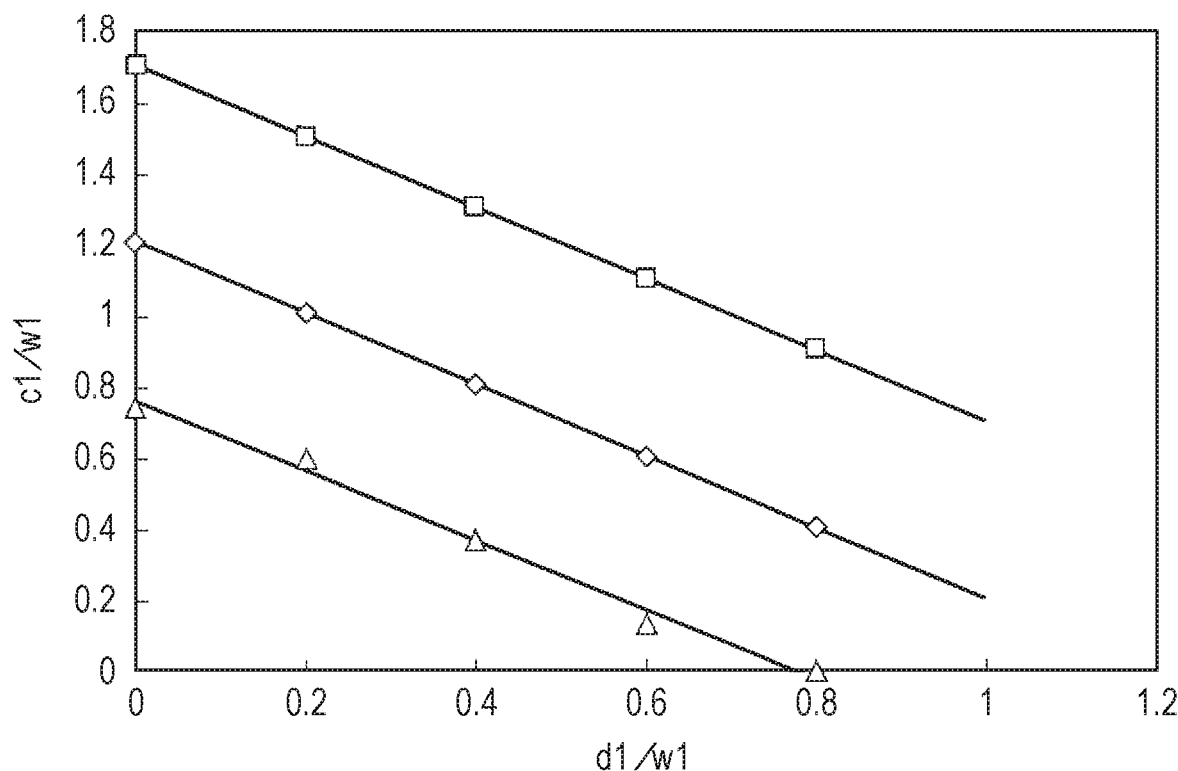
FIG. 44 is a diagram illustrating an example of the invention.

Further, in Table 9, d1/w1 and c1/w1 of the boundary where reliability can be ensured and the boundary where the convex occurs in the junction portion are plotted to be substantially on straight lines, as shown in FIG. 44.

Next, Table 10 shows the examination results of the change of the hollow depth h1 and the panel state for the shapes of the first and sealing layers 59a and 59b in the fourth embodiment, when the width w1 of the sealing member after bonding is fixed to 0.7 mm, and the chamfered amount c1 of the inclined portion 59d and the distance d1 between the central lines of the sealing members are changed.

In Table 10 of FIG. 58, in a first portion, the ratio h1/w1 of the hollow depth h1 of the junction portion 59 and the width w1 of the sealing member is equal to or less than 1.0 and, in this range, reliability of the panel can be ensured. Further, a second portion does not matter practically in the junction portion 59, but, in this range, the sealing member is not indented, but is slightly swelled. Further, in a third portion, h1/w1 is larger than 0.1 and equal to or less then 0.5, which is an ideal range. In a portion where d1/w1 exceeds 0.85, the sealing members were not brought into contact with each other due to the variation in size of the sealing member or the like (FIG. 34), leakage of liquid crystal or the like occurred.

Figure 45:
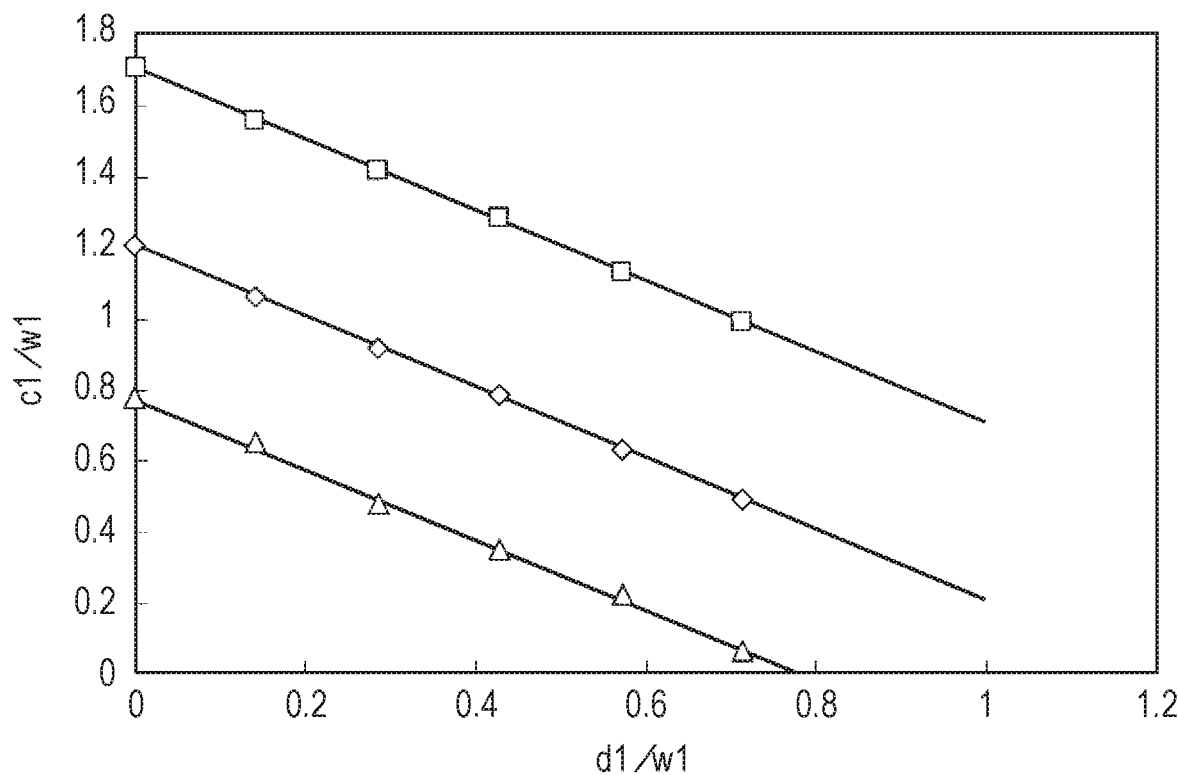
FIG. 45 is a diagram illustrating an example of the invention.

In addition, in Table 10, when d1/w1 and c1/w1 of the boundary where reliability can be ensured and the boundary where the convex occurs in the junction portion are plotted to be substantially on straight lines, as shown in FIG. 45.

Figure 46:
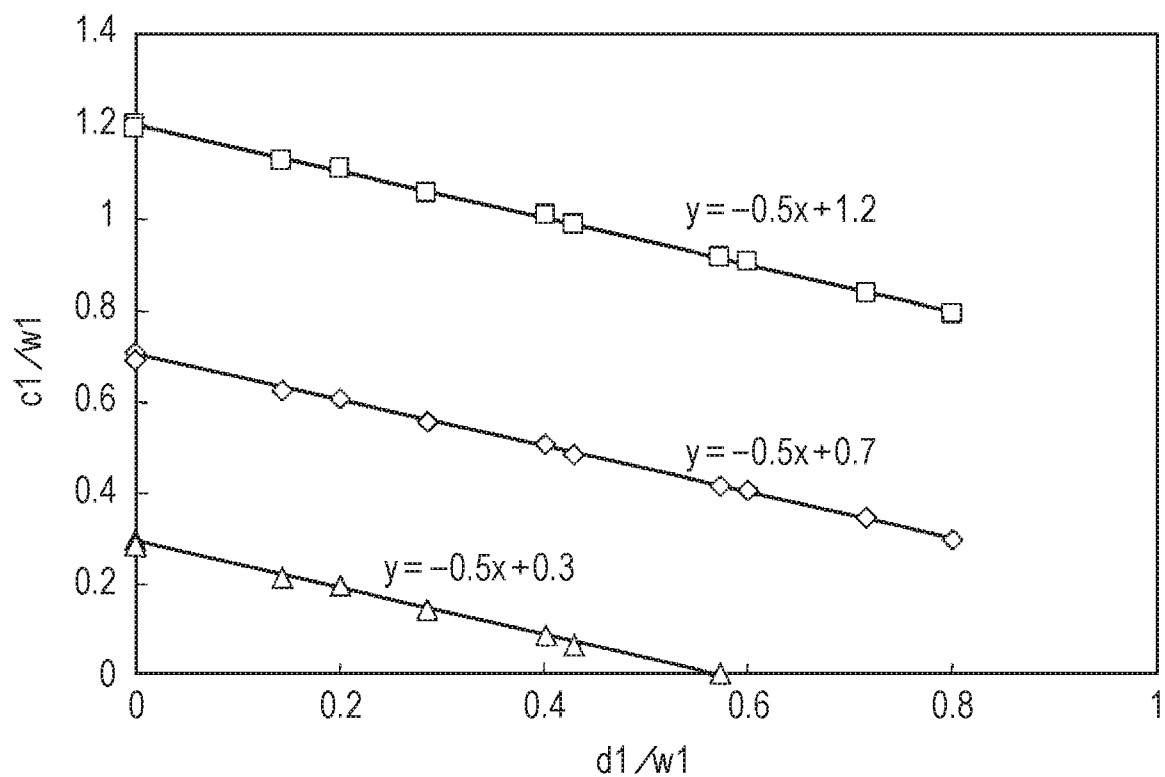
FIG. 46 is a diagram illustrating an example of the invention.

Here, in a case in which the width w1 of the sealing member is 0.5 mm and 0.7 mm, for the boundary where reliability can be ensured and the boundary where the convex occurs in the junction portion, on the same graph, the boundaries of d1/w1 and c1/w1 (FIGS. 44 and 45) are plotted as shown in FIG. 46.

As shown in FIG. 46, when the width w1 of the sealing member after bonding is 0.5 mm or 0.7 mm, the boundaries are on the same line. Therefore, even when w1 is out of the above-described range, the boundaries are on the line of FIG. 46.

From FIG. 46, it can be seen that the relationship of d1/w1 and c1/w1 is plotted to be on the same line, without depending on the width of the sealing member.

As such, in order to ensure reliability, without depending on the size of the sealing member, the following condition is satisfied.

$$(c1/w1) \leq -0.5 \times (d1/w1) + 1.2 \qquad \text{Equation 43}$$

Ideally, the following condition is to be satisfied.

$$(c1/w1) \leq -0.5 \times (d1/w1) + 0.7 \qquad \text{Equation 44}$$

Further, the convex (thickening) of the sealing member in the junction portion is less than 20 percent for the width of the sealing member, which does not matter practically. However, in order to completely eliminate the convex of the junction portion including the variation in size of the sealing member, ideally, it is preferable that the following condition is satisfied.

$$(c1/w1) \geq -0.5 \times (d1/w1) + 0.3 \qquad \text{Equation 45}$$

In addition, in order to prevent the sealing members from being not brought into contact with each other and to prevent liquid crystal from leaking due to the variation in size of the sealing member in the junction portion, ideally, it is preferable that the following condition is satisfied.

$$d1/w1 \leq 0.8 \qquad \text{Equation 46}$$

As described above, by defining the shapes of the first and second sealing layers 59a and 59b, the same effects as those in the above-described embodiments can be obtained. That is, the sealing member can be drawn at the same speed all over. Further, since the writing start portion or the writing end portion is sufficiently separated from the panel, the complex control can be eliminated. Accordingly, drawing time can be markedly reduced to half to one-third of drawing time in the related art. In addition, thickening of the sealing member toward the inside of the liquid crystal device in the junction portion of the sealing member can be solved.

Electronic Apparatus

The specified examples of an electronic apparatus according to the embodiment of the invention will be described.

Figure 47A:
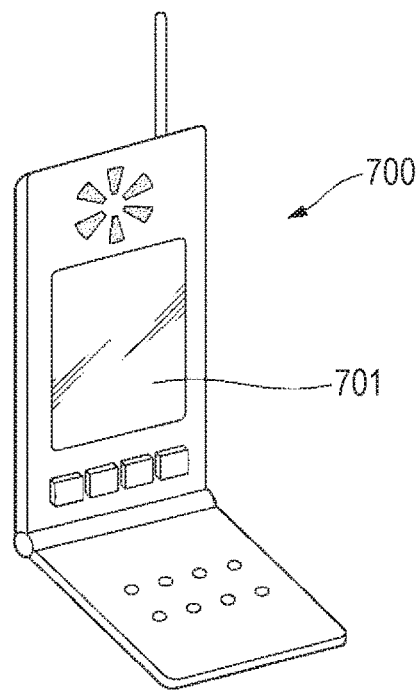
FIG. 47A is a perspective view showing an electronic apparatus according to the embodiment of the invention.

FIG. 47A is a perspective view showing an example of a cellular phone. In FIG. 47A, reference numeral 700 denotes a cellular phone main body, and reference numeral 701 denotes a liquid crystal display unit having the liquid crystal device according to any one of the embodiments.

Figure 47B:
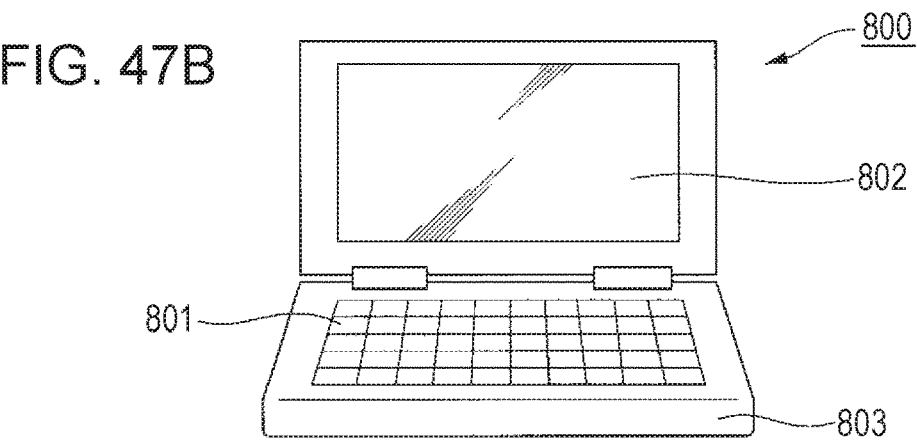
FIG. 47B is a perspective view showing an electronic apparatus according to the embodiment of the invention.

FIG. 47B is a perspective view showing an example of a portable information processing apparatus, such as a word processor, a personal computer, or the like. In FIG. 47B, reference numeral 800 denotes an information processing apparatus, reference numeral 801 denotes an input unit, such as a keyboard or the like, reference numeral 803 denotes an information processing apparatus main body, and reference numeral 802 denotes a liquid crystal display unit having the liquid crystal device according to any one of the embodiments.

Figure 47C:
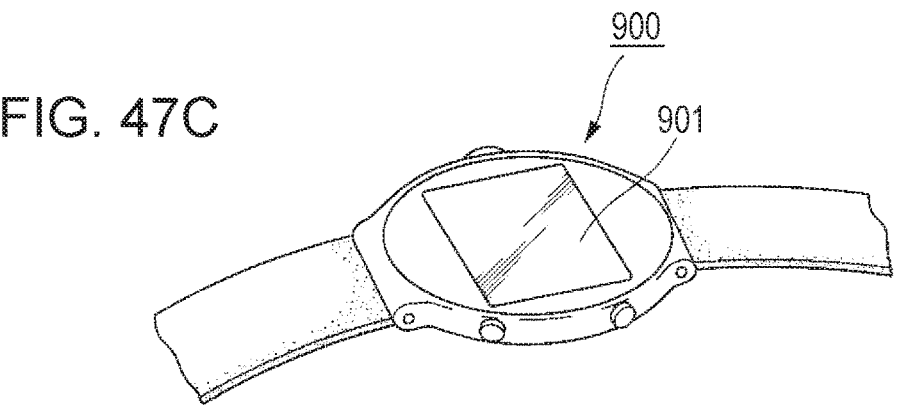
FIG. 47C is a perspective view showing an electronic apparatus according to the embodiment of the invention.
Figure 48A:
FIG. 48A is a diagram illustrating the related art.
Figure 48B:
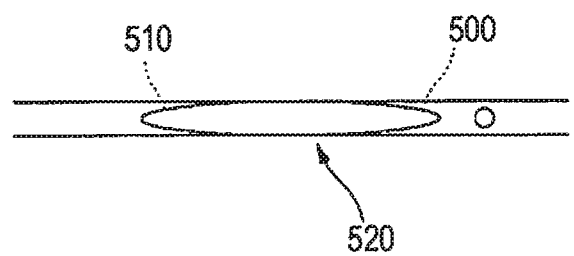
FIG. 48B is a diagram illustrating the related art.
Figure 48C:
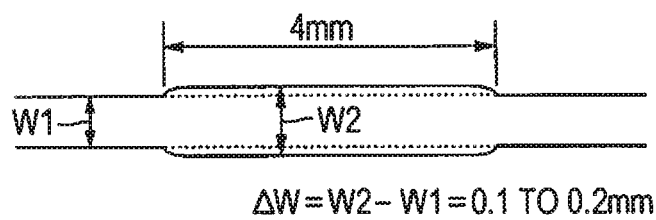
FIG. 48C is a diagram illustrating the related art.
Figure 48D:
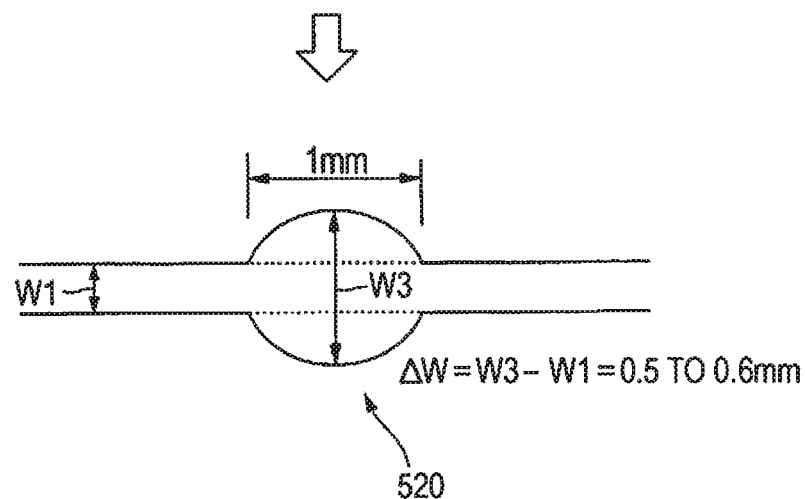
FIG. 48D is a diagram illustrating the related art.
Figure 49:
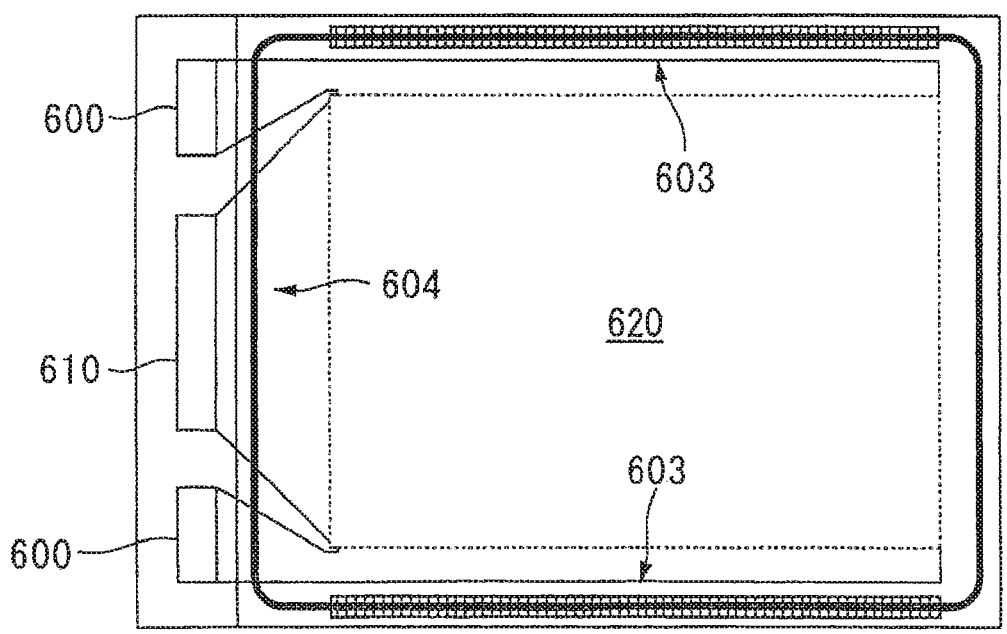
FIG. 49 is a diagram illustrating the related art.
Figure 50:
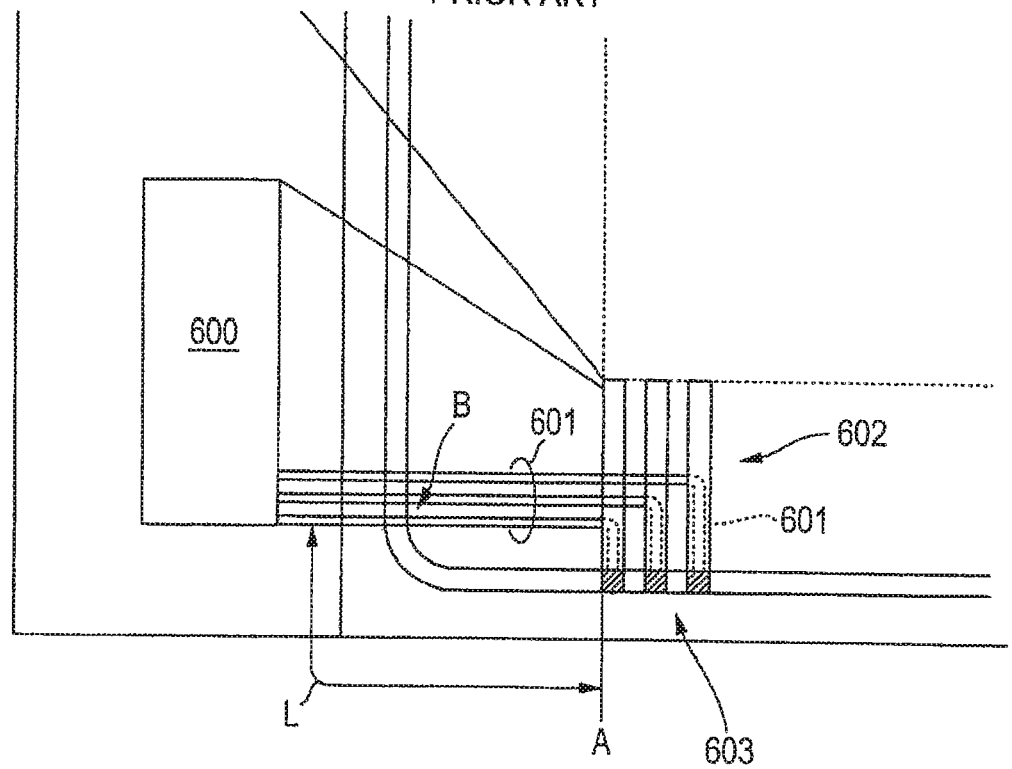
FIG. 50 is a diagram illustrating the related art.

FIG. 47C is a perspective view showing an example of a wristwatch-type electronic apparatus. In FIG. 47C, reference numeral 900 denotes a watch main body, and reference numeral 901 denotes a liquid crystal display unit having the liquid crystal device according to any one of the embodiments.

The electronic apparatuses shown in FIGS. 47A to 47C have the liquid crystal device according to any one of the embodiments. Therefore, an electronic apparatus including a display unit, which has superior reliability and performs high-quality display, is obtained.

What is claimed is:

1. A display device, comprising:
   a panel having a first substrate and a second substrate opposite the first substrate, the first substrate having a pixel region containing a plurality of pixel electrodes and a plurality of thin film transistors on a first surface facing the second substrate;
   a peripheral portion on the first surface of the first substrate, the peripheral portion being that part of the first substrate which surrounds the pixel region, at least a portion of which peripheral portion does not overlap with the second substrate in a plan view and thereby has a first substrate side which protrudes from under the second substrate;
   a common electrode disposed on the second substrate opposite at least one of the plurality of pixel electrodes;
   an insulating sealing member bonding the first substrate to the second substrate, the insulating sealing member uninterruptedly extending around a periphery of the pixel region;
   a wiring disposed on the first substrate extending across the insulating sealing member; and
   a conductive sealing member portion disposed to overlap a part of the insulating sealing member, electrically connecting the wiring with the common electrode via a plurality of conductive particles, the conductive particles having a metallic coating over a nonmetallic core, wherein a first distance is measured in a direction perpendicular to the edge of the pixel region between the closest conductive particle in the conductive sealing member portion and the edge of the pixel region on a side of the panel in the peripheral portion, and a second distance is measured in a direction perpendicular to the edge of the pixel region between a location on the outer face of the insulating sealing member and the edge of the pixel region on the same side of the panel, the first distance is shorter than the second distance, and at least one of the plurality of conductive particles in the conductive sealing member portion makes direct physical and electrical connection with a conductive layer on each of the first substrate and the second substrate.

2. The display device of claim 1, wherein a plurality of the conductive sealing member portions electrically connects to the common electrode, further wherein a portion of the common electrode is present at intermediate points along a line directly between the centers of two adjacent conductive sealing member portions on the same side of the panel.

3. The display device of claim 1, wherein a plurality of the conductive sealing member portions each supplies a common electric potential to the common electrode, there being a linear distribution of electric potential across the common electrode between center points of each of the plurality of conductive sealing member portions on the same side of the panel.

4. The display device of claim 1, wherein the conductive sealing member portion is disposed only on a side of the first substrate that does not protrude from under the second substrate.

5. The display device of claim 1, wherein the sealing material of the insulating sealing member and the sealing material of the conductive sealing member portion in which the conductive particle is dispersed have the same composition.

6. The display device of claim 1, wherein the nonmetallic core of the plurality of conductive particles is elastic.

7. The display device of claim 1, wherein a third distance is measured in a direction perpendicular to the edge of the pixel region between another conductive particle in the conductive sealing member portion and the edge of the pixel region on the same side of the panel, and the third distance is longer than the second distance.

8. The display device of claim 2, wherein a portion of the common electrode is present at a center point along a line directly between the centers of two adjacent conductive sealing member portions on the same side of the panel.

9. The display device of claim 2, wherein the conductive sealing member portion is disposed only on a side of the first substrate that does not protrude from under the second substrate.

10. The display device of claim 2, wherein the sealing material of the insulating sealing member and the sealing material of the conductive sealing member portion in which the conductive particle is dispersed have the same composition.

11. The display device of claim 2, wherein the nonmetallic core of the plurality of conductive particles is elastic.

12. The display device of claim 10, wherein the nonmetallic core of the plurality of conductive particles is elastic.

13. The display device of claim 2, wherein a third distance is measured in a direction perpendicular to the edge of the pixel region between another conductive particle in the conductive sealing member portion and the edge of the pixel region on the same side of the panel, and the third distance is longer than the second distance.

14. The display device of claim 13, wherein the nonmetallic core of the plurality of conductive particles is elastic.

15. The display device of claim 13, wherein the sealing material of the insulating sealing member and the sealing material of the conductive sealing member portion in which the conductive particle is dispersed have the same composition.

16. The display device of claim 14, wherein the sealing material of the insulating sealing member and the sealing material of the conductive sealing member portion in which the conductive particle is dispersed have the same composition.

17. The display device of claim 7, wherein the nonmetallic core of the plurality of conductive particles is elastic.

18. The display device of claim 7, wherein the sealing material of the insulating sealing member and the sealing material of the conductive sealing member portion in which the conductive particle is dispersed have the same composition.

19. The display device of claim 17, wherein the sealing material of the insulating sealing member and the sealing material of the conductive sealing member portion in which the conductive particle is dispersed have the same composition.

20. The display device of claim 19, wherein a plurality of the conductive sealing member portions electrically connects to the common electrode, further wherein a portion of the common electrode is present at a center point along a line directly between the centers of two adjacent conductive sealing member portions on the same side of the panel.

* * * * *